(12) United States Patent
Nakashima et al.

(10) Patent No.: US 8,824,463 B2
(45) Date of Patent: Sep. 2, 2014

(54) PROHIBITION TURN DETERMINATION APPARATUS

(75) Inventors: Kohta Nakashima, Kawasaki (JP); Akira Naruse, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 13/091,475

(22) Filed: Apr. 21, 2011

(65) Prior Publication Data

US 2012/0020372 A1 Jan. 26, 2012

(30) Foreign Application Priority Data

Jul. 23, 2010 (JP) .................. 2010-166526

(51) Int. Cl.
| | | |
|---|---|---|
| H04L 12/50 | (2006.01) | |
| H04L 12/28 | (2006.01) | |
| H04L 12/56 | (2006.01) | |

(52) U.S. Cl.
CPC ................ *H04L 45/12* (2013.01); *H04L 45/22* (2013.01); *H04L 45/24* (2013.01)
USPC .......................................... 370/360; 370/398

(58) Field of Classification Search
USPC .......................................... 370/360, 398, 424
See application file for complete search history.

(56) References Cited

U.S. PATENT DOCUMENTS

| | | | | |
|---|---|---|---|---|
| 6,031,835 | A * | 2/2000 | Abali et al. ..................... | 370/388 |
| 6,065,063 | A * | 5/2000 | Abali .............................. | 709/242 |
| 8,139,490 | B2 * | 3/2012 | Klausler ........................ | 370/235 |
| 2008/0285458 | A1 * | 11/2008 | Lysne .......................... | 370/238 |
| 2009/0119484 | A1 * | 5/2009 | Mohl et al. .................... | 712/201 |
| 2009/0313592 | A1 * | 12/2009 | Murali et al. .................... | 716/6 |

FOREIGN PATENT DOCUMENTS

| | | |
|---|---|---|
| JP | 11-154977 A | 6/1999 |
| JP | 2011-82964 A | 4/2011 |

OTHER PUBLICATIONS

Murali, Srinivasan, et al. "Designing application-specific networks on chips with floorplan information." Proceedings of the 2006 IEEE/ACM international conference on Computer-aided design. ACM, 2006.*

Fidler, Markus, and Gerrit Einhoff. "Routing in turn-prohibition based feed-forward networks." Networking 2004. Networking Technologies, Services, and Protocols; Performance of Computer and Communication Networks; Mobile and Wireless Communications. Springer Berlin Heidelberg, 2004. 1168-1179.*

David, Starobinski et al., "Application of network calculus to general topologies using turn-prohibition", IEEE/ACM Transactions on Networking (TON) archive vol. 11, Issue 3 (Jun. 2003), table of contents, pp. 411-421.

(Continued)

*Primary Examiner* — Man Phan
*Assistant Examiner* — Ryan Kavleski
(74) *Attorney, Agent, or Firm* — Fujitsu Patent Center

(57) ABSTRACT

A prohibition turn determination apparatus determines an initial path so that the communication amounts of respective links connecting switches to each other are most efficiently distributed between a communication pair, that is, a pair of servers communicating with each other via a network. Then, the prohibition turn determination apparatus calculates the communication amounts of respective turns formed along the initial path based on the communication amounts set between end nodes which are the communication pair. Next, the prohibition turn determination apparatus determines prohibition turns, which are not used for packet communication, based on the communication amounts of respective turns by an Up/down method or a TP method. Finally, the prohibition turn determination apparatus determines the final routing to avoid the prohibition turns.

9 Claims, 36 Drawing Sheets

(56) References Cited

OTHER PUBLICATIONS

Michael, Schroeder D. et al., "Autonet: A High-speed, Self-Configuring Local Area Network Using Point-to-Point Links", IEEE Journal on Selected Areas in Communications, vol. 9, No. 8, Oct. 1991, pp. 1318-1335.

Japanese Office Action mailed Feb. 4, 2014 for corresponding Japanese Application No. 2010-166526, with Partial English-language Translation.

* cited by examiner

FIG.4
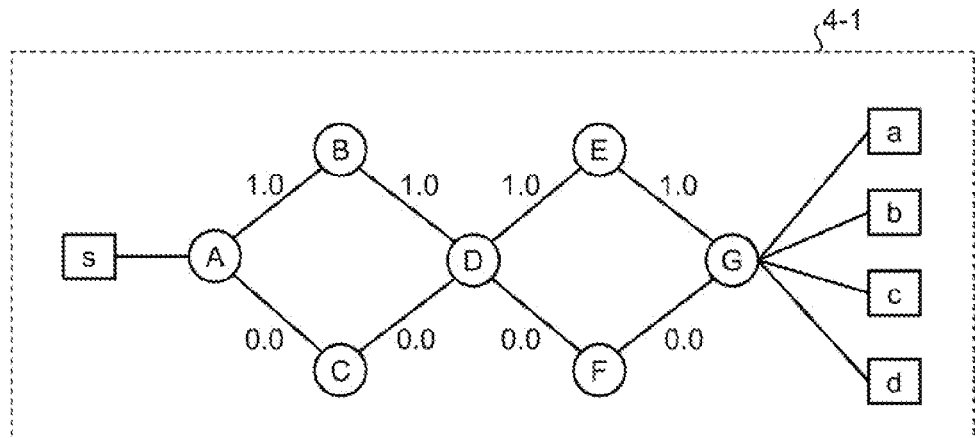
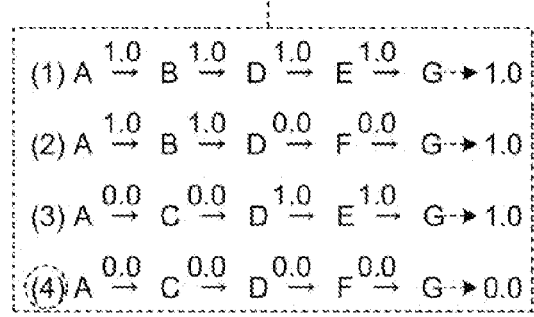
FIG.5
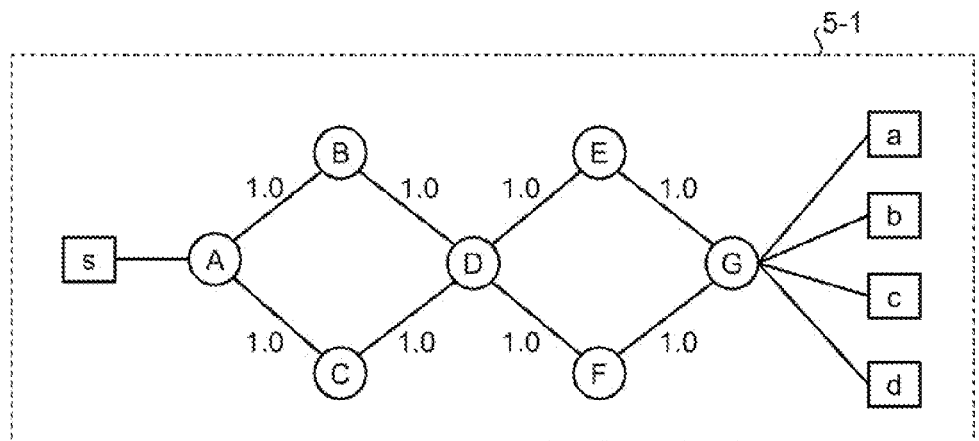
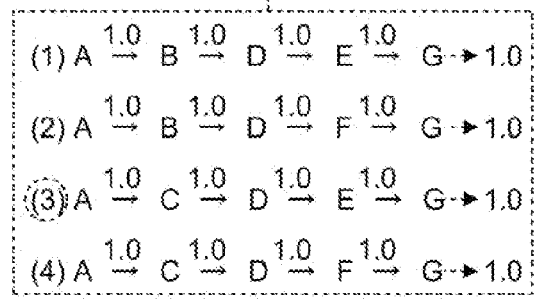

PROHIBITION TURN DETERMINATION APPARATUS

CROSS-REFERENCE TO RELATED APPLICATIONS

This application is based upon and claims the benefit of priority of the prior Japanese Patent Application No. 2010-166526, filed on Jul. 23, 2010, the entire contents of which are incorporated herein by reference.

FIELD

The embodiments discussed herein are directed to a prohibition turn determination program and a prohibition turn determination apparatus.

BACKGROUND

In a network including a loop structure, so-called deadlock sometimes occurs in which packets may not be exchanged. The deadlock occurs due to the buffer dependency of switches connected to each other in a network.

FIG. 41 is a diagram illustrating a mechanism of deadlock occurrence. In FIG. 41, S1, S2, S3, and S4 denote switches. In FIG. 41, B1, B2, B3, and B4 denote buffers. In FIG. 41, Pa1, Pa2, Pa3, and Pa4 denote packets. For example, in a network illustrated in FIG. 41, it is supposed that a packet is transmitted clockwise from switch to switch diagonally positioned. In this case, for example, when the packets are simultaneously transmitted from the respective switches, the packets are stored in the buffers of the switches adjacent clockwise to each other. For example, the packet Pa2 transmitted from the switch S1 to the destination switch S3 is stored in the buffer B2 of the switch S2. In addition, the packet Pa3 transmitted from the switch S2 to the destination switch S4 is stored in the buffer B3 of the switch S3. In addition, the packet Pa4 transmitted from the switch S3 to the destination switch S1 is stored in the buffer B4 of the switch S4. In addition, the packet Pa1 transmitted from the switch S4 to the destination switch S2 is stored in the buffer B1 of the switch S1.

Here, the buffer B3 of the switch S3 stores the packet Pa3 transmitted from the switch S2 toward the destination switch S4. In this case, the buffer B3 of the switch B3 has to be empty so that the packet Pa2 can be transmitted from the switch S2 to the switch S3. For such a reason, the switch S2 may not transmit the packet Pa2, which has been transmitted from the switch S1 toward the destination switch S3, to the switch S3. Likewise, since the packet may not be transmitted even from all the switches S1, S3, and S4, a packet transmission disabled state, that is, deadlock occurs in the network illustrated in FIG. 41. As such, enablement and disablement of transmission of a packet is determined based on the emptiness of a buffer of a packet destination switch. This is called buffer dependency. In addition, as illustrated in FIG. 41, the packet transmission disabled state occurred in a network due to the buffer dependency is called buffer dependency circulation.

The above-described buffer dependency can conceptually be expressed with a term "turn". The turn is defined as a combination of ports of a switch transmitting an input packet to a destination. For example, the turn is defined as a combination of an input port to which a packet is input and an output port from which the input packet is output to a destination. For example, the turn which is a combination of the input port and the output port of the switch S2 illustrated in FIG. 41 is defined as "S1→S2→S3". In order to make it possible for the packet Pa2 to be transmitted from the switch S2 to the switch S3, the buffer dependency in which the buffer B3 of the switch S3 has to be empty has a one-to-one correspondence relationship with "S1→S2→S3".

FIG. 42 is a diagram illustrating a correspondence relationship between the buffer dependency circulation and a turn loop. In FIG. 42, 42-1 denotes buffer dependency circulation. In FIG. 42, (1) of 42-1 denotes buffer dependency in which the buffer B3 has to be empty in order to make it possible for the packet to be transmitted from the switch S2. In FIG. 42, (2) of 42-1 denotes buffer dependency in which the buffer B4 has to be empty in order to make it possible for the packet to be transmitted from the switch S3. In FIG. 42, (3) of 42-1 denotes buffer dependency in which the buffer B1 has to be empty in order to make it possible for the packet to be transmitted from the switch S4. In FIG. 42, (4) of 42-1 denotes buffer dependency in which the buffer B2 has to be empty in order to make it possible for the packet to be transmitted from the switch S1. In addition, as indicated by 42-1 of FIG. 42, the buffer dependency (1) to the buffer dependency (4) make a cycle in the network.

In FIG. 42, 42-2 denotes a turn loop. In FIG. 42, (1) of 42-2 denotes a turn formed by the switch S2 outputting the packet, which has been input from the switch S1, to the switch S3. In FIG. 42, (2) of 42-2 denotes a turn formed by the switch S3 outputting the packet, which has been input from the switch S2, to the switch S4. In FIG. 42, (3) of 42-2 denotes a turn formed by the switch S4 outputting the packet, which has been input from the switch S3, to the switch S1. In FIG. 42, (4) of 42-2 denotes a turn formed by the switch S1 outputting the packet, which has been input from the switch S4, to the switch S2. In addition, as indicated by 42-2 of FIG. 42, a loop goes round clockwise in the network when the turns (1) to (4) are linked to each other.

Accordingly, since the buffer dependency and the turn are said to have a one-to-one correspondence relationship with each other, (1) illustrated in 42-1 of FIG. 42 and (1) illustrated in 42-2 of FIG. 42 have a one-to-one correspondence relationship with each other. Moreover, (2) illustrated in 42-1 of FIG. 42 and (2) illustrated in 42-2 of FIG. 42 have a one-to-one correspondence relationship with each other. Likewise, (3) illustrated in 42-1 of FIG. 42 and (3) illustrated in 42-2 of FIG. 42 have a one-to-one correspondence relationship with each other and (4) illustrated in 42-1 of FIG. 42 and (4) illustrated in 42-2 of FIG. 42 have a one-to-one correspondence relationship with each other. Accordingly, the buffer dependency circulation illustrated in 42-1 of FIG. 42 is said to be conceptually equivalent to the turn loop illustrated in 42-2 of FIG. 42.

The above-described deadlock occurs due to the buffer dependency circulation, that is, the turn loop. Accordingly, there are known techniques for restricting a packet transmission direction to prevent the deadlock. For example, an "Up/down method" or a "turn Prohibition (TP) method" prevents the deadlock by determining prohibition turns to restrict packet transmission and transmitting packets along a routine from which the prohibition turns are excluded.

The determination of the prohibition turns according to the Up/down method will be described with reference to FIG. 43. FIG. 43 is a diagram illustrating the flow of the determination of the prohibition turns according to the Up/down method. According to the Up/down method, as illustrated in FIG. 32, in step S101, on a network including individual switches, which are allowable by the network, and links, which connect the switches to each other, the switch to be on the top in a network graph is determined. The switch determination method includes a method of selecting switches to which the minimum ID is allocated, a method of selecting switches at random, and a method of selecting switches equally distant from an end node. According to the Up/down method, the number of pops is determined in step S102 and an up direction is determined in step S103, as illustrated in FIG. 43. According to the Up/down method, the prohibition turns are determined in step S104, as illustrated in FIG. 43. For example, according to the Up/down method, when the transmission direction of an input packet is oriented from a down direction to an up direction, the turn corresponding to the transmission direction is determined as the prohibition turn so as to restrict the transmission direction.

FIG. 44 is a diagram illustrating a prohibition turn determination process according to the Up/down method. In step S102 described above with reference to FIG. 43, the number of pops of each switch is calculated as follows. That is, as illustrated in FIG. 44, the number of pops of the switch determined as the top switch in step S101 is assumed to be "0" in step S102. In addition, as illustrated in FIG. 44, the number of pops of the switch connected to the top switch with zero "0" pop is assumed to be "1" in step S102. In addition, as illustrated in FIG. 44, the number of pops of the switch connected to the switch with one "1") pop is assumed to be "2" in step S102. In addition, the number of pops of the switch connected to the switch with two "2" pops is assumed to be "3" in step S102. In step S103, the direction oriented from the switch with the larger number of pops to the switch with the smaller number of pops is the up direction. On the contrary, a reverse direction to the up direction is the down direction. Among the switches with the same number of pops, either of the directions is determined as the up direction and the reverse direction thereto is determined as the down direction. As illustrated in FIG. 44, turns T1, T2, T3, and T4 in which the transmission direction is oriented from the down direction to the up direction are determined as the prohibition turns. Moreover, both directions indicated by the arrows of the turns T1, T2, T3, and T4 become the prohibition turns.

The determination of the prohibition turn according to the TP method will be described with reference to FIG. 45. FIG. 45 is a flowchart illustrating the flow of the determination of the prohibition turns according to the TP method. As illustrated in FIG. 45, the switch with the minimum order number on the network graph, that is, the minimum number of connection links is selected in step S201, the prohibition turn is determined in step S202, and then the switch selected in step S201 is deleted in step S203. In the TP method, the process returns to step S201 described above, the switch with the minimum number of connection links on the network graph is selected after the deletion of the switch, and then the above-described process is executed. In the TP method, the processes illustrated in FIG. 45 are repeated until all of the switches forming the turn are deleted.

FIG. 46 is a diagram illustrating the prohibition turn determination process according to the TP method. In the TP method, as indicated by 46-1 of FIG. 46, a switch N7 with the minimum number of connection links is selected and the switch N7 is deleted without determination of a turn since there is no turn formed by the switch N7. Subsequently, in the TP method, as indicated by 46-2 of FIG. 46, a switch N6 with the minimum number of connection links is selected, a prohibition turn T1 is determined, and then the switch N6 is deleted. Subsequently, in the TP method, as indicated by 46-3 of FIG. 46, a switch N3 with the minimum number of connection links is selected and the switch N3 is deleted without determination of a turn since there is no turn formed by the switch N3. Subsequently, in the TP method, as indicated by 46-4 of FIG. 46, a switch N2 is selected between the switch N2 and a switch N4 with the minimum number of connection links, a prohibition turn T2 is determined, and then the switch N2 is deleted. Subsequently, in the TP method, as indicated by 46-5 of FIG. 46, a switch N5 is selected among a switch N1, a switch N4, and a switch N5 with the minimum number of connection links, a prohibition turn T3 is determined, and then the switch N5 is deleted. Subsequently, in the TP method, as indicated by 46-6 of FIG. 46, the switch N4 is selected between the switch N1 and the switch N4 with the minimum number of connection links and the switch N4 is deleted without determination of a turn since there is no turn formed by the switch N4. Thus, since only the switch N1 remains and there is no switch forming a turn, the prohibition turn determination process ends in the TP method and the turns T1, T2, and T3 are determined as the prohibition turns.

Examples of the related art are "Autonet: A High-speed, Self-Configuring Local Area Network Using Point-to-Point Links" Michael D. Schroeder, Andrew D. Birrell, Michael Burrows, Hal Murray, Roger M. Needham, Thomas L. Rodeheffer, Edwin H. Satterthwaite, Charles P. Thacker, IEEE JOURNAL ON SELECTED AREAS IN COMMUNICATIONS, VOL. 9, NO. 8, OCTOBER 1991; and "Application of network calculus to general topologies using turn-prohibition", David Starobinski, Mark Karpovsky, Lev A. Zakrevski, IEEE/ACM Transactions on Networking (TON) archive Volume 11, Issue 3 (June 2003) table of contents, Pages: 411-421, Year of Publication: 2003, ISSN: 1063-6692.

However, the above-described techniques restricting the packet transmission direction have a problem that the communication amounts of respective links may not efficiently be distributed when a routing is executed in consideration of the prohibition turns.

FIG. 47 is a diagram illustrating an example of the communication amounts of respective links forming a network. When the communication amount of the turn passing clockwise through the switch S2 is "10", as illustrated in FIG. 47, the communication amount of link corresponding to this turn is "11". When the communication amount of the turn passing clockwise through the switch S3 is "1", as illustrated in FIG. 47, the communication amount of link corresponding to this turn is "11". When the communication amount of turn passing clockwise through the switch S4 is "10", as illustrated in FIG. 47, the communication amount of link corresponding to this turn is "11". When the communication amount of turn passing clockwise through the switch S1 is "1", as illustrated in FIG. 47, the communication amount of link corresponding to this turn is "11".

FIG. 48 is a diagram illustrating comparison between the communication amounts of respective links according to a difference between the prohibition turns. In FIG. 48, 48-1 denotes the communication amounts of respective links when a turn BT1 passing clockwise through the switch S3 and routing is executed so as to detour this prohibition turn counterclockwise. In other words, 48-1 denotes the communication amounts of respective links when a turn "S2→S3→S4" passing clockwise through the switch S3 is set as a prohibition turn and routing is executed along a turn "S2→S1→S4" to detour this prohibition turn counterclockwise. In FIG. 48, 48-2 denotes the communication amounts of respective links when a turn BT2 passing clockwise through the switch S3 and routing is executed so as to detour this prohibition turn counterclockwise. In other words, 48-2 denotes the communication amounts of respective links when a turn "S1→S2→S3" passing clockwise through the switch S3 is set as a prohibition turn and routing is executed along a turn "S1→S4→S3" to detour this prohibition turn counterclockwise.

FIG. 49 is a diagram illustrating the details of the communication amounts of respective links after routing is executed so as to detour a prohibition turn. Here, 49-1 illustrated in FIG. 49 corresponds to 48-1 illustrated in FIG. 48. Here, 49-2 illustrated in FIG. 49 corresponds to 48-2 illustrated in FIG. 48. As illustrated in 48-1 of FIG. 48 or 49-1 of FIG. 49, the communication amount of link is "12" or "10" when the routing is executed so as to detour the prohibition turn BT1 counterclockwise. As illustrated in 48-2 of FIG. 48 or 49-2 of FIG. 49, the communication amount of link is "21" or "1" when the routing is executed so as to detour the prohibition turn BT2 counterclockwise. Accordingly, it can be understood that after the routing is executed along a turn to detour the prohibition turn, the communication amounts of respective links are more efficiently distributed in 48-1 illustrated in FIG. 48 than in 48-2 illustrated in FIG. 48. However, as in the above-described Up/down method and the TP method, with the technique for determining the prohibition turn and restricting the packet transmission direction, the prohibition turn may not be determined so as to use turns along which the communication amounts of respective links are distributed. Accordingly, the technique for restricting the packet transmission direction has the problem in that the communication amount may not be efficiently distributed when routing is executed so as to prevent the deadlock in a network.

SUMMARY

According to an aspect of an embodiment of the invention, a prohibition turn determination apparatus includes a calculation unit that calculates communication amounts of respective turns, which are each defined as a combination of a input port and a counter output port of the input port installed in each switch along a communication path between communication apparatuses executing communication via a network including a loop structure having the plurality of switches, based on a communication amount between the communication apparatuses; and a determination unit that determines a prohibition turn which is not used to transmit a packet, based on the communication amounts of respective turns calculated by the calculation unit.

According to another aspect of an embodiment of the invention, a prohibition turn determination apparatus includes a determination unit that generates a network graph which is a model of a network including a loop structure having a plurality of switches and links connecting the switches to each other, sets a communication path between communication apparatuses executing communication via the network on the network graph, sequentially adds turns, which are each defined as a combination of an input port and a counter output port of the input port installed in the switch on the communication path, one by one, and determines the added turn as a prohibition turn, which is not used to transmit a packet, when a loop is formed by the added turn.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating the first case to describe the initial path determination method;

FIG. 5 is a diagram illustrating the first case to describe the initial path determination method;

DESCRIPTION OF EMBODIMENTS

Preferred embodiments of the present invention will be explained with reference to accompanying drawings. Of course, the technique disclosed by this application is not limited to embodiments of the prohibition turn determination program and the prohibition turn determination apparatus described below.

[a] First Embodiment

Configuration of Prohibition Turn Determination (First Embodiment)

Figure 1:
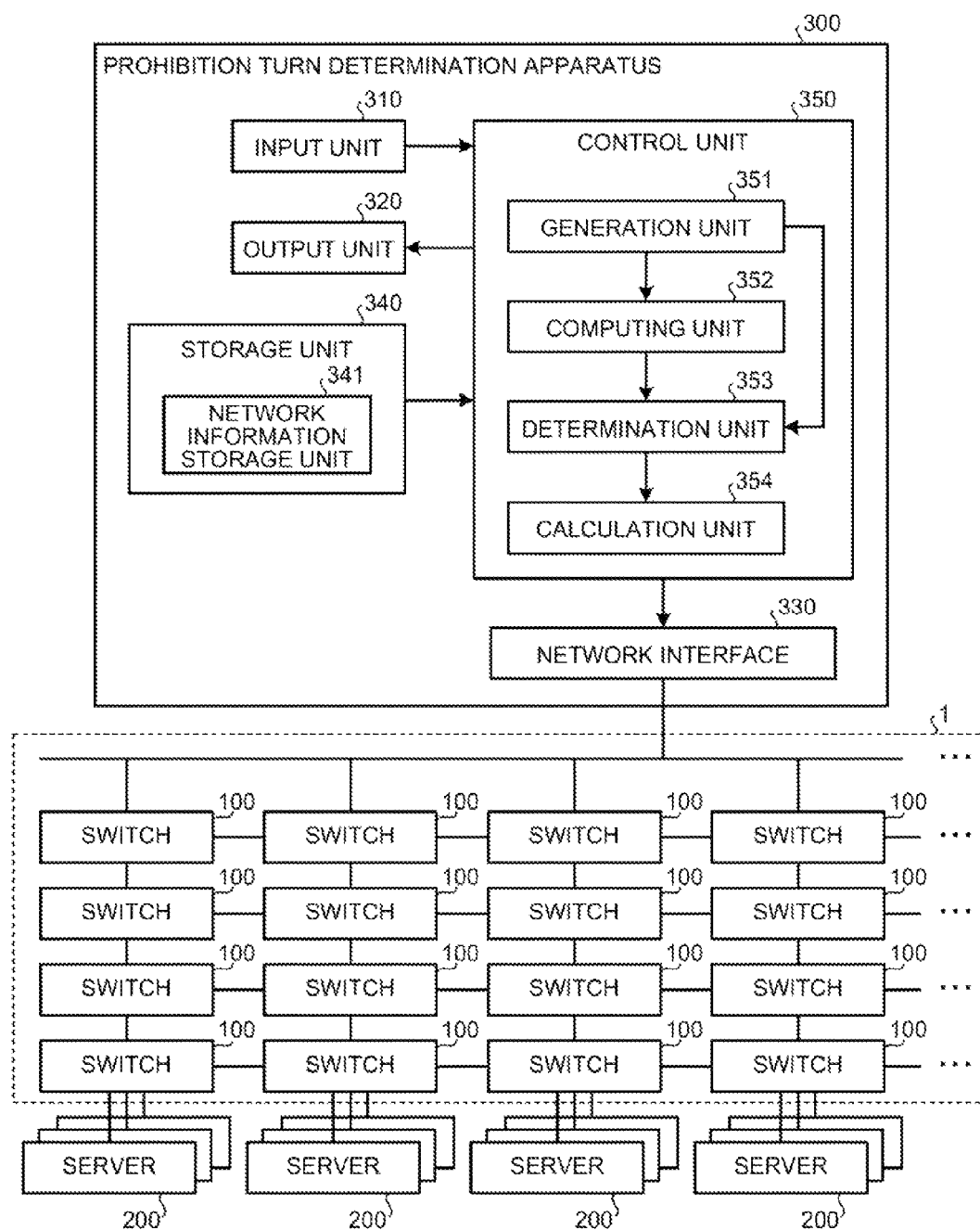
FIG. 1 is a block diagram illustrating the functional configuration of a prohibition turn determination apparatus according to a first embodiment.

FIG. 1 is a block diagram illustrating the functional configuration of the prohibition turn determination apparatus according to a first embodiment. As illustrated in FIG. 1, a prohibition turn determination apparatus 300 is connected to a network 1 including a plurality of switches 100 connected to each other. The prohibition turn determination apparatus 300 determines a prohibition turn in which packets are not exchanged, when determining a routing to exchange packets among the plurality of switches 100 connected to each other in the network 1. A plurality of servers 200 are connected to the network 1 to communicate with each other via the network 1.

As illustrated in FIG. 1, the prohibition turn determination apparatus 300 includes an input unit 310, an output unit 320, a network interface 330, a storage unit 340, and a control unit 350. Moreover, a personal computer or a server having a communication interface can be used as the prohibition turn determination apparatus 300.

The input unit 310 receives various kinds of information input from a user. For example, the input unit 310 receives an instruction to start a routing determination process from a user. The input unit 310 includes an input device such as a keyboard, a mouse, or a touch pad.

The output unit 320 outputs and displays various kinds of information. For example, the output unit 320 outputs and displays the details of the final routing computed by the control unit 350 described below. The output unit 320 includes an output device such as a monitor or a display. When the input unit 310 includes a mouse as the input device, the output unit 320 can realize a pointing device function in cooperation with the monitor serving as the output device. Moreover, when the input unit 310 has another input device such as a touch pad as the input device, the output unit 320 can also realize the pointing device function, like the mouse.

The network interface 330 is connected to the network 1 and transmits and receives messages to and from the plurality of switches 100.

The storage unit 340 stores data, programs, and the like necessary for use in various kinds of processes of the control unit 350. For example, as illustrated in FIG. 1, the storage unit 340 includes a network information storage unit 341. The network information storage unit 341 stores various kinds of information regarding the network 1, such as information regarding the number of switches 100 connected to each other in the network 1 or information regarding the amount of communication set in advance in each server 200 to communicate with other servers 200 via the network.

The control unit 350 has an internal memory to store a predetermined control program, a program defining various kinds of processing sequences, and necessary data. The control unit 350 executes various kinds of processes by developing a predetermined process in the internal memory. For example, as illustrated in FIG. 1, the control unit 350 includes a generation unit 351, a computing unit 352, a determination unit 353, and a calculation unit 354.

The generation unit 351 generates a network graph in which the architecture of the network 1 is modeled. For example, since the generation unit 351 receives an instruction as an input via the input unit 310 to start a prohibition turn determination process, the generation unit 351 acquires various kinds of information regarding the network 1 from the network information storage unit 341. Moreover, using various kinds of information regarding the network 1, the generation unit 351 generates the network graph in which the architecture of the network 1 is modeled which includes the plurality of switches 100 and links connecting the switches 100 to each other.

The computing unit 352 computes the respective communication amounts of turns formed in the respective switches 100 on communication paths set among the servers 200 communicating with each other via the network. Here, the turn is defined as a combination of an input port and an output port as the opponent of the input port installed in the switch 100. In other words, the turn is defined as a combination of an input port to which a packet is input and an output port from which the input packet is output to a transmission destination. First, the computing unit 352 acquires various kinds of information regarding the network 1 from the network information storage unit 341. Then, the computing unit 352 determines the initial path used to execute communication for each combination (hereinafter, referred to as a communication pair) of the servers 200 executing the communication with each other via the network 1. At this time, the computing unit 352 computes communication paths through which the communication amount of the respective links connecting the switches 100 to each other is distributed most efficiently and determines the computed communication path as the initial path.

Hereinafter, an initial path determination method executed by the computing unit 352 will be described with reference to FIGS. 2 to 9. FIGS. 2 to 6 are diagrams illustrating a first case to describe the initial path determination method. FIGS. 7 to 10 are diagrams illustrating a second case to describe the initial path determination method.

Figure 2:
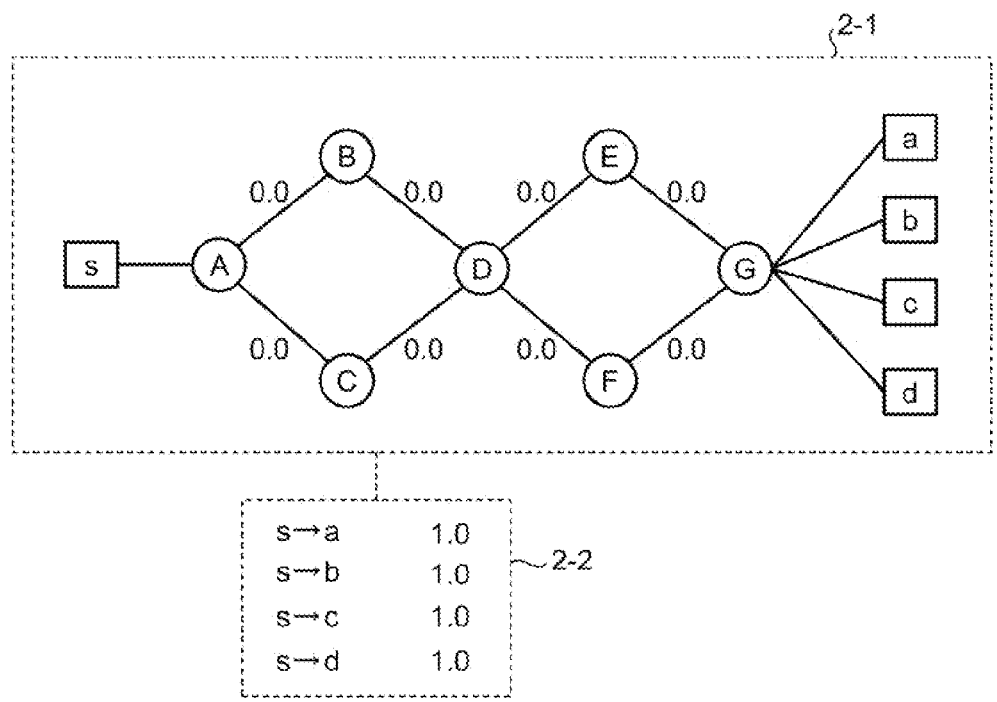
FIG. 2 is a diagram illustrating a first case to describe an initial path determination method.
Figure 3:
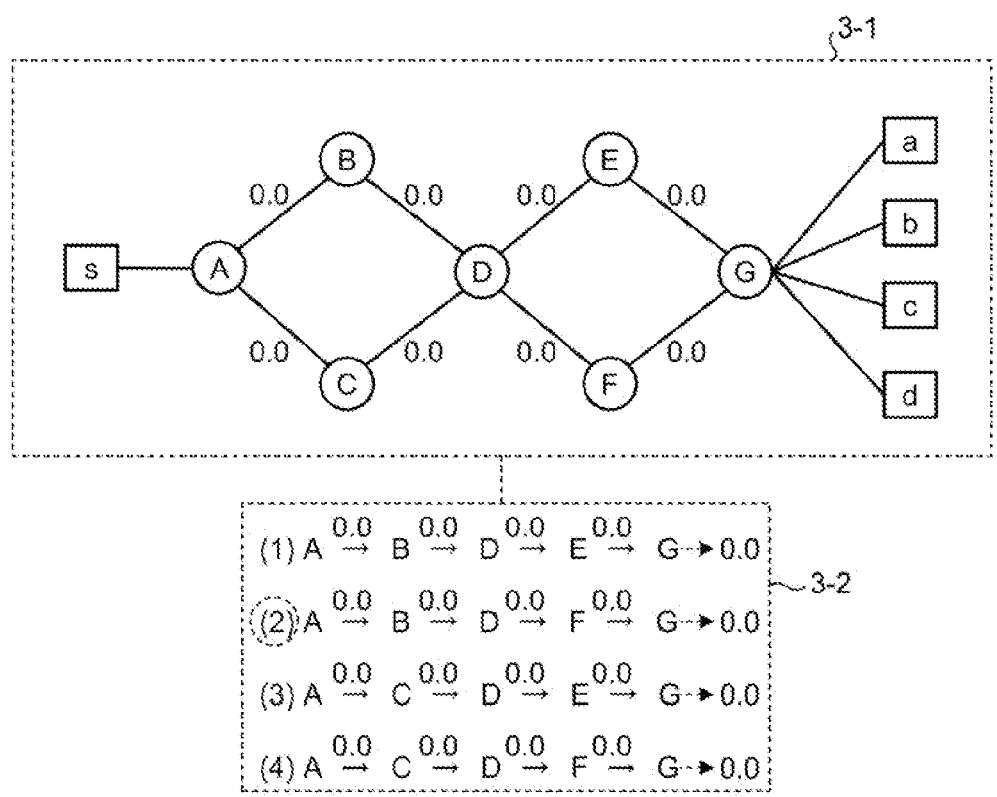
FIG. 3 is a diagram illustrating the first case to describe the initial path determination method.
Figure 6:
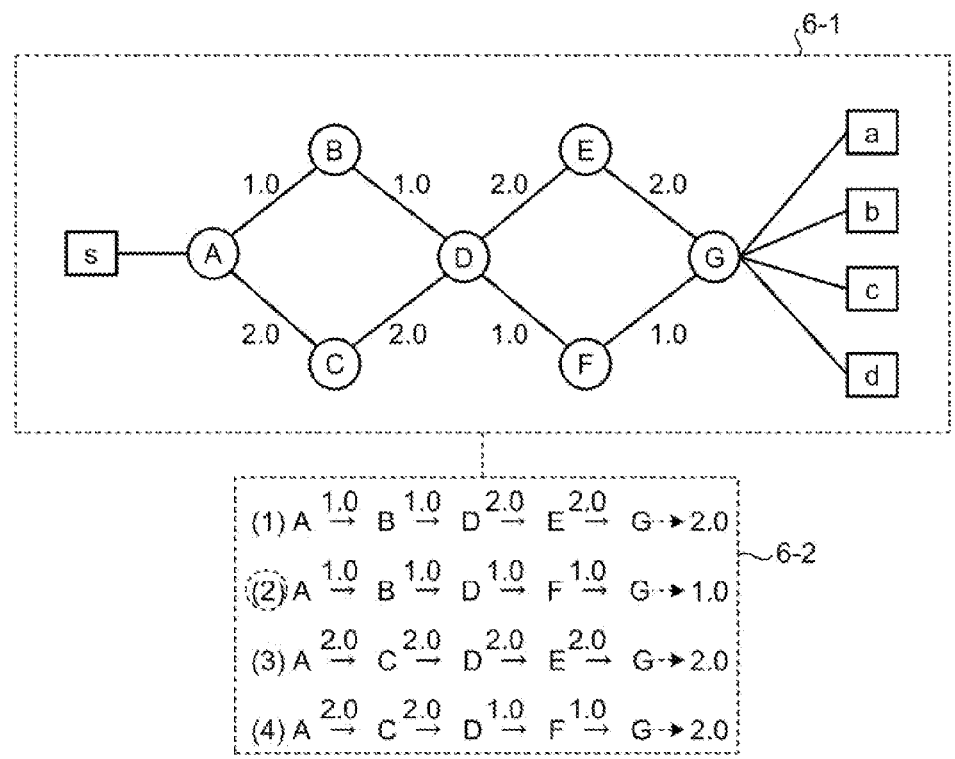
FIG. 6 is a diagram illustrating the first case to describe the initial path determination method.

First, the initial path determination method will be described using the first case illustrated in FIGS. 2 to 6. In FIGS. 2 to 6, "s" and "a" to "d" denote communication apparatuses, that is, so-called end nodes communicating with each other. In FIGS. 2 to 6, "A" to "G" denote switches which transmit packets exchanged between the switches "s"⇔"a", switches "s"⇔"b", switches "s"⇔"c", and switches "s"⇔"d". In addition, 2-1 illustrated in FIG. 2, 3-1 illustrated in FIG. 3, 4-1 illustrated in FIG. 4, 5-1 illustrated in FIG. 5, and 6-1 illustrated in FIG. 6 are examples of the network graph.

FIG. 2 illustrates a state corresponding to the initial state before selection of the shortest path. The computing unit 352 first considers that the communication amounts of the links connecting the switches "A" to "G" are "0.0", as illustrated in 2-1 of FIG. 2. Moreover, when the communication paths between the communication apparatuses "s" and "a", "s" and "b", "s" and "c", and "s" and "d" are established, as illustrated in 2-2 of FIG. 2, the computing unit 352 sets in advance so that the switches communicate with each other using the communication amount "1.0".

First, the computing unit 352 determines the shortest path between the communication apparatuses "s" and "a" in communication with each other. As illustrated in 3-2 of FIG. 3, the computing unit 352 computes paths (1) A→B→D→E→G, (2) A→B→D→F→G, (3) A→C→D→E→G, and (4) A→C→D→F→G as the shortest paths between the communication apparatuses "s" and "a" which communicate with each other. Here, as illustrated in 3-2 of FIG. 3, the maximum communication amounts of the shortest paths (1) to (4) computed between the communication apparatuses "s" and "a" are all "0.0". Accordingly, since the maximum communication amounts of the shortest paths (1) to (4) computed between the communication apparatuses "s" and "a" are the same at the current time, the computing unit 352 arbitrarily selects, for example, the shortest path (2) among the computed shortest paths (1) to (4). Since the communication amount between the communication apparatuses "s" and "a" is set to "1.0", as illustrated in 4-1 of FIG. 4, the computing unit 352 develops the communication amount "1.0" in each of the links forming the selected shortest path (2).

Next, as illustrated in 4-2 of FIG. 4, the computing unit 352 computes paths (1) A→B→D→E→G, (2) A→B→D→F→G, (3) A→C→D→E→G, and (4) A→C→D→F→G as the shortest paths between the communication apparatuses "s" and "b" which communicate with each other. Here, as illustrated in 4-2 of FIG. 4, the maximum communication amounts of the shortest paths (1) to (4) computed between the communication apparatuses "s" and "b" are "1.0" or "0.0". Therefore, the computing unit 352 selects the shortest path (4) with the smallest maximum communication amount. Since the communication amount between the communication apparatuses "s" and "a" is set to "1.0", as illustrated in 5-1 of FIG. 5, the computing unit 352 develops the communication amount "1.0" in each of the links forming the selected shortest path (4).

Next, as illustrated in 5-2 of FIG. 5, the computing unit 352 computes paths (1) A→B→D→E→G, (2) A→B→D→F→G, (3) A→C→D→E→G, and (4) A→C→D→F→G as the shortest paths between the communication apparatuses "s" and "c" which communicate with each other. Here, as illustrated in 5-2 of FIG. 5, the maximum communication amounts of the shortest paths (1) to (4) computed between the communication apparatuses "s" and "c" are all "1.0". Accordingly, since the maximum communication amounts of the shortest paths (1) to (4) computed between the communication apparatuses "s" and "c" are the same at the current time, the computing unit 352 arbitrarily selects, for example, the shortest path (3) among the computed shortest paths (1) to (4). Since the communication amount between the communication apparatuses "s" and "c" is set to "1.0", as illustrated in 6-1 of FIG. 6, the computing unit 352 develops the communication amount "1.0" in each of the links forming the selected shortest path (3).

Next, as illustrated in 6-2 of FIG. 6, the computing unit 352 computes paths (1) A→B→D→E→G, (2) A→B→D→F→G, (3) A→C→D→E→G, and (4) A→C→D→F→G as the shortest paths between the communication apparatuses "s" and "d" which communicate with each other. Here, as illustrated in 6-2 of FIG. 6, the maximum communication amounts of the shortest paths (1) to (4) computed between the communication apparatuses "s" and "d" are "1.0" or "2.0". Therefore, the computing unit 352 selects the shortest path (2) with the smallest maximum communication amount. Since the communication amount between the communication apparatuses "s" and "d" is set to "1.0", the computing unit 352 develops the communication amount "1.0" in each of the links forming the selected shortest path (2), as in the case where the above-described different shortest path is selected.

Figure 7:
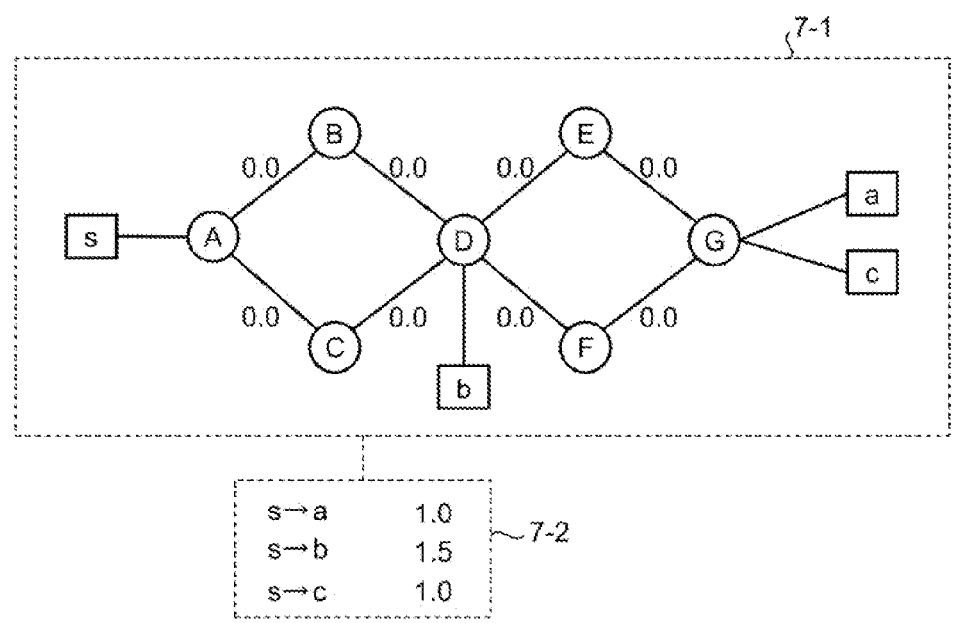
FIG. 7 is a diagram illustrating a second case to describe the initial path determination method.
Figure 8:
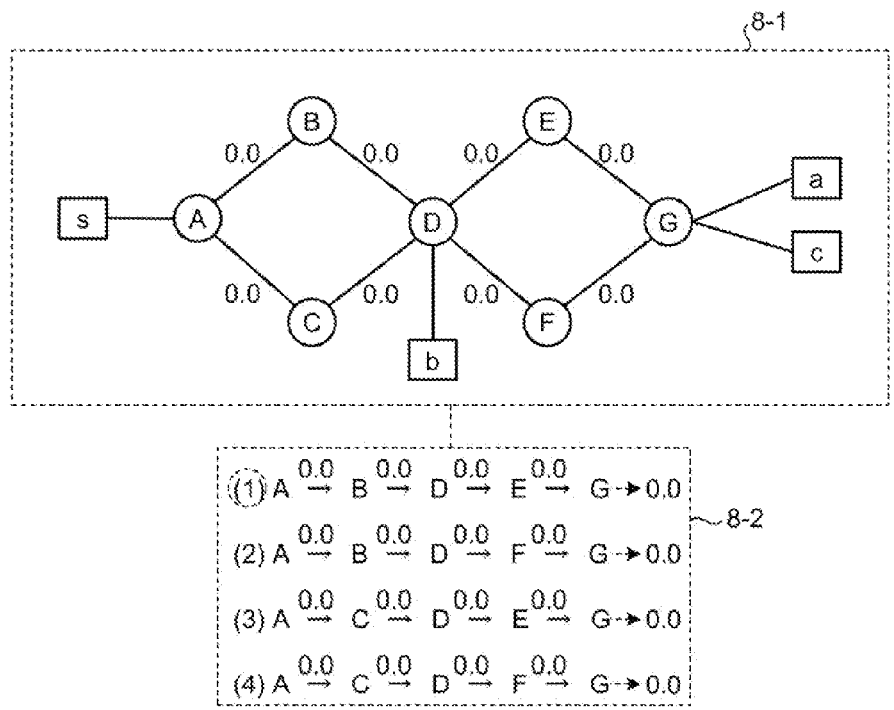
FIG. 8 is a diagram illustrating the second case to describe the initial path determination method.
Figure 9:
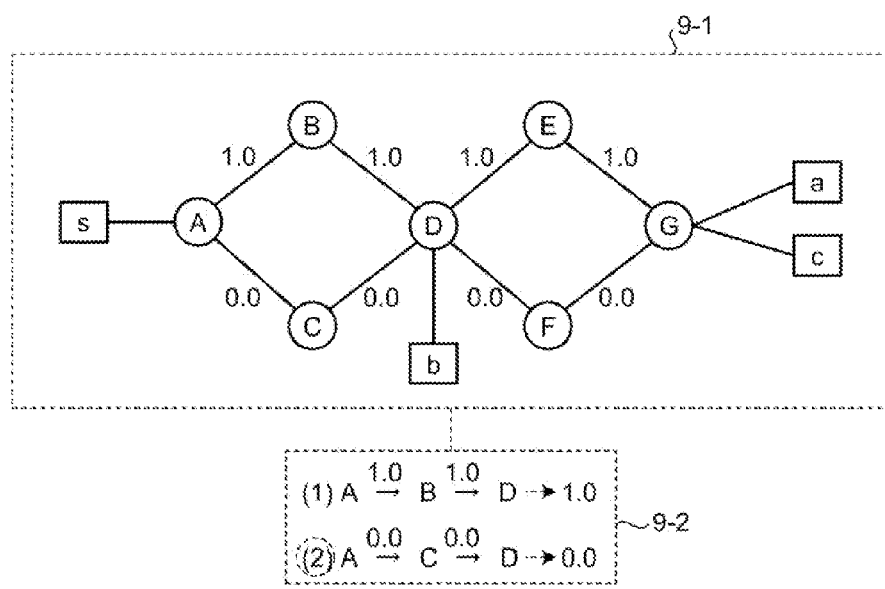
FIG. 9 is a diagram illustrating the second case to describe the initial path determination method.
Figure 10:
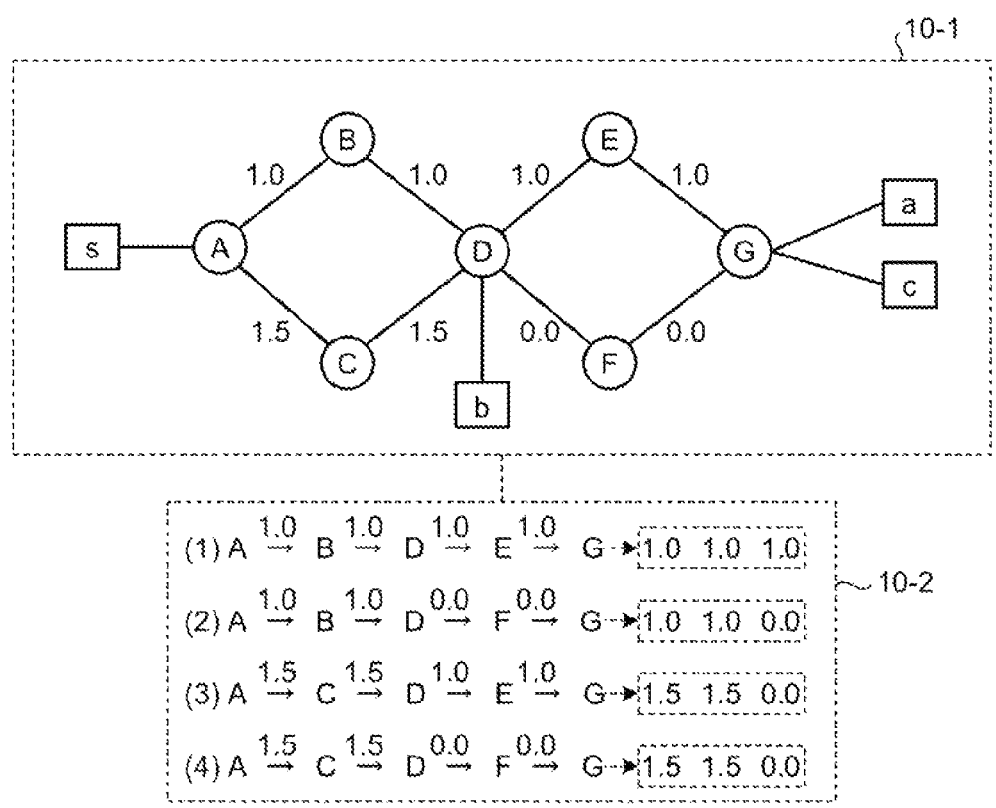
FIG. 10 is a diagram illustrating the second case to describe the initial path determination method.

The initial path determination method will be described in the second case illustrated in FIGS. 7 to 10. In FIGS. 7 to 10, "s" and "a" to "d" denote communication apparatuses, that is, so-called end nodes communicating with each other. In FIGS. 7 to 10, "A" to "G" denote the switches transmitting packets exchanged between the switches "s"⇔"a", the switches "s"⇔"b", the switches "s"⇔"c", and the switches "s"⇔"d". In addition, 7-1 illustrated in FIG. 7, 8-1 illustrated in FIG. 8, 9-1 illustrated in FIG. 9, and 10-1 illustrated in FIG. 10 are examples of the network graph.

FIG. 7 illustrates a state corresponding to the initial state before selection of the shortest path. The computing unit 352 first considers that the communication amounts of the links connecting the switches "A" to "G" are "0.0", as illustrated in 7-1 of FIG. 7. Moreover, when the communication paths between the communication apparatuses "s" and "a", "s" and "b", and "s" and "c" are established, as illustrated in 7-2 of FIG. 7, the computing unit 352 sets in advance so that the switches communicate with each other using the communication amounts "1.0", "1.5", and "1.0", respectively.

First, the computing unit 352 determines the shortest path between the communication apparatuses "s" and "a" which communicate with each other. As illustrated in 8-2 of FIG. 8, the computing unit 352 computes paths (1) A→B→D→E→G, (2) A→B→D→F→G, (3) A→C→D→E→G, and (4) A→C→D→F→G as the shortest paths between the communication apparatuses "s" and "a" which communicate with each other. Here, as illustrated in 8-2 of FIG. 8, the maximum communication amounts of the shortest paths (1) to (4) computed between the communication apparatuses "s" and "a" are all "0.0". Accordingly, since the maximum communication amounts of the shortest paths (1) to (4) computed between the communication apparatuses "s" and "a" are the same at the current time, the computing unit 352 arbitrarily selects, for example, the shortest path (1) among the computed shortest paths (1) to (4). Since the communication amount between the communication apparatuses "s" and "a" is set to "1.0", as illustrated in 9-1 of FIG. 9, the computing unit 352 develops the communication amount "1.0" in each of the links forming the selected shortest path (1).

Next, as illustrated in 9-2 of FIG. 9, the computing unit 352 computes paths (1) A→B→D and (2) A→C→D as the shortest paths between the communication apparatuses "s" and "b" which communicate with each other. Here, as illustrated in 9-2 of FIG. 9, the maximum communication amounts of the shortest paths (1) and (2) computed between the communication apparatuses "s" and "b" are "1.0" or "0.0". Therefore, the computing unit 352 selects the shortest path (2) with the smallest maximum communication amount. Since the communication amount between the communication apparatuses "s" and "b" is set to "1.5", the computing unit 352 develops the communication amount "1.0" in each of the links forming the selected shortest path (2), as in the case where the above-described different shortest path is selected.

Next, as illustrated in 10-2 of FIG. 10, the computing unit 352 computes paths (1) A→B→D→E→G, (2) A→B→D→F→G, (3) A→C→D→E→G, and (4) A→C→D→F→G as the shortest paths between the communication apparatuses "s" and "c" which communicate with each other. Here, as illustrated in 10-2 of FIG. 10, the maximum communication amounts of the shortest paths (1) and (2) and the maximum communication amounts of the shortest paths (3) and (4) computed between the communication apparatuses "s" and "c" are "1.0" and "1.5", respectively. Here, the computing unit 352 first acquires the shortest paths (1) and (2) with the relatively small maximum communication amount. Then, the computing unit 352 compares the maximum communication amounts of the second links of the acquired shortest paths (1) and (2) to each other. Since the maximum communication amounts of the second links of the acquired shortest paths (1) and (2) are all "1.0" as the comparison result, the computing unit 352 continues to compare the maximum communication amounts of the third links. Since the maximum communication amount "0.0" of the third link of the shortest path (2) is smaller than the maximum communication amount "1.0" of the third link of the shortest path (1) as the comparison result, the shortest path (2) is selected. Since the communication amount between the communication apparatuses "s" and "c" is set to "1.0", the computing unit 352 develops the communication amount "1.0" in each of the links forming the selected shortest path (2), as in the case where the above-described different shortest path is selected.

Thus, the computing unit 352 determines the initial path, along which the communication amounts of the respective links connecting the switches 100 are distributed most efficiently, between the communication pairs on the network graph.

After the initial path is determined for respective communication pairs, the computing unit 352 computes the communication amounts of respective turns formed along the initial path determined on the network graph based on the communication amounts set between the communication pairs. Here, the computing unit 352 adds the communication amount of overlapping turn to a portion in which the turns overlap in the initial path.

Based on the computed communication amount of respective turns, the determination unit 353 determines prohibition turns in which packet communication is not executed. For example, the determination unit 353 develops the communication amount of respective turns computed by the computing unit 352 on the network graph generated by the generation unit 351 and determines the prohibition turns by applying an Up/down method or a TP method.

The determination unit 353 determines the prohibition turn in the following way, for example, when the UP/down method is applied. First, the determination unit 353 tentatively determines a prohibition turn when each switch 100 is set to be on the top. Subsequently, the determination unit 353 calculates a sum value of the communication amounts of the prohibition turn for each of the tentatively determined prohibition turn. Then, the determination unit 353 determines the tentatively determined prohibition turn with the minimum sum value of the turn communication amounts as the final prohibition turn. Thus, the determination unit 353 determines the prohibition turn by applying the Up/down method.

The determination unit 353 determines the prohibition turn in the following way, for example, when the TP method is applied. First, in each switch 100 on the network graph, the determination unit 353 calculates the sum value of the communication amounts of turns formed in the switch 100. In other words, in each switch 100 on the network graph, the determination unit 353 calculates the sum value of the communication amounts of packets input and output through a combination of the input port and the counter output port of the switch 100.

Then, the determination unit 353 determines, as the prohibition turn, the turn passing through the switch with the minimum sum value among the communication amounts of the respective turns. Subsequently, the determination unit 353 deletes the switch 100 and the links connected to the switch 100 and the computing unit 352 recalculates the communication amounts of the turns in the remaining switches. In addition, the determination unit 353 recalculates the sum value of the communication amounts of respective turns in the same way as the above-described way and determines the turn passing through the switch with the minimum sum value as the prohibition turn. The determination unit 353 repeats this process until the turns formed on the network graph are all removed. Thus, the determination unit 353 determines the prohibition turns by applying the TP method.

Figure 11:
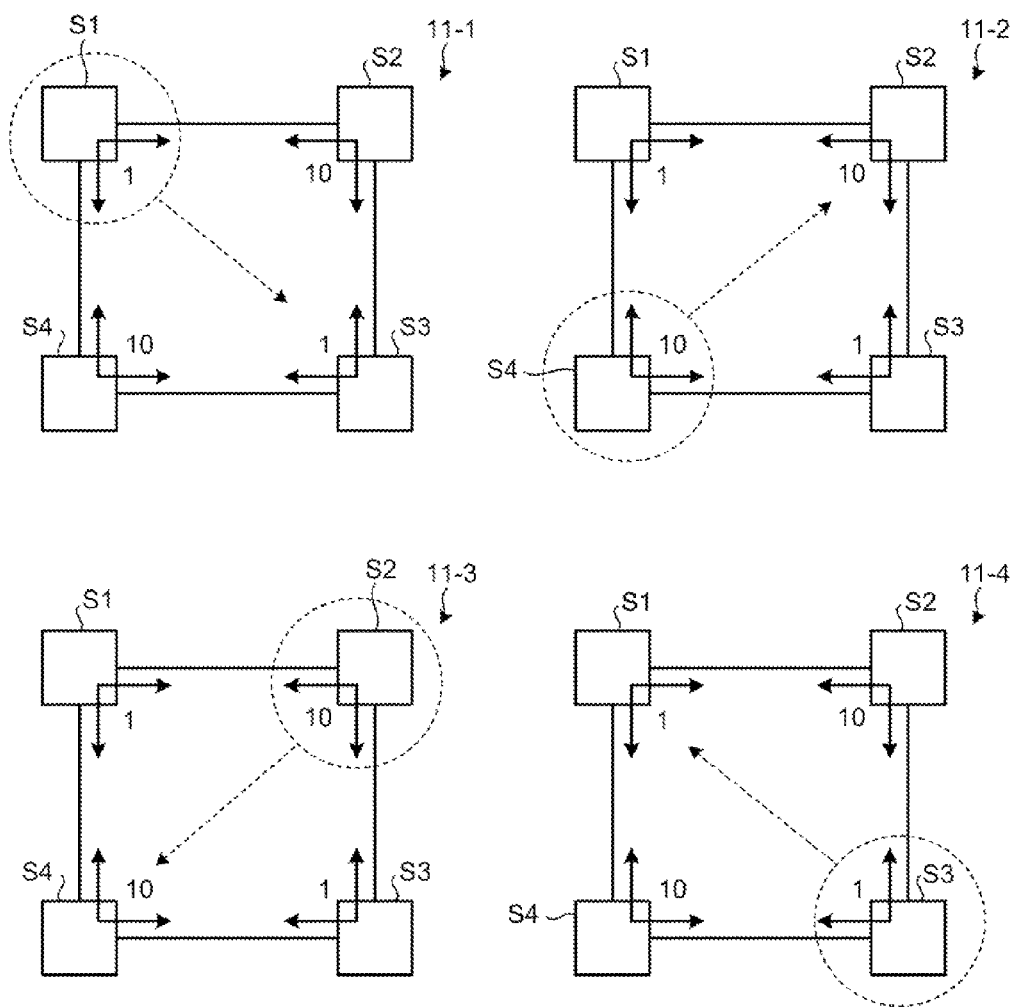
FIG. 11 is a diagram illustrating a prohibition turn determination method to which an Up/down method is applied according to the first embodiment.
Figure 12:
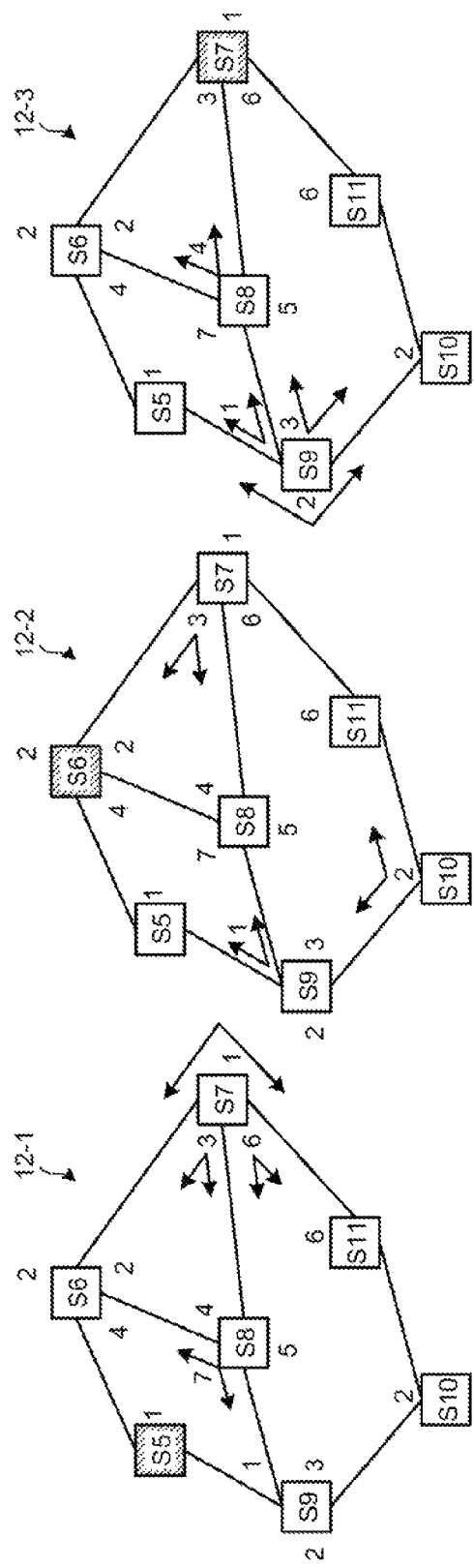
FIG. 12 is a diagram illustrating the prohibition turn determination method to which an Up/down method is applied according to the first embodiment.

Hereinafter, the prohibition turn determination method executed by the determination unit 353 will be described with reference to FIGS. 11 to 13. First, the prohibition turn determination method used by applying the Up/down method will be described with reference to FIGS. 11 and 12. FIGS. 11 and 12 are diagrams illustrating the prohibition turn determination method used by applying the Up/down method according to the first embodiment. In FIG. 11, the prohibition turn determination method is illustrated when the Up/down method is applied to a simple network graph. In FIG. 12, the prohibition turn determination method is illustrated when the Up/down method is applied to a network graph more complicated than that of FIG. 11.

The prohibition turn determination method will be described with reference to FIG. 11. In FIG. 11, S1 to S4 denote switches. In FIG. 11, each arrow passing through each of the switches S1 to S4 indicates a turn and a numeral written together with the arrow indicates a turn communication amount. Here, 11-1 of FIG. 11 illustrates that a tentative prohibition turn determined when the switch S1 is on the top is indicated by an arrow passing through the switch S3 present on a diagonal line of the switch S1 by the Up/down method. In addition, 11-2 of FIG. 11 illustrates that a tentative prohibition turn determined when the switch S4 is on the top is indicated by an arrow passing through the switch S2 present on a diagonal line of the switch S4 by the Up/down method. In addition, 11-3 of FIG. 11 illustrates that a tentative prohibition turn determined when the switch S2 is on the top is indicated by an arrow passing through the switch S4 present on a diagonal line of the switch S2 by the Up/down method. In addition, 11-4 of FIG. 11 illustrates that a tentative prohibition turn determined when the switch S3 is on the top is indicated by an arrow passing through the switch S1 present on a diagonal line of the switch S3 by the Up/down method.

As illustrated in 11-1 of FIG. 11, the turn communication amount of tentative prohibition turn is "1" when the switch S1 is on the top. In addition, as illustrated in 11-2 of FIG. 11, the turn communication amount of tentative prohibition turn is "10" when the switch S4 is on the top. In addition, as illustrated in 11-3 of FIG. 11, the turn communication amount of tentative prohibition turn is "10" when the switch S2 is on the top. In addition, as illustrated in 11-4 of FIG. 11, the turn communication amount of tentative prohibition turn is "1" when the switch S3 is on the top. In the cases illustrated in FIG. 11, the turn communication amount of tentative prohibition turn is the minimum value "1" when the switch S1 or S3 is on the top. Therefore, the determination unit 353 determines, as the final prohibition turn, one of the tentative prohibition turns determined when the switches S1 and S3 are on the top.

Next, the prohibition turn determination method will be described with reference to FIG. 12. In FIG. 12, S5 to S11 denote switches. In FIG. 12, each arrow passing through each of the switches S5 to S11 indicates a turn and a numeral written together with the arrow indicates a turn communication amount. Here, 12-1 of FIG. 12 illustrates that a tentative prohibition turn determined when the switch S5 is on the top is indicated by an arrow by the Up/down method. In addition, 12-2 of FIG. 12 illustrates that a tentative prohibition turn determined when the switch S6 is on the top is indicated by an arrow by the Up/down method. In addition, 12-3 of FIG. 12 illustrates that a tentative prohibition turn determined when the switch S7 is on the top is indicated by an arrow by the Up/down method.

As illustrated in 12-1 of FIG. 12, a sum value of the turn communication amounts of tentative prohibition turn is "17" when the switch S5 is on the top. In addition, as illustrated in 12-2 of FIG. 12, a sum value of the turn communication amounts of tentative prohibition turn is "6" when the switch S6 is on the top. In addition, as illustrated in 12-3 of FIG. 12, a sum value of the turn communication amounts of tentative prohibition turn is "10" when the switch S7 is on the top. Thus, the determination unit 353 calculates the sum value of the turn communication amounts of tentative prohibition turn when the respective switches S5 to S11 are on the top, and then determines the tentative prohibition turn with the minimum sum value as the final prohibition turn.

Next, the prohibition turn determination method used by applying the TP method will be described with reference to FIG. 13. FIG. 13 is a diagram illustrating a prohibition turn determination method used by applying the TP method according to the first embodiment. In FIG. 13, S5 to S11 denote switches. Each arrow passing through the switches S5 to S11 illustrated in FIG. 13 indicates a turn and a numeral written together with the arrow indicates a turn communication amount. In addition, the prohibition turn is determined from 13-1 to 13-6 illustrated in FIG. 13 by applying the TP method.

Figure 13:
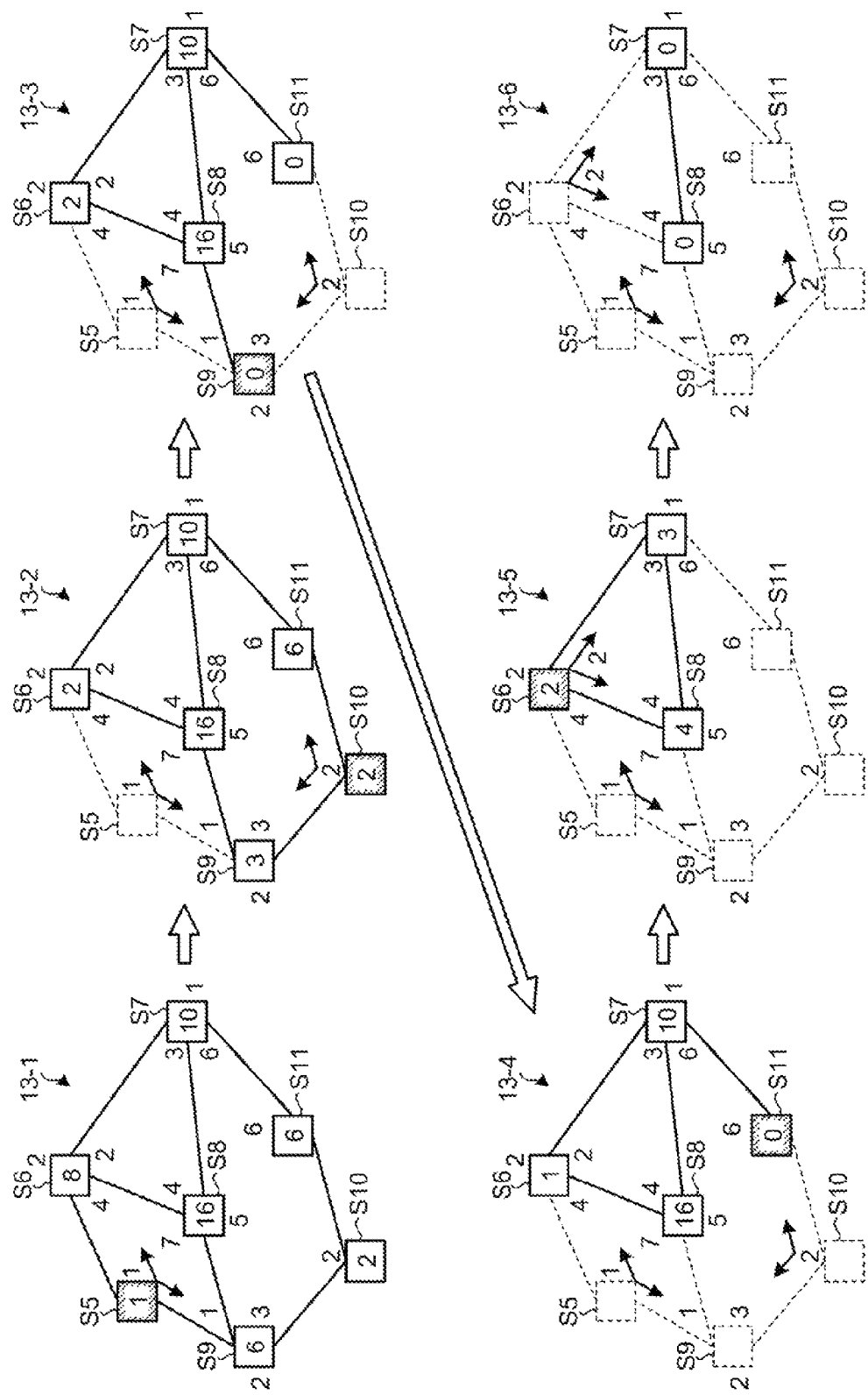
FIG. 13 is a diagram illustrating the prohibition turn determination method to which is a TP method is applied according to the first embodiment.

As illustrated in 13-1 of FIG. 13, a sum value of the communication amounts of turn passing through the switch S5 is "1", which is the minimum value. Accordingly, the determination unit 353 determines the turn passing through the switch S5 as the prohibition turn.

Subsequently, as illustrated in 13-2 of FIG. 13, the switch S5 and the adjacent links connected to the switch S5 are deleted, and then sum values of the communication amounts of turns passing through the switches S6 and S10 are each "2", which is the minimum value. Accordingly, the determination unit 353 determines one of the switches S6 and S10 as the prohibition turn. In FIG. 13, the determination unit 353 determines the turn passing through the switch S10 as the prohibition turn.

Subsequently, as illustrated in 13-3 of FIG. 13, the switch S10 and the adjacent links connected to the switch S10 are deleted, and then sum values of the communication amounts of turns passing through the switches S9 and S11 are each "0", which is the minimum value. Accordingly, the determination unit 353 determines one of the switches S9 and S11 as the prohibition turn. In FIG. 13, the determination unit 353 determines the turn passing through the switch S9 as the prohibition turn.

Subsequently, as illustrated in 13-4 of FIG. 13, the switch S9 and the adjacent links connected to the switch S9 are deleted, and then sum value of the communication amounts of turn passing through the switch S11 are "0", which is the minimum value. Accordingly, the determination unit 353 determines the turn passing through the switch S11 as the prohibition turn.

Subsequently, as illustrated in 13-5 of FIG. 13, the switch S11 and the adjacent links connected to the switch S11 are deleted, and then sum value of the communication amounts of turn passing through the switch S6 are "2", which is the minimum value. Accordingly, the determination unit 353 determines the turn passing through the switch S6 as the prohibition turn. As illustrated in 13-6 of FIG. 13, the switch S6 and the adjacent links connected to the switch S6 are deleted, and then the turns formed in the network graph are all removed. Accordingly, the determination unit 353 completes the determination of the prohibition turn.

Referring back to FIG. 1, the calculation unit 354 calculates the final communication path to avoid the prohibition turn determined by the determination unit 353, that is, a routing between the communication pair communicating with each other via the network 1. The calculation unit 354 determines the final routing by the same method as the initial path determination method described with reference to FIGS. 2 to 6 and FIGS. 7 to 10. For example, the calculation unit 354 calculates the shortest paths of a certain communication pair to avoid the prohibition turn. Subsequently, the calculation unit 354 selects the shortest path with the smallest maximum communication amount among the plurality of shortest paths calculated for the communication pair. Then, the calculation unit 354 calculates the communication amount of the links used for the selected path and calculates the shortest paths for the next communication pair. By executing the above-described processes for all the communication pairs, the final routing, that is, the final communication path is calculated to execute the actual communication.

Figure 14:
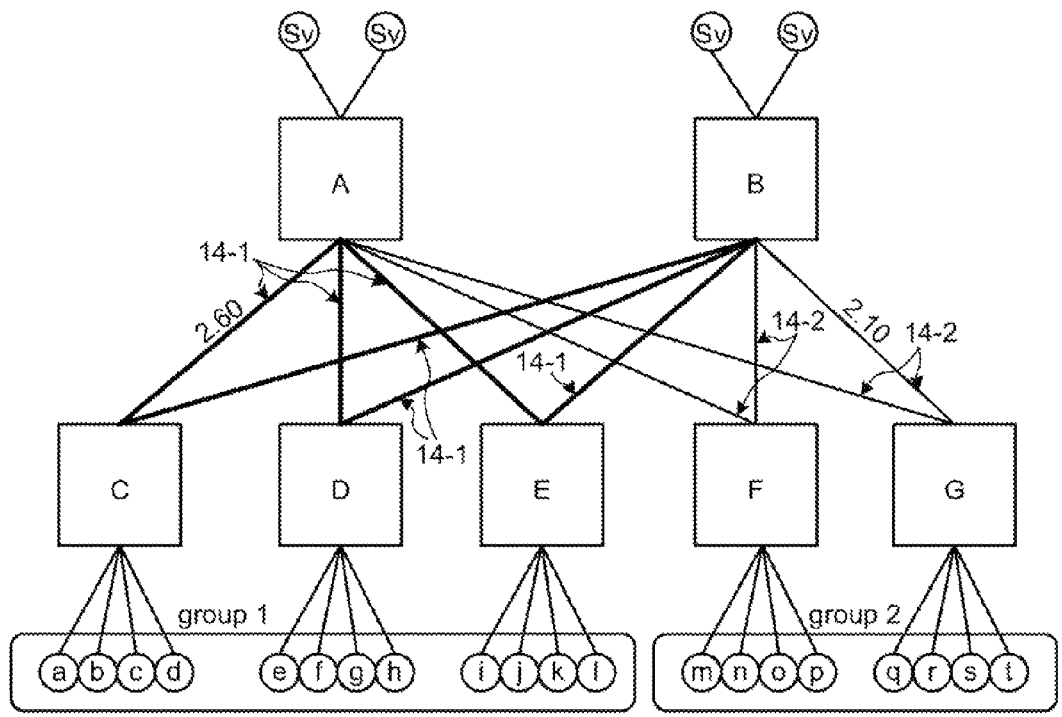
FIG. 14 is a diagram illustrating the communication amounts of the respective links according to the first embodiment.

Hereinafter, a prohibition turn determination method used by applying the Up/down method in a given network will be described with reference to FIGS. 14 to 19. FIG. 14 is a diagram illustrating the communication amounts of the respective links according to the first embodiment. In FIG. 14, a network graph formed by modeling a given network is illustrated. In FIG. 14, "A" to "G" denote switches. In FIG. 14, "a" to "t" denote server groups executing parallel processing, "a" to "l" belong to a first group, and "m" to "t" belong to a second group. In FIG. 14, "Sv" denotes a server performing input and output of files.

Communication is closely executed between "a" to "l" belonging to the first group illustrated in FIG. 14 and between "m" to "t" belonging to the second group illustrated in FIG. 14, whereas no communication is executed between the groups. In addition, "a" to "l" belonging to the first group illustrated in FIG. 14 and "m" to "t" belonging to the second group illustrated in FIG. 14 communicate with "Sv" illustrated in FIG. 14. In addition, "Sv" illustrated in FIG. 14 receives file input/output processing from "a" to "l" belonging to the first group illustrated in FIG. 14 and "m" to "t" belonging to the second group illustrated in FIG. 14 and returns responses thereto. In addition, "Sv" illustrated in FIG. 14 communicates with another "Sv".

The communication amount in the network illustrated in FIG. 14 is defined as follows. That is, one server belonging to the server group serving as a packet transmission source defines the communication amount when the server transmits packets to all of the servers belonging to the server group serving as a packet reception destination. Moreover, by responding the same communication amount as the received communication amount as a replay, a sum value of the transmission communication amount and the response communication amount are defined as the communication amounts.

For example, the communication amount is set to "0.9" when communication is executed within the server group belonging to the first group illustrated in FIG. 14. In addition, the communication amount is also set to "0.9" when communication is executed within the server group belonging to the second group illustrated in FIG. 14. Here, the server group belonging to the first group corresponds to one of the groups of "a" to "d", the groups of "e" to "h", and the groups of "i" to "l" illustrated in FIG. 14. In addition, the server group belonging to the second group corresponds to one of the groups "m" to "p" and the groups of "q" to "t" illustrated in FIG. 14. In addition, the communication amount is set to "0.1" when the server "Sv" inputting and outputting files communicates with the servers "a" to "l" belonging to the first group illustrated in FIG. 14 or the servers "m" to "t" belonging to the second group illustrated in FIG. 14. In addition, the communication amount is set to "0.1" when communication is executed between the servers "Sv" inputting and outputting files. At this time, the communication amount of links illustrated in 14-1 of FIG. 14 is "2.6" and the communication amount of links illustrated in 14-2 of FIG. 14 is "2.1".

In FIG. 14, the computing unit 352 determines the initial path of the communication pair communicating according to the initial path determination method described above with reference to FIGS. 2 to 6 and FIGS. 7 to 10. In addition, the computing unit 352 computes the turn communication amount of initial path. For example, hereinafter, a case will be described in which close communication is executed between "a" to "d" belonging to the first group illustrated in FIG. 14 and "e" and "g" belonging to the first group illustrated in FIG. 14 and close communication is executed between "e" to "h" belonging to the first group illustrated in FIG. 14 and "a" and "c" belonging to the first group illustrated in FIG. 14.

First, a case will be described in which communication is executed between "a" belonging to the first group illustrated in FIG. 14 and "e" and "g" belonging to the first group. When a route passing through the switch "A" is determined as the initial path along which communication is executed between "a" and "e" and between "a" and "g", a turn passing through the switch "A" is formed. For example, a turn is formed when a packet transmitted from "a" to "e" is transmitted from the switch "C" to the switch "D" via the switch "A". This turn is simply referred to as a turn CAD. In addition, a turn is formed when a response packet responding from "e" to "a" is transmitted from the switch "D" to the switch "C" via the switch "A". Thus turn is simply referred to as DAC. Here, since the communication amount in the first group is set to "0.9", the communication amount is calculated to "0.075" by dividing 0.9 by 12 when the communication is executed between "a" and "e". Therefore, the turn communication amounts of the turn CAD and the turn DAC is each "0.075".

As in the case where the communication is executed between "a" and "e", the above-described turn CAD is formed when the packet transmitted from "a" to "g" is transmitted from the switch "C" to the switch "D" via the switch "A". In addition, the above-described turn DAC is formed when the response packet responding from "g" to "a" is transmitted from the switch "D" to the switch "A" via the switch "A". Here, since the communication is "0.075" amount during the communication between "a" and "g", as in the case where the communication is executed between "a" and "e", the turn communication amounts of the turns CAD and CAC are each "0.075". Therefore, the turn communication is "0.150" when the communication is executed between "a" belonging to the first group and "e" and "g" belonging to the first group.

The turn communication amount is also "0.150" when the communication is executed between "b" belonging to the first group illustrated in FIG. 14 and "e" and "g" belonging to the first group. In addition, the turn communication amount is also "0.150" when the communication is executed between "c" belonging to the first group illustrated in FIG. 14 and "e" and "g" belonging to the first group. In addition, the turn communication amount is also "0.150" when the communication is executed between "d" belonging to the first group illustrated in FIG. 14 and "e" and "g" belonging to the first group. Accordingly, a sum of the turn communication amounts is "0.600" when the communication is executed between "a" to "d" belonging to the first group illustrated in FIG. 14 and "e" and "g" belonging to the first group.

Next, a turn communication amount will be described when the communication is executed between "e" to "h" belonging to the first group illustrated in FIG. 14 and "a" and "c" belonging to the first group. The turn communication amount can also be calculated when the communication is executed between "e" to "h" belonging to the first group and "a" and "c" belonging to the first group, as in the case where the communication is executed between "a" to "d" belonging to the first group and "e" and "g" belonging to "e" and "g" belonging to the first group. Accordingly, a sum of the turn communication amounts is "0.600" when the communication is executed between "e" to "h" belonging to the first group and "a" and "c" belonging to the first group. As a result, the turn communication amount of the above-described turns CAD and DAC is "1.2".

Figure 15:
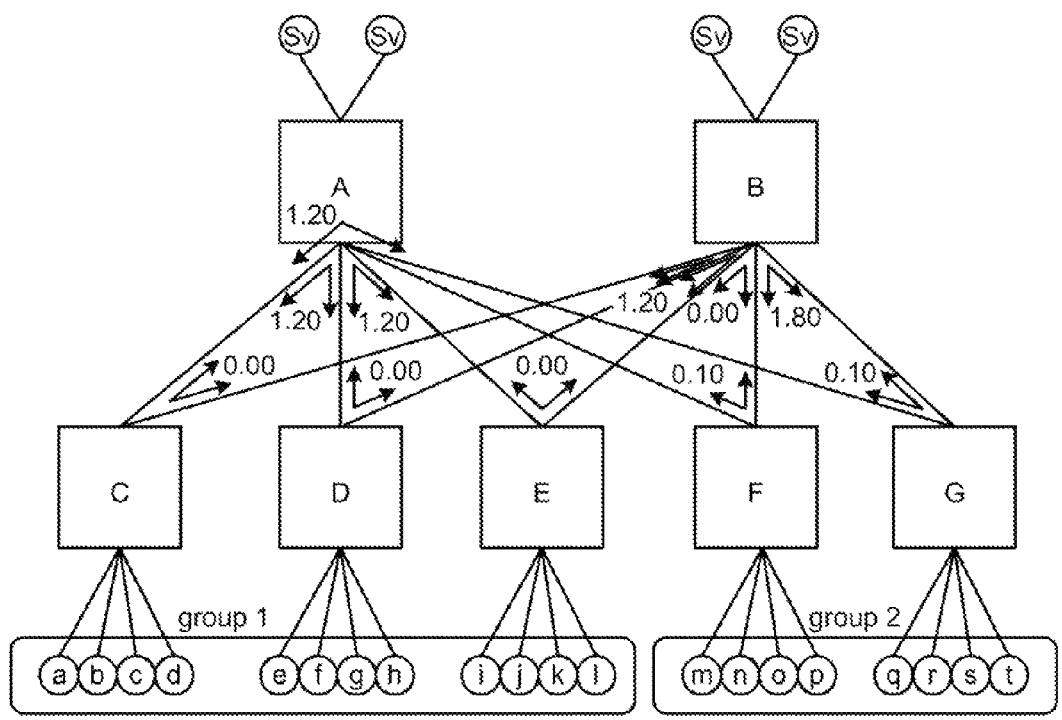
FIG. 15 is a diagram illustrating the communication amounts of respective turns according to the first embodiment.

In this way, the turn communication amount is calculated along the initial path by applying the calculation method of the turn communication amount of the turns CAD and DAC, as illustrated in FIG. 15. FIG. 15 is a diagram illustrating the communication amount of each turn according to the first embodiment. Each arrow illustrated in FIG. 15 indicates the turn and a numeral written together with each arrow indicates the turn communication amount.

Figure 16:
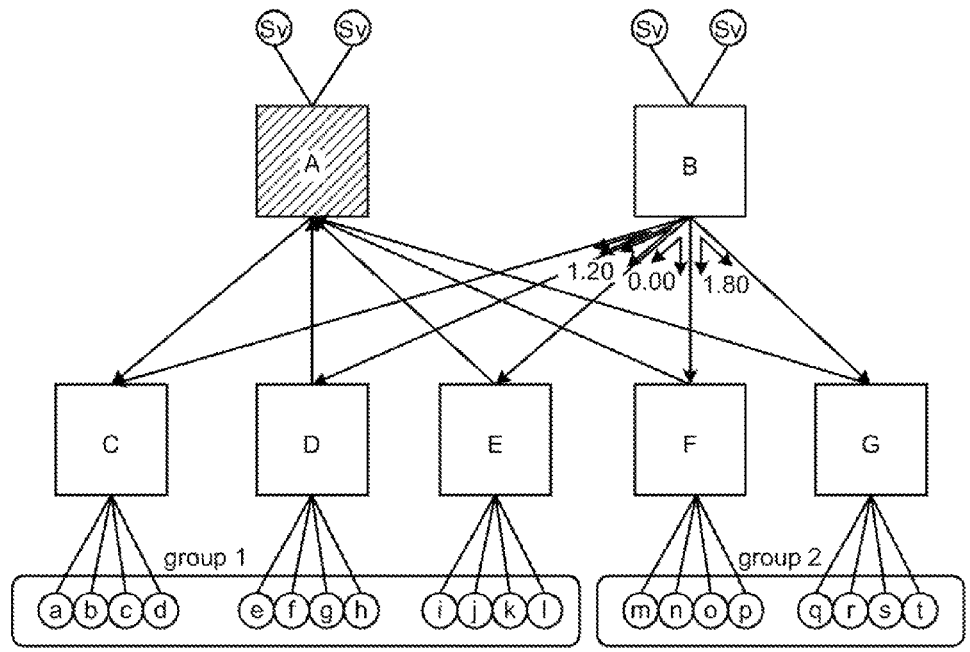
FIG. 16 is a diagram illustrating the communication amount of prohibition turn when a switch A is on the top according to the first embodiment.
Figure 17:
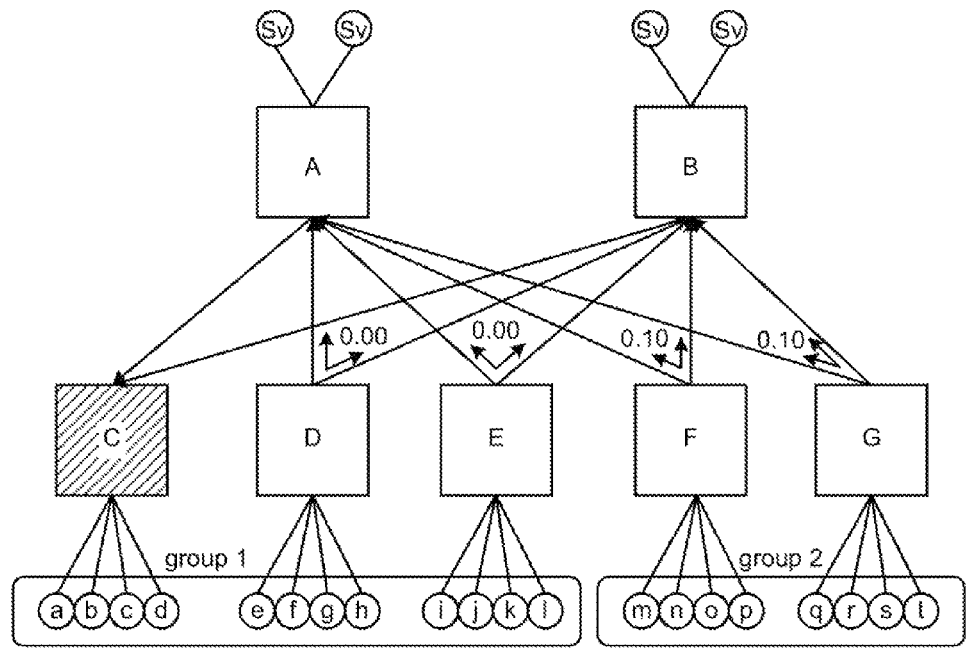
FIG. 17 is a diagram illustrating the communication amount of prohibition turn when a switch C is on the top according to the first embodiment.
Figure 18:
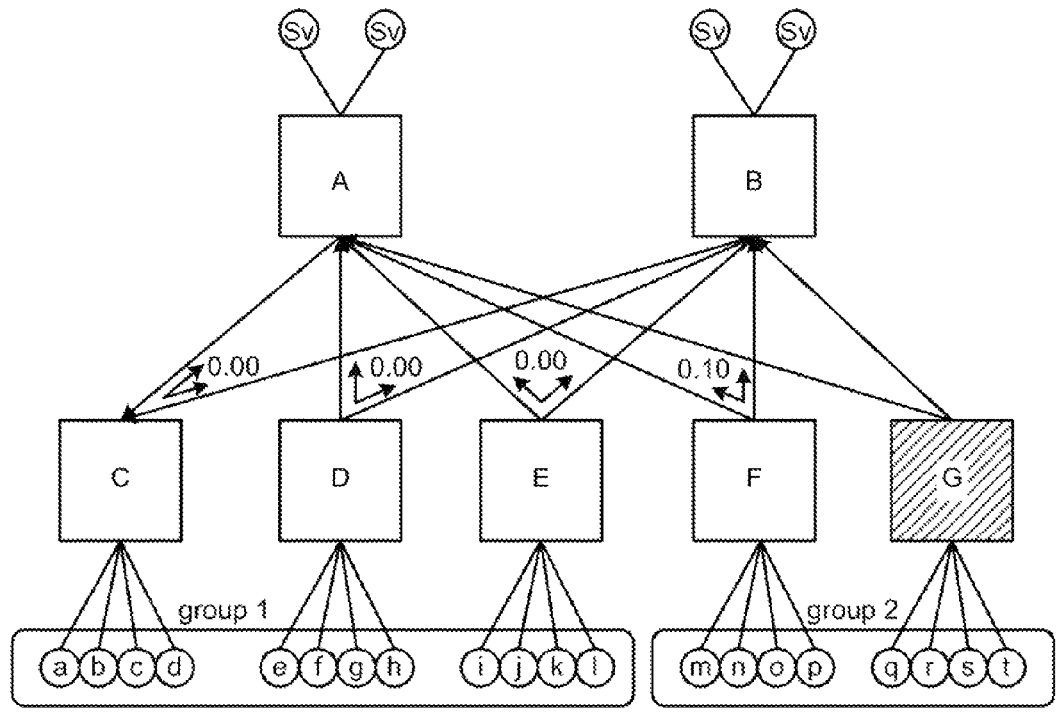
FIG. 18 is a diagram illustrating the communication amount of prohibition turn when a switch G is on the top according to the first embodiment.

When the computing unit 352 completely calculates the communication amounts of respective turns along the initial path, the determination unit 353 determines the prohibition turn based on the communication amount of respective turns. Hereinafter, referring to FIGS. 16 to 18, a case will be described in which the determination unit 353 determines the prohibition turn. FIG. 16 is a diagram illustrating the communication amount of prohibition turn when the switch A is on the top according to the first embodiment. FIG. 17 is a diagram illustrating the communication amount of prohibition turn when the switch C is on the top according to the first embodiment. FIG. 18 is a diagram illustrating the communication amount of prohibition turn when the switch G is on the top according to the first embodiment.

As indicated by the arrows in FIG. 16, the determination unit 353 determines the prohibition turn by the Up/down method when the switch "A" is selected as a top switch. Subsequently, as illustrated in FIG. 17, the determination unit 353 determines the prohibition turn by the Up/down method when the switch "C" is selected as a top switch". Subsequently, as illustrated in FIG. 18, the determination unit 353 determines the prohibition turn by the Up/down method when the switch "G" is selected as a top switch". In this way, the determination unit 353 determines the respective prohibition turns when all of the switches are selected as the top switch, and then determines the final prohibition turn with the smallest sum value of the communication amounts of prohibition turns. The sum value of the communication amounts of prohibition turns is the smallest when the switch "G" is selected as the top switch. At this time, the determination unit 353 determines, as the final prohibition turn, the prohibition turn determined when the switch "G" is selected as the top switch.

Figure 19:
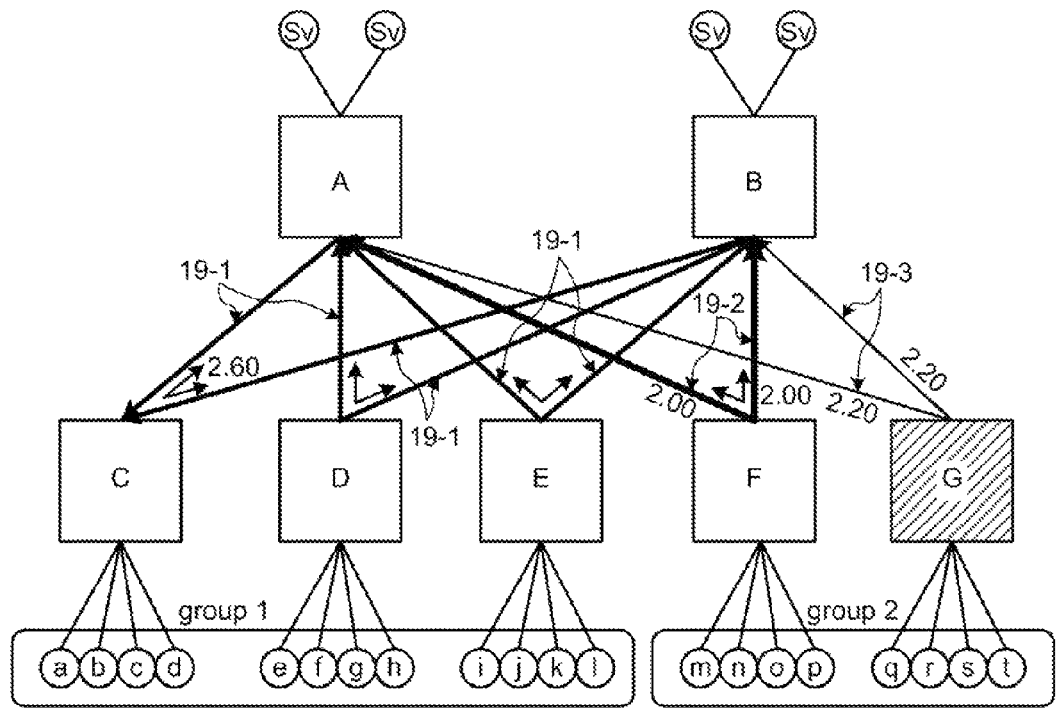
FIG. 19 is a diagram illustrating the communication amounts of respective links of the final path according to the first embodiment.

After the determination unit 353 determines the prohibition turn, the calculation unit 354 calculates the final routing to be used to avoid the prohibition turn determined by the determination unit 353, that is, the final communication path to be used to execute the actual communication. FIG. 19 is a diagram illustrating the communication amounts of respective links of the final path according to the first embodiment. In FIG. 19, the communication amounts of respective links of the final communication path calculated to avoid the prohibition turn are illustrated, for example, when the switch "G" is selected as the top switch. For example, each communication amount of link indicated by 19-1 illustrated in FIG. 19 is "2.60", each communication amount of link indicated by 19-2 is "2.00", and each communication amount of ink indicated by 19-3 is "2.20". The average value, the maximum value, and the standard deviation of the communication amounts of respective links of the final communication path are "2.40", "2.60", and "0.260", respectively.

Figure 20:
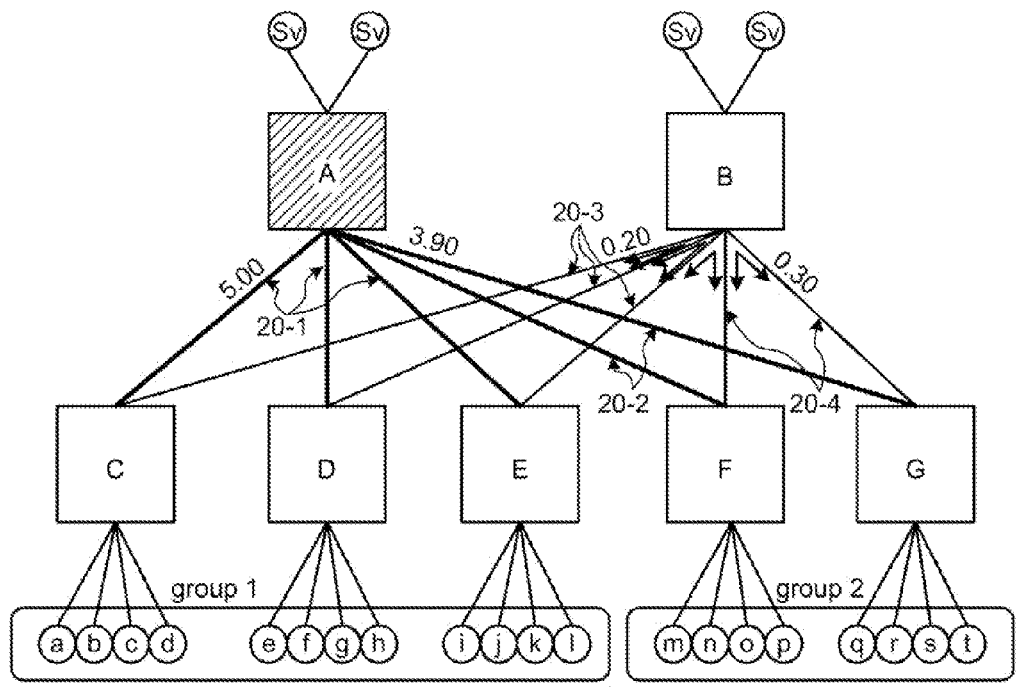
FIG. 20 is a diagram illustrating the communication amounts of respective links of the communication path when the prohibition turn is determined using the switch "A" as the top switch according to the first embodiment.
Figure 21:
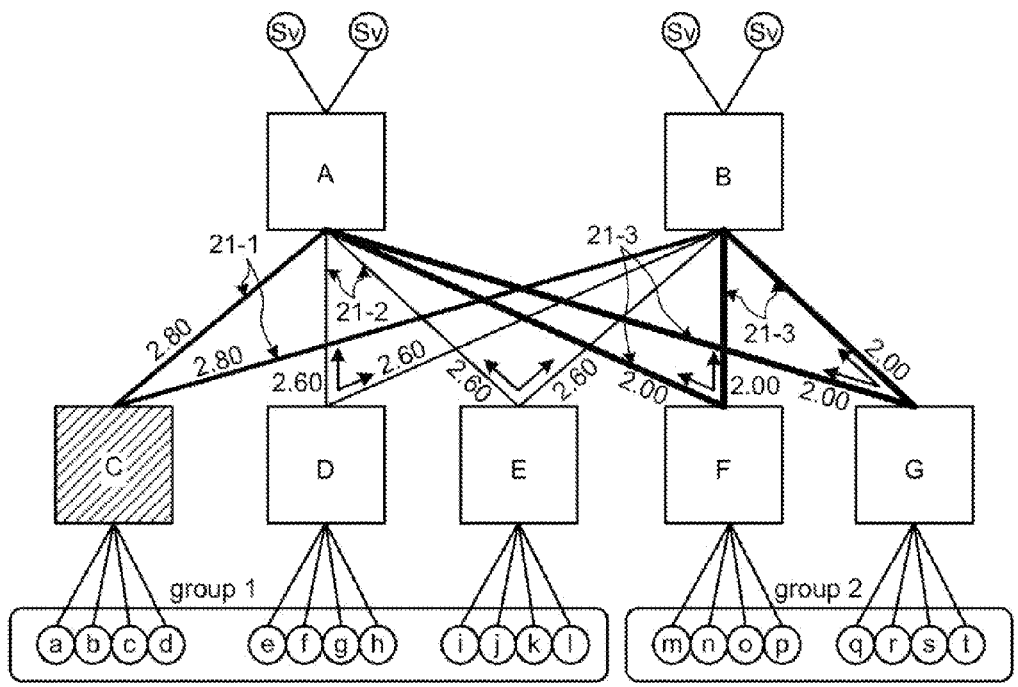
FIG. 21 is a diagram illustrating the communication amounts of respective links of the communication path when the prohibition turn is determined using the switch "C" as the top switch according to the first embodiment.

Here, for example, referring to FIGS. 20 and 21, the communication amounts of respective links in the case of the prohibition turn determined by selecting the switch "G" as the top switch are compared to the communication amounts of respective links in the case of the prohibition turn determined by selecting the switches other than the switch "G" as the top switch. FIG. 20 is a diagram illustrating the communication amounts of respective links of the communication path when the prohibition turn is determined using the switch "A" as the top switch according to the first embodiment. FIG. 21 is a diagram illustrating the communication amounts of respective links of the communication path when the prohibition turn is determined using the switch "C" as the top switch according to the first embodiment.

As illustrated in FIG. 20, the communication amount of each link indicated by 20-1 is "5.00", the communication amount of each link indicated by 20-2 is "3.90", the communication amount of each link indicated by 20-3 is "0.20", and the communication amount of each link indicated by 20-4 is "0.30". The average value, the maximum value, and the standard deviation of the communication amounts of respective links of the final communication path are "2.40", "5.00", and "2.250", respectively.

As illustrated in FIG. 21, the communication amount of each link indicated by 21-1 is "2.80", the communication amount of each link indicated by 21-2 is "2.60", and the communication amount of each link indicated by 21-3 is "2.00". The average value, the maximum value, and the standard deviation of the communication amounts of respective links of the final communication path are "2.40", "2.80", and "0.344", respectively.

Here, as illustrated in FIG. 19, the standard deviation of the communication amounts of respective links is "0.260" when the prohibition turn is determined by using the switch "G" as the top switch. As illustrated in FIG. 20, the standard deviation of the communication amounts of respective links is "2.250" when the prohibition turn is determined by using the switch "A" as the top switch. As illustrated in FIG. 21, the standard deviation of the communication amounts of respective links is "2.250" when the prohibition turn is determined by using the switch "C" as the top switch. Thus, it can be understood that the communication amounts of respective links of the final communication path are more efficiently distributed when the prohibition turn is determined by using the switch "G" as the top switch than when the prohibition turn is determined by using the switch "A" or "C" as the top switch.

An internal memory of the above-described control unit 350 corresponds to a semiconductor memory device such as a random access memory (RAM) or a flash memory. The generation unit 351, the computing unit 352, the determination unit 353, and the calculation unit 354 of the control unit 350 have an electronic circuit such as a central processing unit (CPU) or a micro processing unit (MPC). Moreover, the generation unit 351, the computing unit 352, the determination unit 353, and the calculation unit 354 may include an integrated circuit such as an application specific integrated circuit (ASIC) or a field programmable gate array (FPGA).

Processing of Prohibition Turn Determination Apparatus (First Embodiment)

Figure 22:
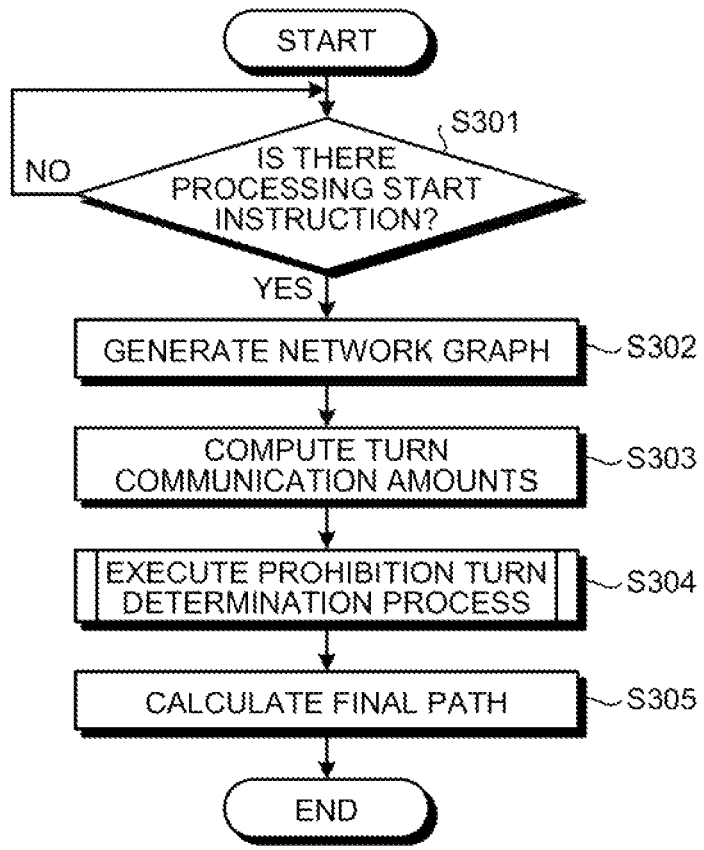
FIG. 22 is a flowchart illustrating a processing flow according to the first embodiment.
Figure 23:
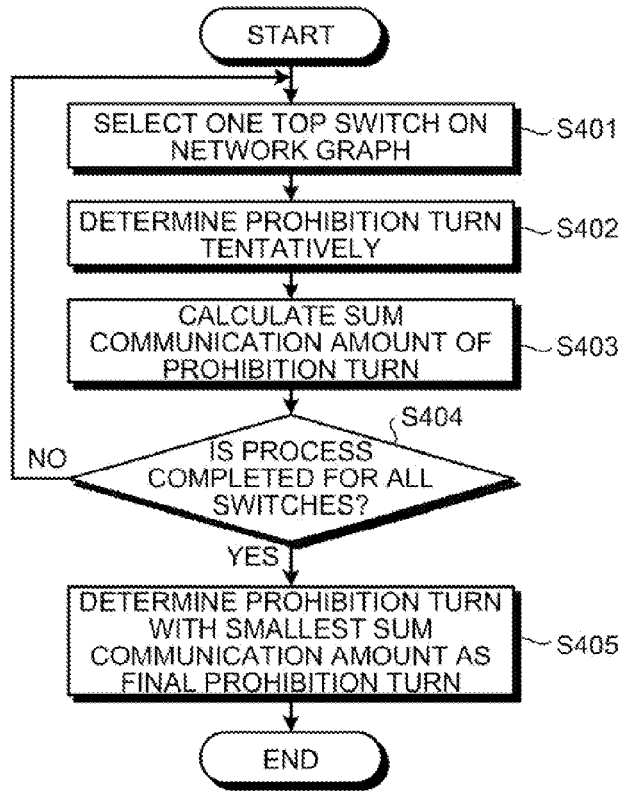
FIG. 23 is a flowchart illustrating a flow of a prohibition turn determination process used by applying the Up/down method according to the first embodiment.
Figure 24:
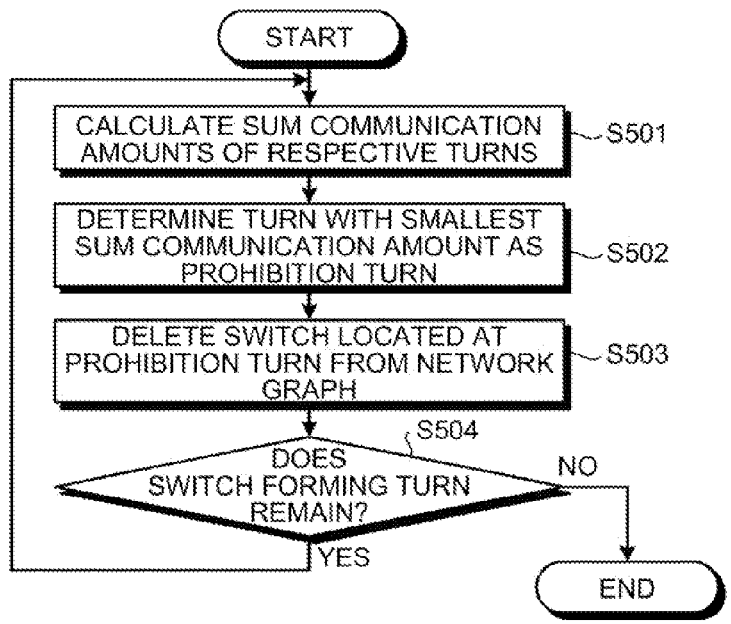
FIG. 24 is a flowchart illustrating a flow of the prohibition turn determination process used by applying the TP method according to the first embodiment.

A processing flow of the prohibition turn determination apparatus according to the first embodiment will be described with reference to FIGS. 22 to 24. FIG. 22 is a flowchart illustrating the processing flow according to the first embodiment. FIG. 23 is a flowchart illustrating a flow of the prohibition turn determination process used by applying the Up/down method according to the first embodiment. FIG. 24 is a flowchart illustrating a flow of the prohibition turn determination process used by applying the TP method according to the first embodiment.

First, the processing flow of the prohibition turn determination apparatus 300 will be described with reference to FIG. 22. In FIG. 22, when a processing start instruction is given to determine a routing (Yes in step S301), the generation unit 351 generates a network graph obtained by modeling the architecture of the network 1 in step S302. Moreover, the generation unit 351 repeats the determination "No" which is the determination result of step S301 until a processing start instruction is given.

In step S303, the computing unit 352 computes the communication amount of turn of the switch 100 and the communication amounts of respective turns of the links adjacently connected to the switch 100. In step S304, based on the communication amounts of respective turns, the determination unit 353 executes the prohibition turn determination process to determine the prohibition turns which are not used in the packet communication. Moreover, the prohibition turn determination process will be described below with reference to FIGS. 23 and 24. In step S305, the calculation unit 354 calculates the final communication path to avoid the prohibition turns, and then the process ends.

Next, the flow of the prohibition turn determination process will be described by applying the Up/down method with reference to FIG. 23. The determination unit 353 determines the prohibition turn as follows when the Up/down method is applied. As illustrated in FIG. 23, the determination unit 353 first selects one top switch on the network graph in step S401 and tentatively determines a prohibition turn in step S402. In step S403, the determination unit 353 calculates a sum communication amount of the tentatively determined prohibition turn.

In step S404, the determination unit 353 determines whether the process of tentatively determining the prohibition turn is completed selecting all of the switches as the top switch. When the process is not completed as the determination result (No in step S404), the process then returns to step S401 described above. Then, the determination unit 353 selects one top switch among the remaining switches and executes the processes of step S402 to step S404.

Here, the description returns to the process of step S404. When the process is completed as the determination result (Yes in step S404), the determination unit 353 determines, as the final prohibition turn, the prohibition turn with the smallest sum communication amount among the sum communication amounts of respective tentatively determined prohibition turns in step S405. Then, the determination unit 353 completes the prohibition turn determination process executed by the Up/down method.

Next, the flow of the prohibition turn determination process will be described by applying the TP method with reference to FIG. 24. The determination unit 353 determines the prohibition turn as follows, when the TIP method is applied. In step S501, as illustrated in FIG. 24, the determination unit 353 first calculates the sum communication amounts of respective turns. In step S502, the determination unit 353 determines the turn with the smallest sum communication amount as the prohibition turn. Then, in step S503, the determination unit 353 deletes the switch located at the determined prohibition turn from the network graph.

In step S504, the determination unit 353 determines whether the switch forming the turn in the network graph remains. When the determination unit 353 determines that the switch forming the turn remains as the determination result (Yes in step S504), the process returns to step S501 described above. Then, the determination unit 353 recalculates the sum communication amounts of respective turns. The determination unit 353 executes the processes of step S502 to step S504.

Here, the description returns to the process of step S504. When there is no switch forming the turn in the network graph as the determination result (No in step S504), the determination unit 353 completes the prohibition turn determination process executed by the TP method.

Effects of First Embodiment

As described above, the prohibition turn determination apparatus 300 according to the first embodiment determines the initial path so as to most efficiently distribute the communication amounts of respective links connecting the switches 100 for each communication pair, that is, a pair of servers 200 executing the communication via the network 1. Then, the prohibition turn determination apparatus 300 computes the communication amounts of respective turns formed along the initial path based on the communication amounts set between the end nodes which are the communication pair. Next, the prohibition turn determination apparatus 300 determines the prohibition turn which is not used to execute the packet communication based on the communication amounts of respective turns by applying the Up/down method or the TP method. The prohibition turn determination apparatus 300 determines the final routing to avoid the prohibition turn. Thus, the prohibition turn determination apparatus 300 determines the final routing to avoid the prohibition turn by determining the prohibition turns based on the communication amounts of respective turns. As described above, as in the comparison results in FIGS. 19, 20, and 21, the communication amount is more efficiently distributed between the links of the final communication path by the method of determining the prohibition turn based on the communication amounts of respective turns. Thus, according to the first embodiment, it is possible to obtain the routing in which the communication amounts of receptive links connecting the switches 100 to each other in the network 1 are efficiently distributed.

According to the first embodiment, since the prohibition turn is determined by the Up/down method or the TP method, it is possible to obtain the routing in which the communication amounts of respective links are efficiently distributed just by preparing a new minimum processing function unit.

[b] Second Embodiment

According to the Up/down method or the TP method, the turn loop is removed by determining the prohibition turn based on the geometric nature of the network graph. However, when the geometric nature of the network graph is used, for example, the prohibition turns may sometimes be concentrated on some switches, as in FIG. 25 or 26.

Figure 25:
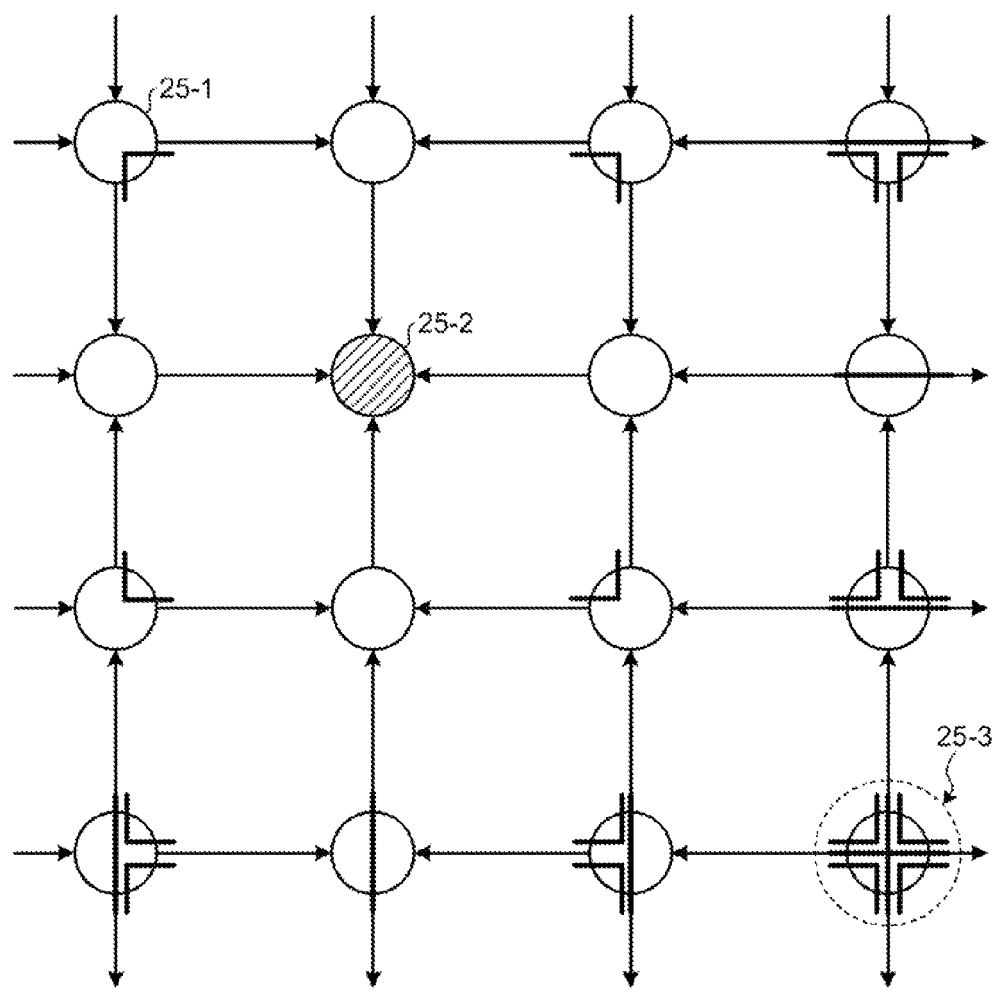
FIG. 25 is a diagram illustrating an example of determination of the prohibition turn in a torus network according to the Up/down method.

FIG. 25 is a diagram illustrating an example of the determination of the prohibition turns in a torus network according to the Up/down method. A figure indicated by 25-1 illustrated in FIG. 25 denotes a switch and 25-2 illustrated in FIG. 25 denotes a switch selected as a top switch. When the prohibition turns of a torus network illustrated in FIG. 25 are determined by the Up/down method, as indicated by 25-3 illustrated in FIG. 25, the prohibition turns may sometimes be concentrated on some switches.

Figure 26:
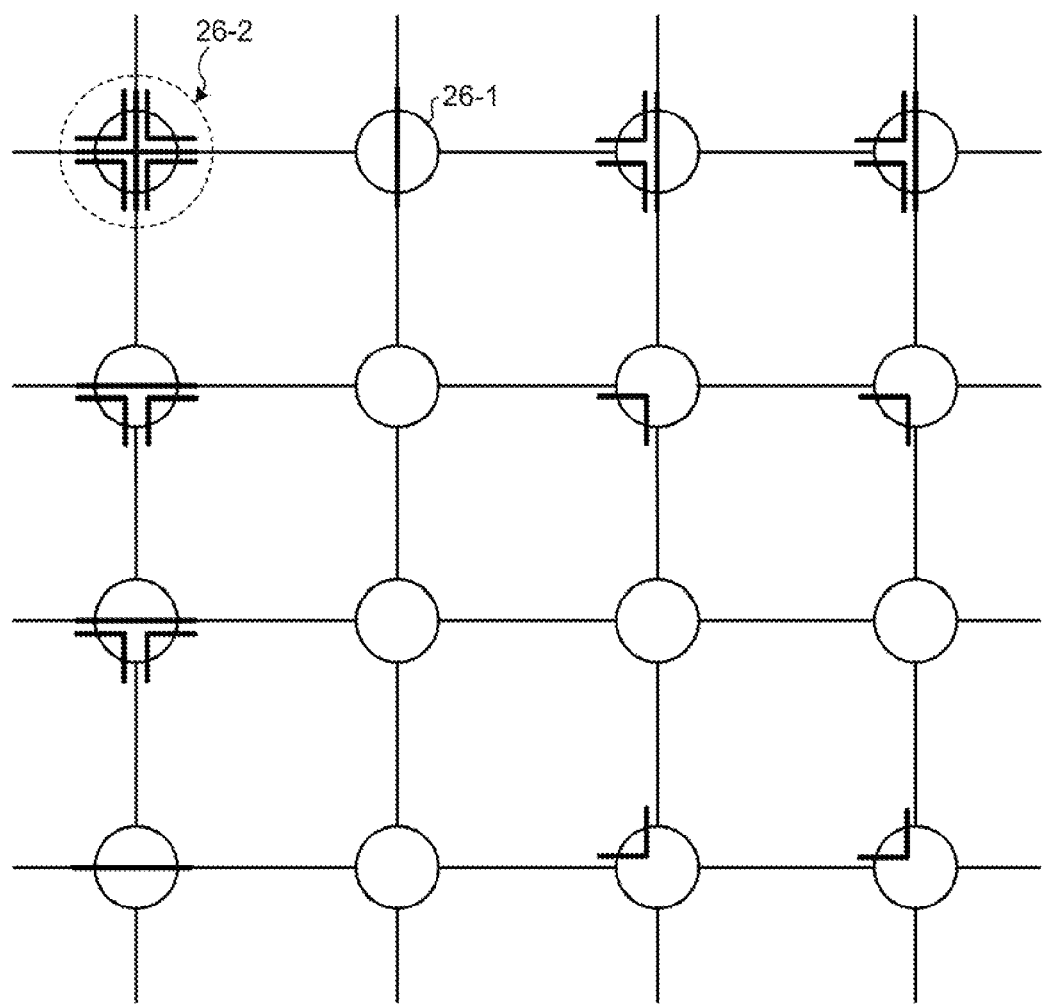
FIG. 26 is a diagram illustrating an example of determination of the prohibition turn in a torus network according to the TP method.

FIG. 26 is a diagram illustrating an example of the determination of the prohibition turns in a torus network according to the TP method. A figure indicated by 26-1 illustrated in FIG. 26 denotes a switch. When the prohibition turns of a torus network illustrated in FIG. 26 are determined by the TP method, as indicated by 26-2 illustrated in FIG. 26, the prohibition turns may sometimes be concentrated on some switches.

When the prohibition turns are concentrated on some switches, as in FIG. 25 or 26, it can be considered that a phenomenon occurs since the communication amounts of respective links are not efficiently distributed in the finally determined routing.

A prohibition turn determination apparatus will be described which is capable of obtaining a routing along which the communication amounts of respective links are efficiently distributed by determining prohibition turns without using the Up/down method or the TP method according to a second embodiment.

Configuration of Prohibition Turn Determination Apparatus (Second Embodiment)

Figure 27:
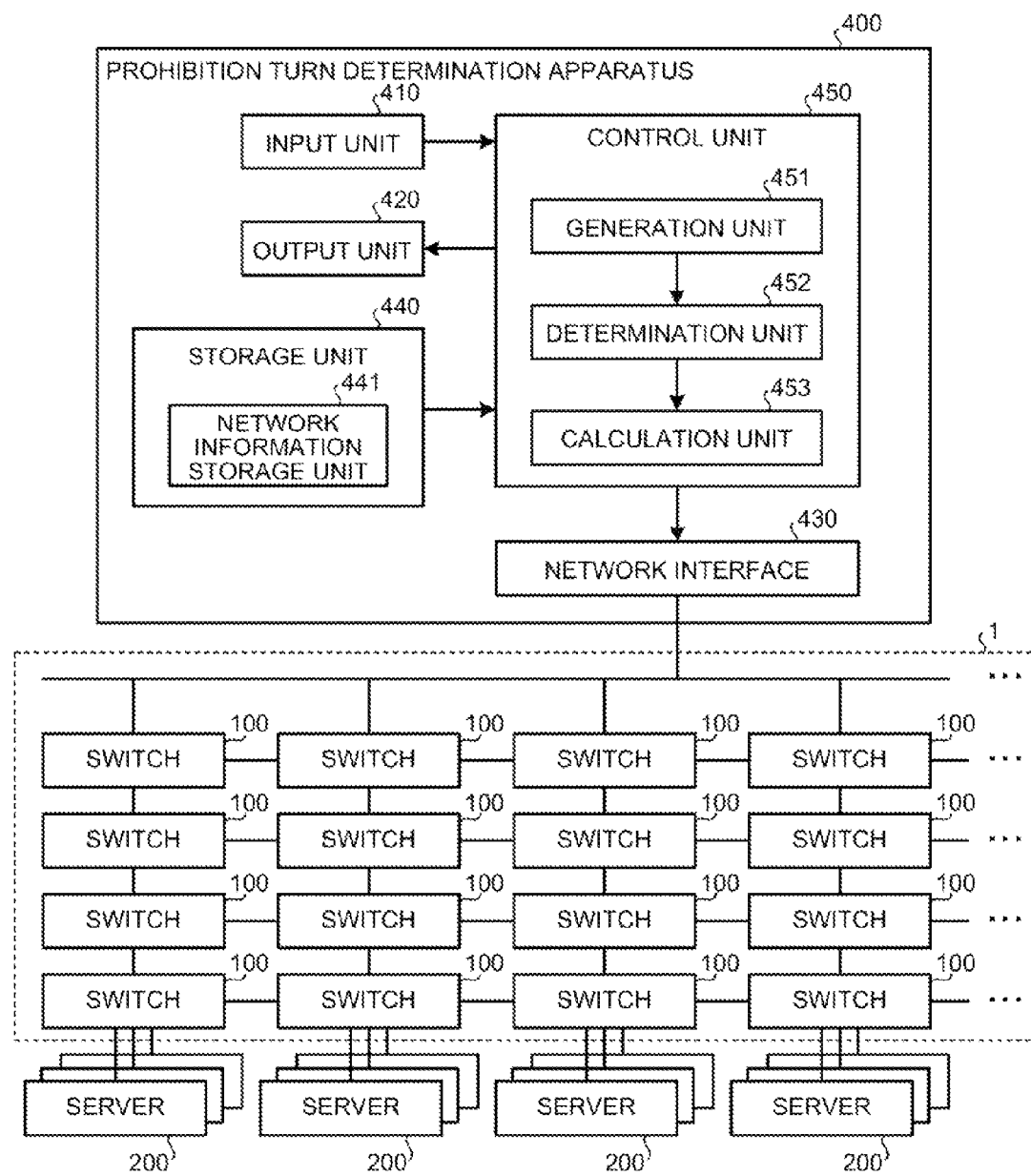
FIG. 27 is a block diagram illustrating the functional configuration of a prohibition turn determination apparatus according to a second embodiment.

FIG. 27 is a block diagram illustrating the functional configuration of the prohibition turn determination apparatus according to the second embodiment. As illustrated in FIG. 27, a prohibition turn determination apparatus 400 is connected to the network 1 in which the plurality of switches 100 is connected to each other. The prohibition turn determination apparatus 400 determines the prohibition turn in which packets are not exchanged, when determining a routing to exchange the packets between the plurality of switches 100 connected to each other in the network 1. The plurality of servers 200 is connected to the network 1 to communicate with each other via the network 1.

As illustrated in FIG. 27, the prohibition turn determination apparatus 400 includes an input unit 410, an output unit 420, a network interface 430, a storage unit 440, and a control unit 450. In the prohibition turn determination apparatus 400 illustrated in FIG. 27, some processing functions of the control unit 450 are different from those of the control unit 350 of the above-described prohibition turn determination apparatus 300 illustrated in FIG. 1. Hereinafter, the different functions will be described.

The control unit 450 has an internal memory to store a predetermined control program, a program defining various kinds of processing sequences, and necessary data, and executes various kinds of processes by developing a predetermined process in the internal memory. For example, as illustrated in FIG. 27, the control unit 450 includes a generation unit 451, a determination unit 452, and a calculation unit 453.

The determination unit 452 sequentially adds turns to a network graph generated by the generation unit 451 one by one and determines the added turn as the prohibition turn, which is not used to transmit the packets, when a loop is formed by each of the added turns. In addition, as in the first embodiment, the turn is defined as a combination of an input port and a counter output port of the input port installed in the switch 100. In other words, the turn is defined as a combination of an input port to which a packet is input and an output port from which the input packet is output to a transmission destination. Hereinafter, a prohibition turn determination method executed by the determination unit 452 will be described with reference to FIG. 28.

Figure 28:
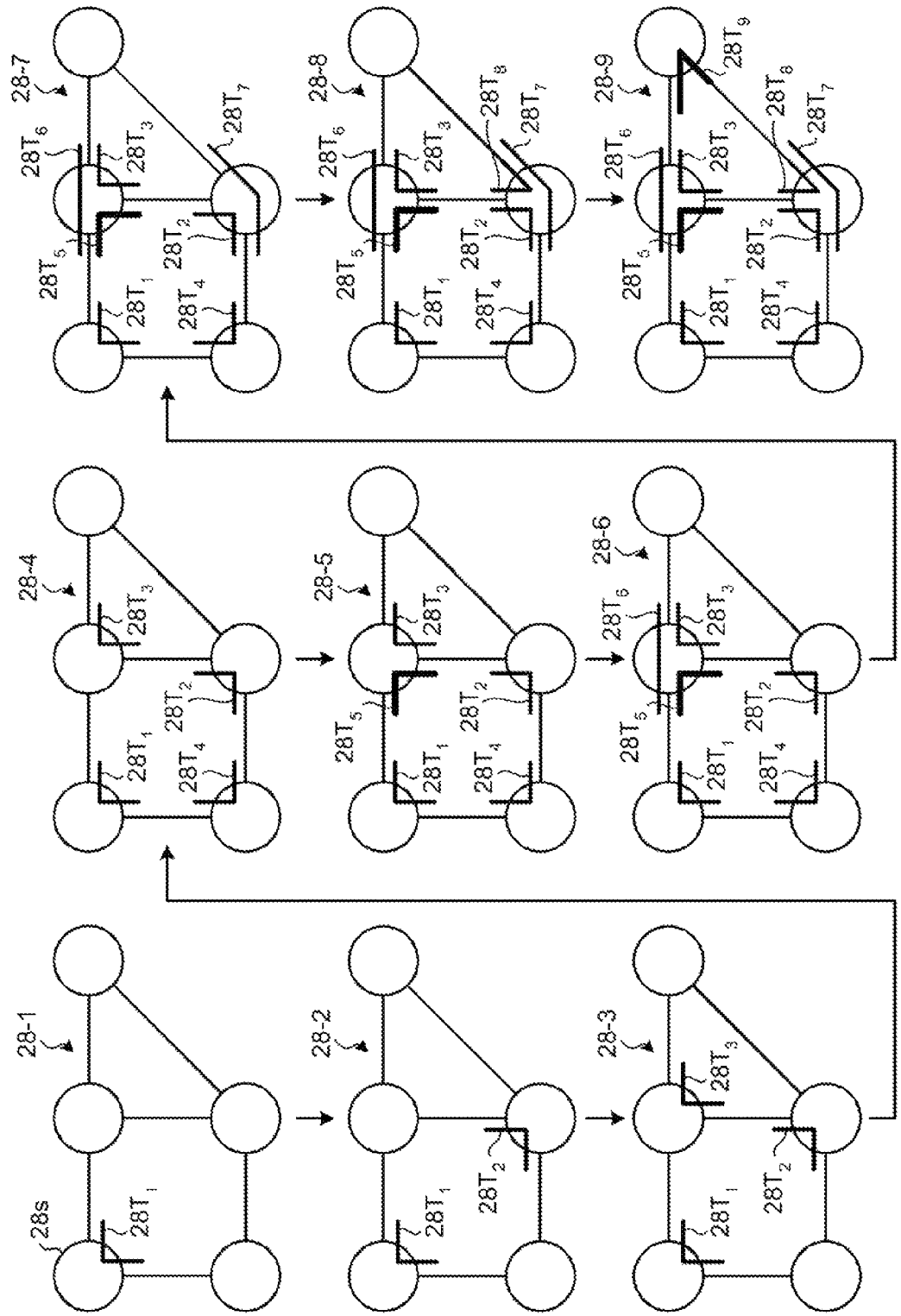
FIG. 28 is a diagram illustrating a prohibition turn determination method according to the second embodiment.

FIG. 28 is a diagram illustrating the prohibition turn determination method according to the second embodiment. A figure indicated by 28s illustrated in FIG. 28 denotes a switch. In addition, 28-1 to 28-9 illustrated in FIG. 28 denote network graphs when the turns are added one by one and it is assumed that the turns are added one by one sequentially from 28-1 to 28-9. In addition, $28T_1$ to $28T_9$ illustrated in FIG. 28 denote turns. The determination unit 452 adds one turn $28T_1$ to the network graph, as illustrated by 28-1 of FIG. 28. Then, the determination unit 452 determines whether a turn loop is formed in the network by adding the turn $28T_1$. Here, the turn is conceptually defined as a combination of an input port of a packet and an output port of the packet and corresponds to a transmission direction when the packet input to a switch is transmitted to a destination switch via the switch. The turn loop refers to a state in which the turns are connected to each other without determination and are circulated within a network.

Since no turn loop is formed in the network graph as the determination result, the determination unit 452 determines the turn $28T_1$ as a permission turn and allows the turn $28T_1$ to remain in the network graph. Subsequently, the determination unit 452 also adds one turn $28T_2$ to the network graph, as indicated by 28-2 illustrated in FIG. 28. Then, the determination unit 452 determines whether a turn loop is formed in the network graph by adding the turn $28T_2$. Since no turn loop is formed in the network graph as the determination result, the determination unit 452 determines the turn $28T_2$ as a permission turn. Subsequently, the determination unit 452 also adds one turn $28T_3$ to the network graph, as indicated by 28-3 illustrated in FIG. 28. Then, the determination unit 452 determines whether a turn loop is formed in the network graph by adding the turn $28T_3$.

Since no turn loop is formed in the network graph as the determination result, the determination unit 452 determines the turn $28T_3$ as a permission turn. Subsequently, the determination unit 452 also adds one turn $28T_4$ to the network graph, as indicated by 28-4 illustrated in FIG. 28. Then, the determination unit 452 determines whether a turn loop is formed in the network graph by adding the turn $28T_4$. Since no turn loop is formed in the network graph as the determination result, the determination unit 452 determines the turn $28T_4$ as a permission turn. Subsequently, the determination unit 452 also adds one turn $28T_5$ to the network graph, as indicated by 28-5 illustrated in FIG. 28. Then, the determination unit 452 determines whether a turn loop is formed in the network graph by adding the turn $28T_5$.

Since a turn loop is formed in the network graph as the determination result, the determination unit 452 determines the turn $28T_5$ as a prohibition turn by which the turn loop is formed in the network graph. Subsequently, the determination unit 452 also adds one turn $28T_6$ to the network graph, as indicated by 28-6 illustrated in FIG. 28. Then, the determination unit 452 determines whether a turn loop is formed in the network graph by adding the turn $28T_6$. Since no turn loop is formed in the network graph as the determination result, the determination unit 452 determines the turn $28T_6$ as a permission turn. Subsequently, the determination unit 452 also adds one turn $28T_7$ to the network graph, as indicated by 28-5 illustrated in FIG. 28. Then, the determination unit 452 determines whether a turn loop is formed in the network graph by adding the turn $28T_7$.

Since no turn loop is formed in the network graph as the determination result, the determination unit 452 determines the turn $28T_7$ as a permission turn. Subsequently, the determination unit 452 also adds one turn $28T_8$ to the network graph, as indicated by 28-8 illustrated in FIG. 28. Then, the determination unit 452 determines whether a turn loop is formed in the network graph by adding the turn $28T_8$. Since no turn loop is formed in the network graph as the determination result, the determination unit 452 determines the turn $28T_8$ as a permission turn. Subsequently, the determination unit 452 also adds one turn $28T_9$ to the network graph, as indicated by 28-9 illustrated in FIG. 28. Then, the determination unit 452 determines whether a turn loop is formed in the network graph by adding the turn $28T_9$.

Since a turn loop is formed in the network graph as the determination result, the determination unit 452 determines the turn $28T_9$ as a prohibition turn by which the turn loop is formed in the network graph. Here, since the turns are completely added to the network graph, that is, since there is no turn which can be added to the network graph, the determination unit 452 completes the determination of the prohibition turn.

The calculation unit 453 calculates an optimum communication path, that is, a so-called routing constructing the permission turns round the prohibition turns determined by the determination unit 452.

Figure 29:
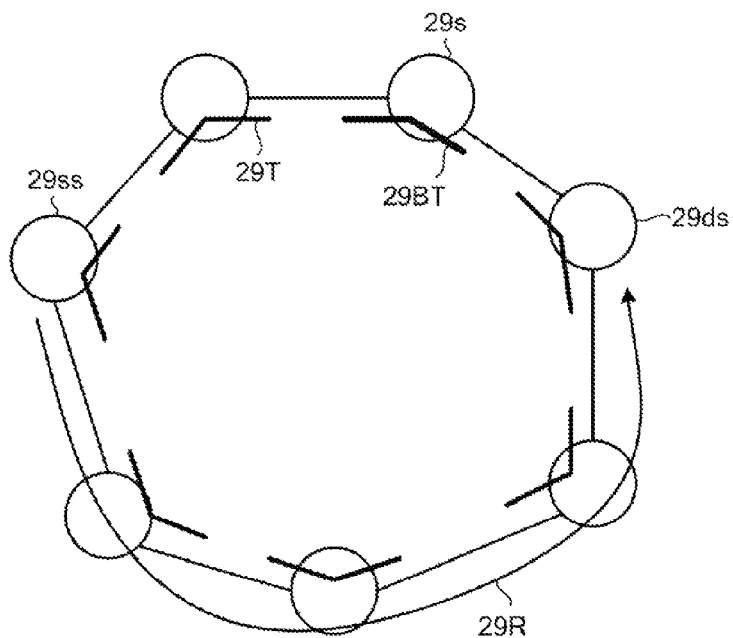
FIG. 29 is a diagram illustrating the arrival of packets according to the second embodiment.
Figure 30:
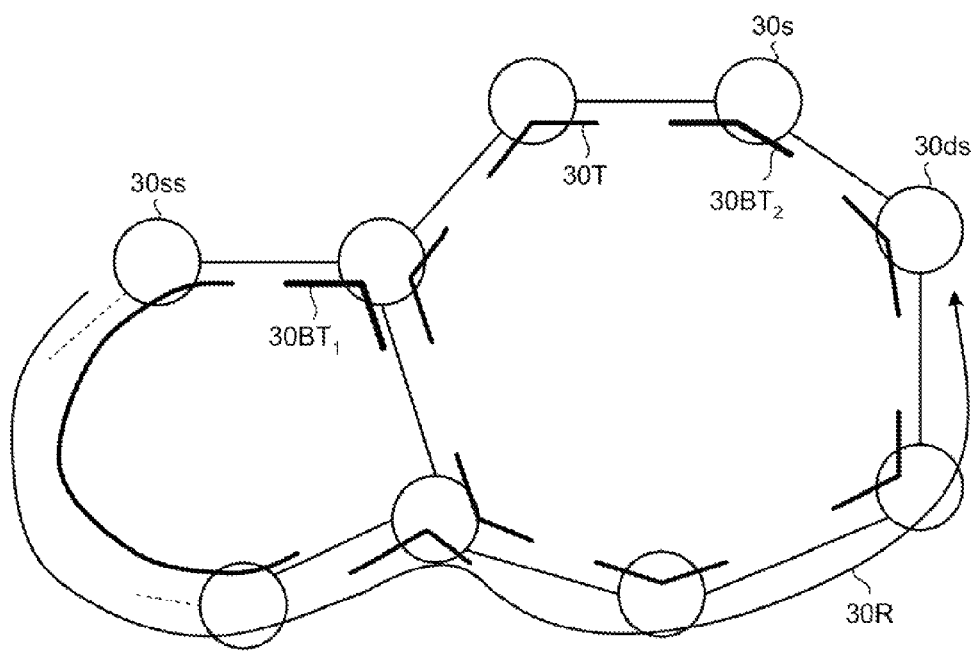
FIG. 30 is a diagram illustrating the arrival of packets according to the second embodiment.
Figure 31:
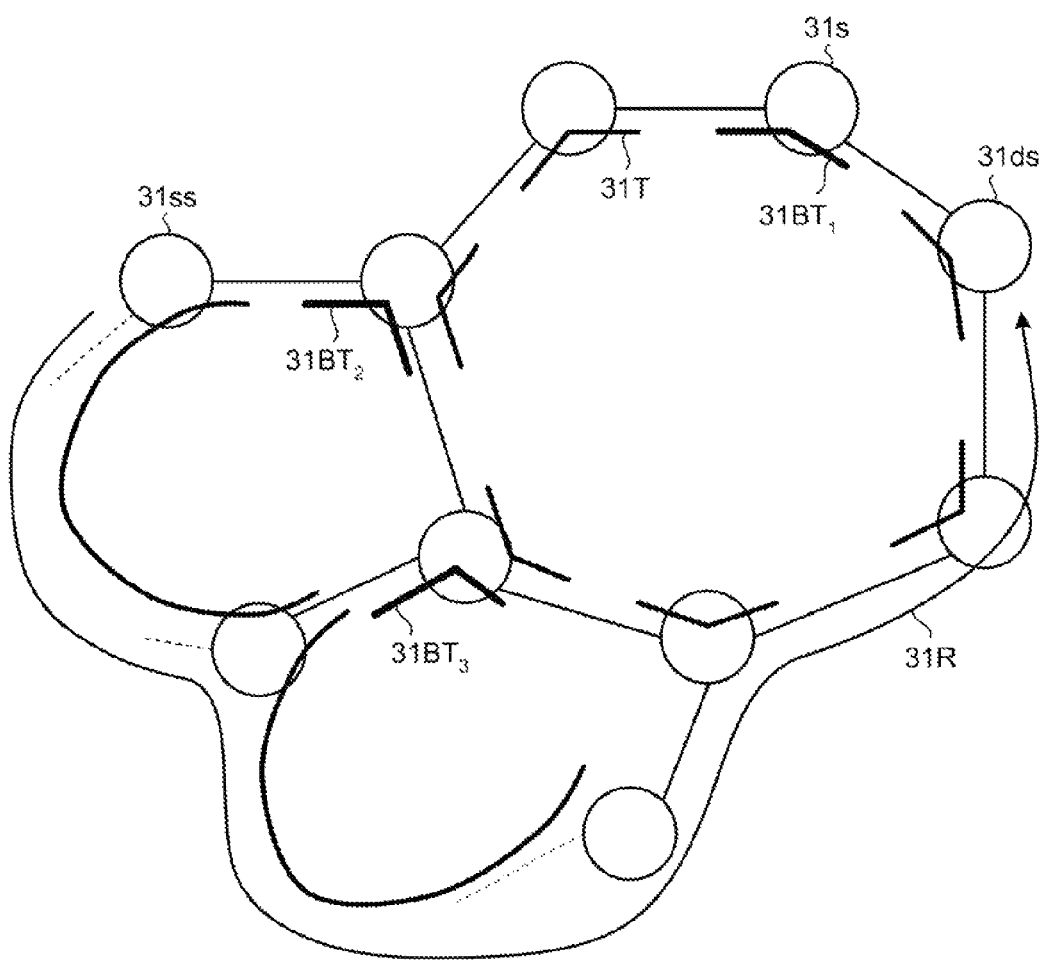
FIG. 31 is a diagram illustrating the arrival of packets according to the second embodiment.

Next, referring to FIGS. 29 to 31, the arrival of the packets will be described when the prohibition turns are determined according to the method described with reference to FIG. 28 by the determination unit 452. FIGS. 29 to 31 are diagrams illustrating the arrival of the packets according to the second embodiment.

In FIG. 29, for example, packets are exchanged between the switches located on a ring network including one prohibition turn. A figure indicated by 29$s$ illustrated in FIG. 29 denotes a switch and a line indicated by 29T illustrated in FIG. 29 denotes a turn. In addition, 29BT illustrated in FIG. 29 denotes a prohibition turn, 29$ss$ illustrated in FIG. 29 denotes a packet transmission source switch, and 29$ds$ illustrated in FIG. 29 denotes a packet destination switch. The packets transmitted from the switch 29$ss$ to the switch 29$ds$ illustrated in FIG. 29 arrive at the switch 29$ds$ along a route 29R illustrated in FIG. 29, although there is the prohibition turn 29BT.

In FIG. 30, for example, packets are exchanged between the switches which are not located in the same ring network in a network formed when two ring networks each including one prohibition turn are integrated with each other. A figure indicated by 30$s$ illustrated in FIG. 30 denotes a switch and line indicated by 30T illustrated in FIG. 30 denotes a turn. In addition, 30BT$_2$ and 30BT$_2$ illustrated in FIG. 30 denote prohibition turns, 30$ss$ illustrated in FIG. 30 denotes a packet transmission source switch, and 30$ds$ illustrated in FIG. 30 denotes a packet destination switch. The packets transmitted from the switch 30$ss$ to the switch 30$ds$ illustrated in FIG. 30 arrive at the switch 30$ds$ along a route 30R illustrated in FIG. 30, although there is the prohibition turns 30BT$_1$ and 30BT$_2$.

In FIG. 31, for example, packets are exchanged between the switches which are not located in the same ring network in a network formed when three ring networks each including one prohibition turn are integrated with each other. A figure indicated by 31$s$ illustrated in FIG. 31 denotes a switch and line indicated by 31T illustrated in FIG. 31 denotes a turn. In addition, 31BT$_1$, 30BT$_2$, and 31BT$_3$ illustrated in FIG. 31 denote prohibition turns, 31$ss$ illustrated in FIG. 31 denotes a packet transmission source switch, and 31$ds$ illustrated in FIG. 31 denotes a packet destination switch. The packets transmitted from the switch 31$ss$ to the switch 31$ds$ illustrated in FIG. 31 arrive at the switch 31$ds$ along a route 31R illustrated in FIG. 31, although there are the prohibition turns 31BT$_1$, 30BT$_2$, and 31BT$_3$.

Since the continuous permission turns are necessarily present between the switches located in the same ring network, as in FIGS. 29 to 31, the packets transmitted from an arbitrary switch can arrive at the destination switch. Since the continuous permission turns are present within each ring network even between the switches located in the different ring networks and the networks are finite, the packets transmitted from an arbitrary switch can arrive at the destination switch. Accordingly, the arrival of the packets is guaranteed when the packets are exchanged between the switches located on the ring network including one prohibition turn determined by the determination unit 452.

Processing of Prohibition Turn Determination Apparatus (Second Embodiment)

Figure 32:
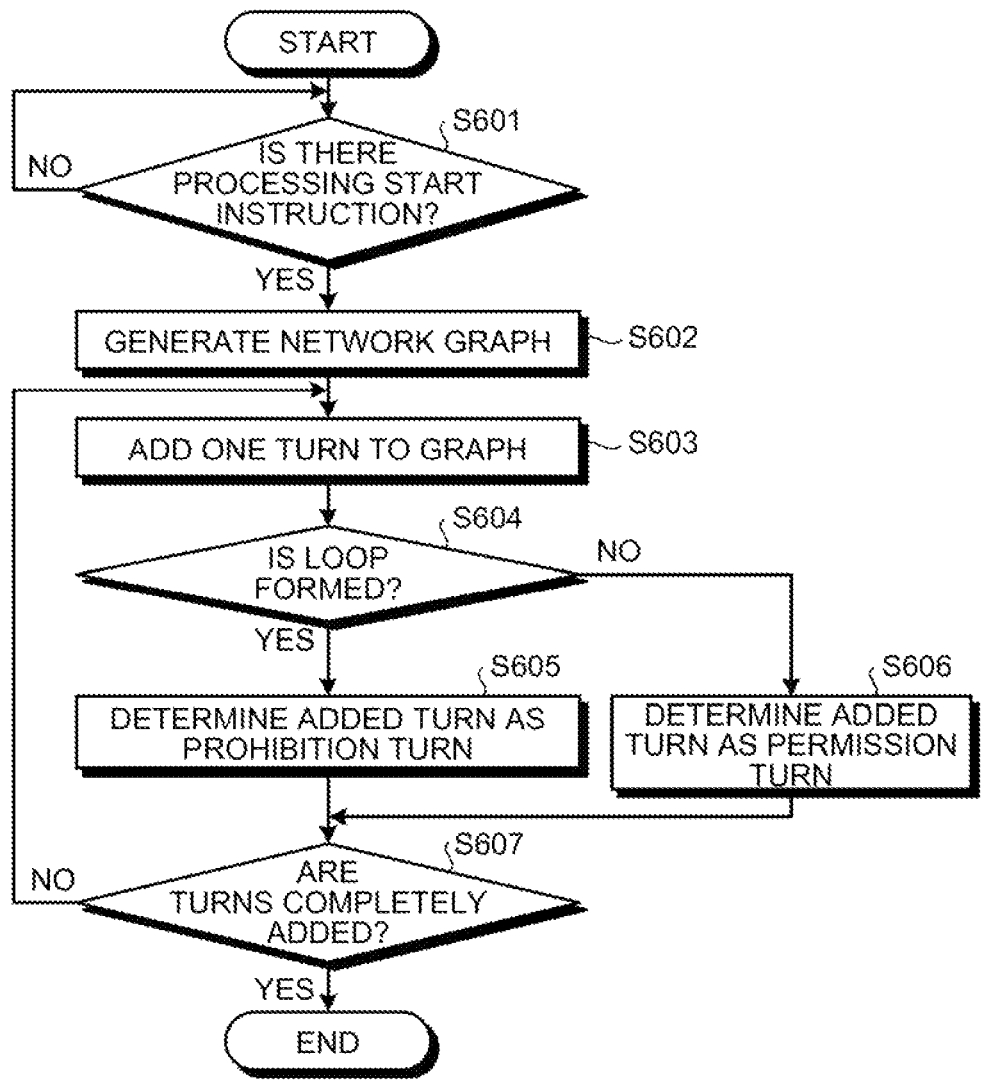
FIG. 32 is a flowchart illustrating a flow of a prohibition turn determination process according to the second embodiment.

Next, the processing flow of the prohibition turn determination apparatus will be described with reference to FIG. 32 according to the second embodiment. FIG. 32 is a flowchart illustrating the flow of the prohibition turn determination process according to the second embodiment.

In FIG. 32, when a processing start instruction is given to determine a routing (Yes in step S601), the generation unit 451 generates a network graph obtained by modeling the architecture of the network 1 in step S602. Moreover, the generation unit 451 repeats the determination "No" which is the determination result of step S601 until a processing start instruction is given.

In step S603, the determination unit 452 sequentially adds turns one by one to the network graph generated by the generation unit 451. In step S604, the determination unit 452 determines whether a turn loop is formed in the network graph by adding the turn. When the turn loop is formed as the determination result (Yes in step S604), the determination unit 452 determines the added turn as a prohibition turn in step S605. On the other hand, when no loop is formed as the determination result (No in step S604), the determination unit 452 determines the added turn as a permission turn in step S606.

In step S607, the determination unit 452 determines whether the turns are completely added to the network graph. When the turns are completely added as the determination result (Yes in step S607), the determination unit 452 completes the process. On the other hand, when the turns are not completely added as the determination result (No in step S607), the process returns to step S603 and the determination unit 452 executes the processes until step S607.

Effects of Second Embodiment

As described above, the prohibition turn determination apparatus 400 according to the second embodiment adds the turns one by one to the network graph and determines the added turn as the prohibition turn which is not used for the transmission of the packet when a loop is formed due to each of the added turns. Accordingly, according to the second embodiment, it is possible to obtain a routing in which the communication amounts of receptive links are efficiently distributed while preventing the prohibition turns from being concentrated on some switches.

Figure 33:
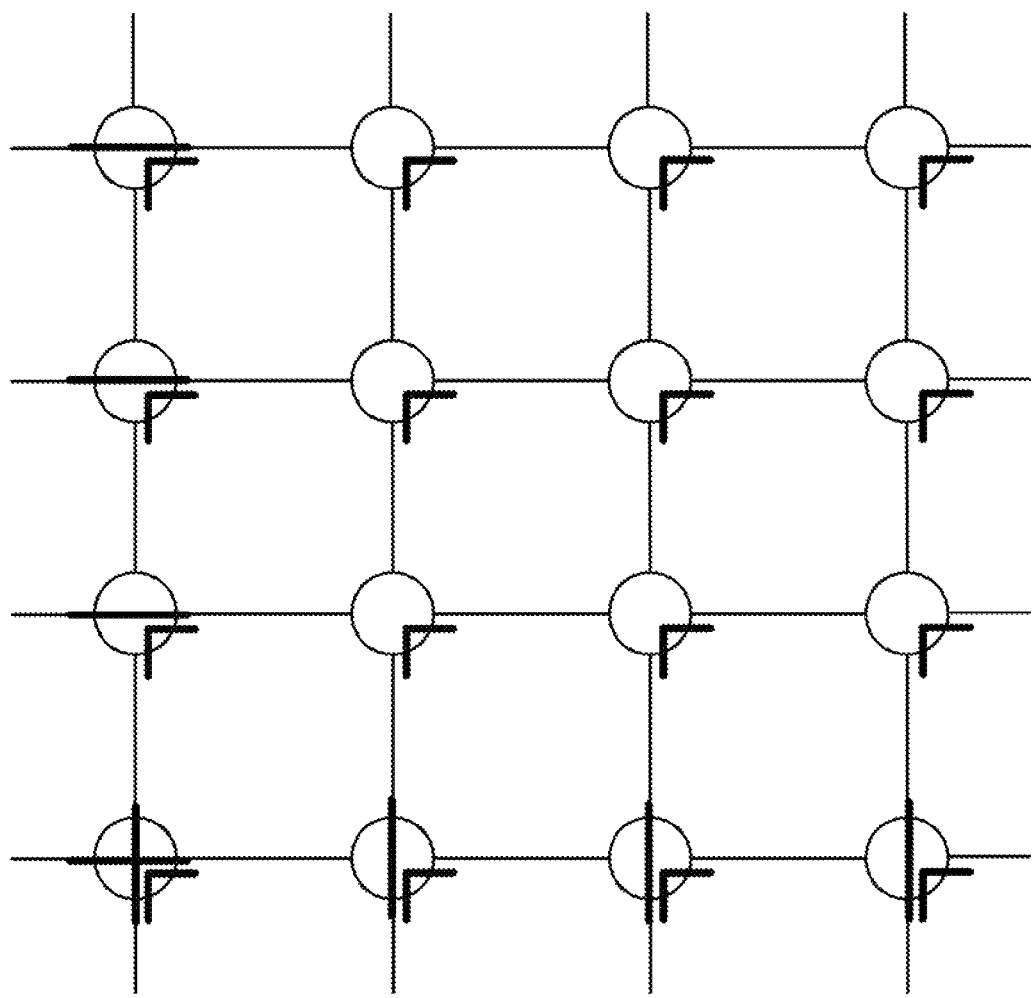
FIG. 33 is a diagram illustrating an example of determination of the prohibition turn according to the method according to the second embodiment.

For example, FIG. 33 is a diagram illustrating an example of the determination example of the prohibition turns according to the method of the second embodiment. According to the method of the second embodiment, that is, the method described with reference to FIG. 28, as in FIG. 33, the prohibition turns are prevented from being concentrated on some switches.

Figure 34:
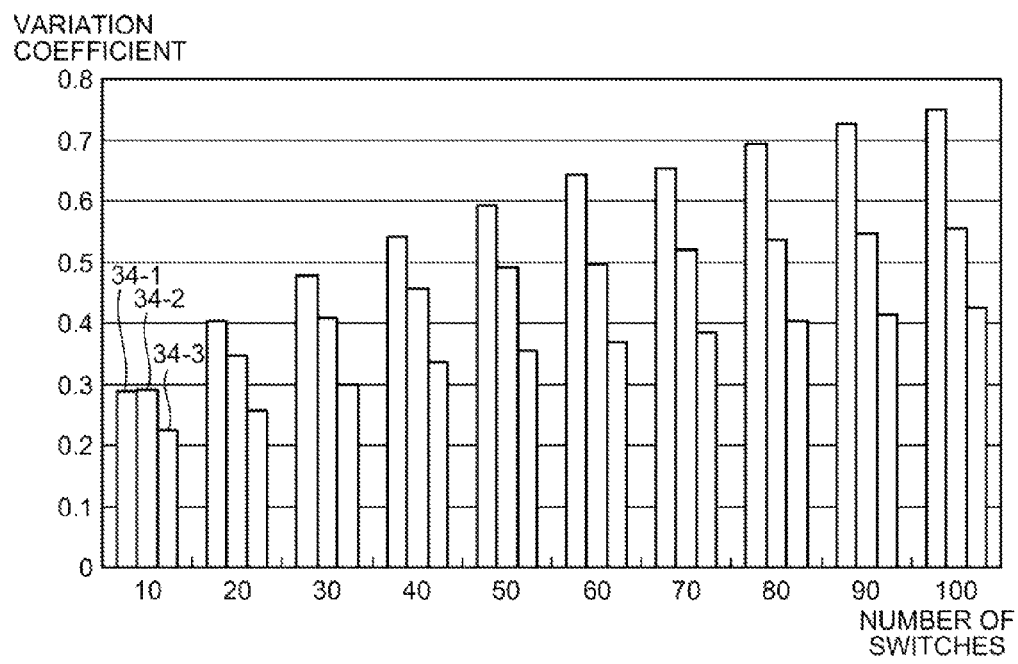
FIG. 34 is a diagram illustrating a relationship between a variation coefficient of the communication amounts of respective links and the number of switches.

FIG. 34 is a diagram illustrating a relationship between the number of switches and a variation coefficient of the communication amounts of respective links. In addition, 34-1 illustrated in FIG. 34 indicates a relationship between the number of switches and a variation coefficient of the communication amounts of links of the routing which is based on the prohibition turns determined by the UP/down method. In addition, 34-2 illustrated in FIG. 34 indicates a relationship between the number of switches and a variation coefficient of the communication amounts of links of the routing which is based on the prohibition turns determined by the method of the second embodiment. In addition, 34-3 illustrated in FIG. 34 indicates a relationship between the number of switches and a variation coefficient of the communication amounts of links of the routing in which there is no prohibition turn, that is, there is no restriction on the turns. As illustrated in FIG. 34, it can be understood that the communication amounts of links of the routing which is based on the prohibition turns determined according to the method of the second embodiment are distributed more efficiently than the communication amounts of links of the routing which is based on the prohibition turns determined according to the Up/down method. In addition, it can be understood that the distribution of the communication amounts of links according to the method of the second method is more similar with the distribution of the communication amounts of links of the routing in which there is no restriction on the turns than the distribution of the communication amounts of links of the routing which is based on the Up/down method. When the routing is executed in which there is no restriction on the turns, as indicated in 34-3 illustrated in FIG. 34, the prohibition turns occur and thus this routing may not be used. However, the communication amounts of links are distributed most efficiently. Accordingly, it can be understood that the communication amounts of links according to the method of the second embodiment are distributed more efficiently than the communication amounts of links according to the Up/down method.

Figure 35:
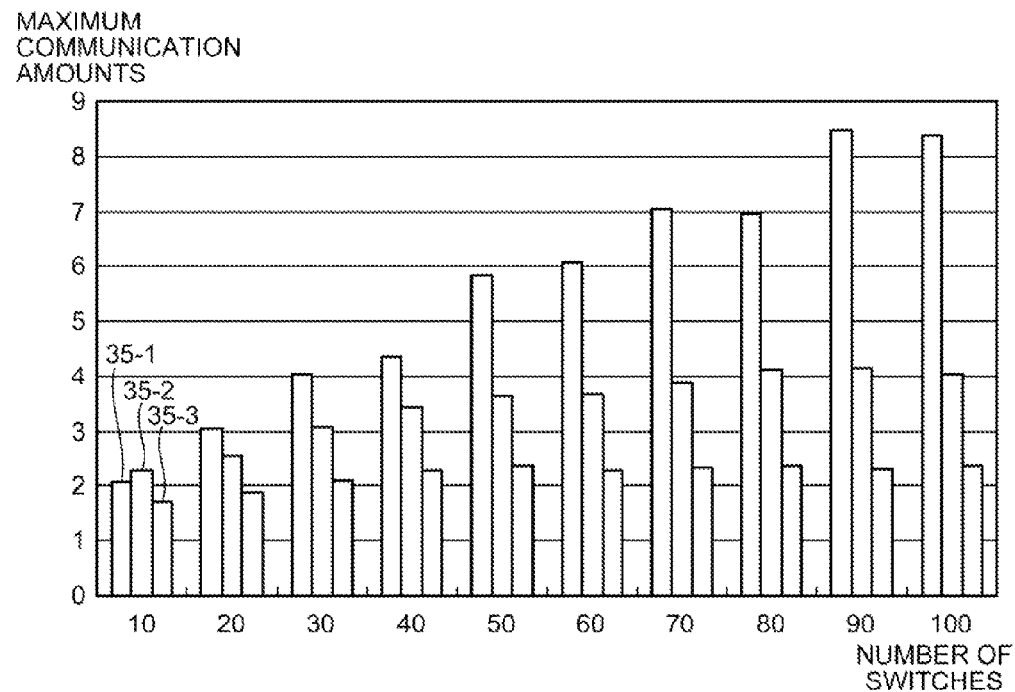
FIG. 35 is a diagram illustrating a relationship between the maximum communication amount of link and the number of switches.

FIG. 35 is a diagram illustrating a relationship between the number of switches and the maximum communication amounts of links. In addition, 35-1 illustrated in FIG. 35 indicates a relationship between the number of switches and the maximum communication amounts of links of the routing which is based on the prohibition turns determined by the UP/down method. In addition, 35-2 illustrated in FIG. 35 indicates a relationship between the number of switches and the maximum communication amounts of links of the routing which is based on the prohibition turns determined by the method of the second embodiment. In addition, 35-3 illustrated in FIG. 35 indicates a relationship between the number of switches and the maximum communication amounts of links of the routing in which there is no prohibition turn, that is, there is no restriction on turns. As illustrated in FIG. 35, it can be understood that the maximum communication amounts of links of the routing which is based on the prohibition turns determined by the method of the second embodiment are suppressed further than the maximum communication amounts of links of the routing which is based on the prohibition turns determined by the Up/down method. When the routing is executed in which there is no restriction on the turns, as indicated in 34-3 illustrated in FIG. 34, the prohibition turns occur and thus this routing may not be used. However, the communication amounts of links are distributed most efficiently. Accordingly, it can be understood that the maximum communication amounts of links according to the method of the second embodiment are suppressed further than the maximum communication amounts of links according to the Up/down method.

[c] Third Embodiment

In the above-described second embodiment, the prohibition turns may be determined by calculating the communication amounts of respective links, sequentially selecting the turns from the turn with the larger communication amount, and adding the turns to the network graph.

Configuration of Prohibition Turn Determination Apparatus (Third Embodiment)

Figure 36:
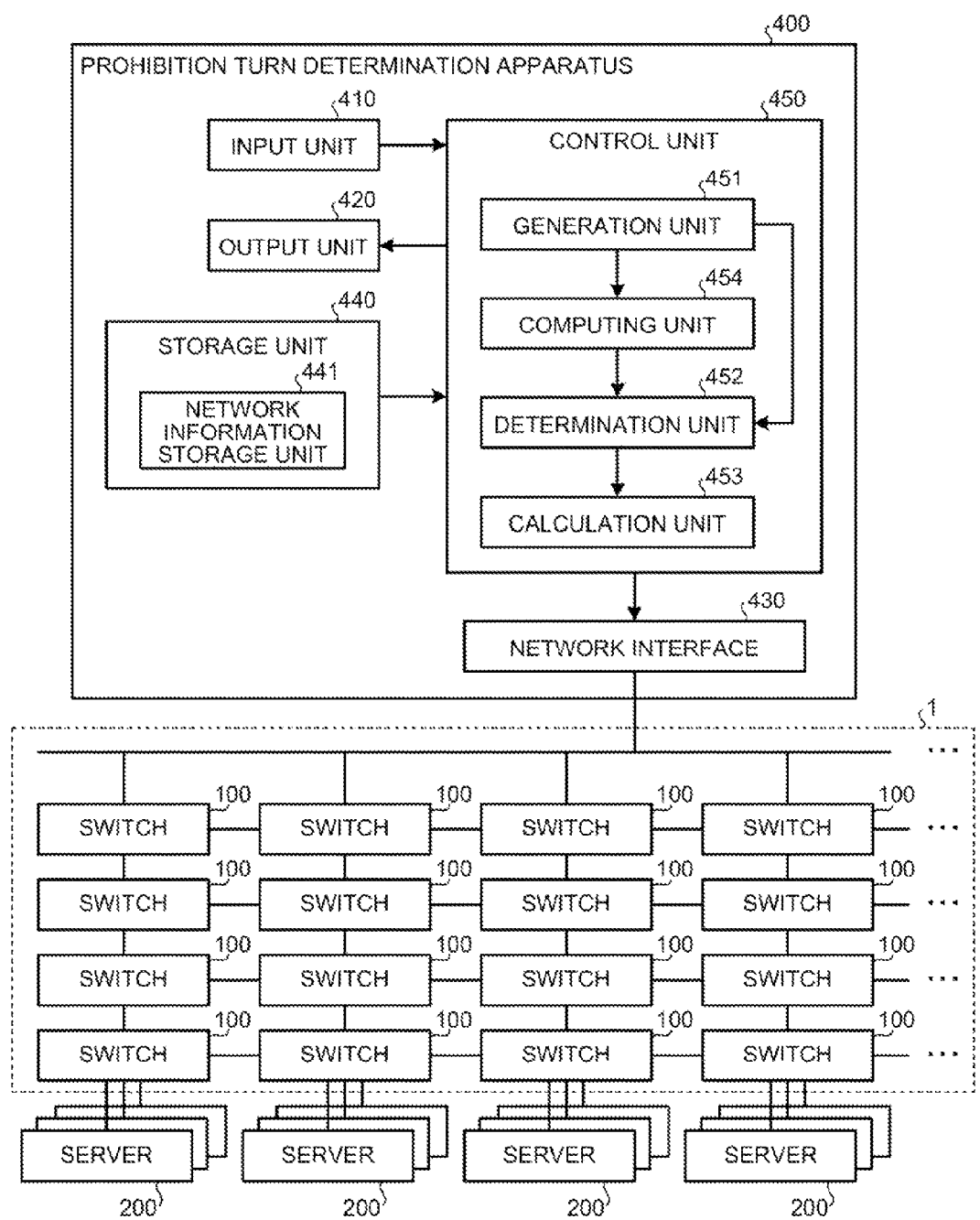
FIG. 36 is a block diagram illustrating the functional configuration of a prohibition turn determination apparatus according to a third embodiment.

FIG. 36 is a block diagram illustrating the functional configuration of a prohibition turn determination apparatus according to a third embodiment. As illustrated in FIG. 36, a prohibition turn determination apparatus 400 is different from that of the second embodiment in that a computing unit 454 is further provided.

That is, the computing unit 454 computes the communication amounts of respective turns in the network graph. The computing unit 454 computes the communication amounts of respective turns according to the same method as that of the computing unit 352 of the prohibition turn determination apparatus 300 described in the first embodiment. For example, the computing unit 454 determines the initial path between the communication pair so that the communication amounts of respective links connecting the switches to each other are distributed most efficiently on the network graph generated by the generation unit 451. Then, after determining the initial path between the communication pair, that is, so-called end nodes, the computing unit 454 computes the communication amounts of respective turns formed in the switches along the initial paths determined on the network graph based on the communication amounts set between the end nodes.

The determination unit 452 selects one turn with the largest communication amount among the communication amounts of respective turns calculated by the computing unit 454 and adds the turn to the network graph. Then, as in the above-described second embodiment, the determination unit 452 determines whether a turn loop is formed in the network graph.

Processing of Prohibition Turn Determination Apparatus (Third Embodiment)

Figure 37:
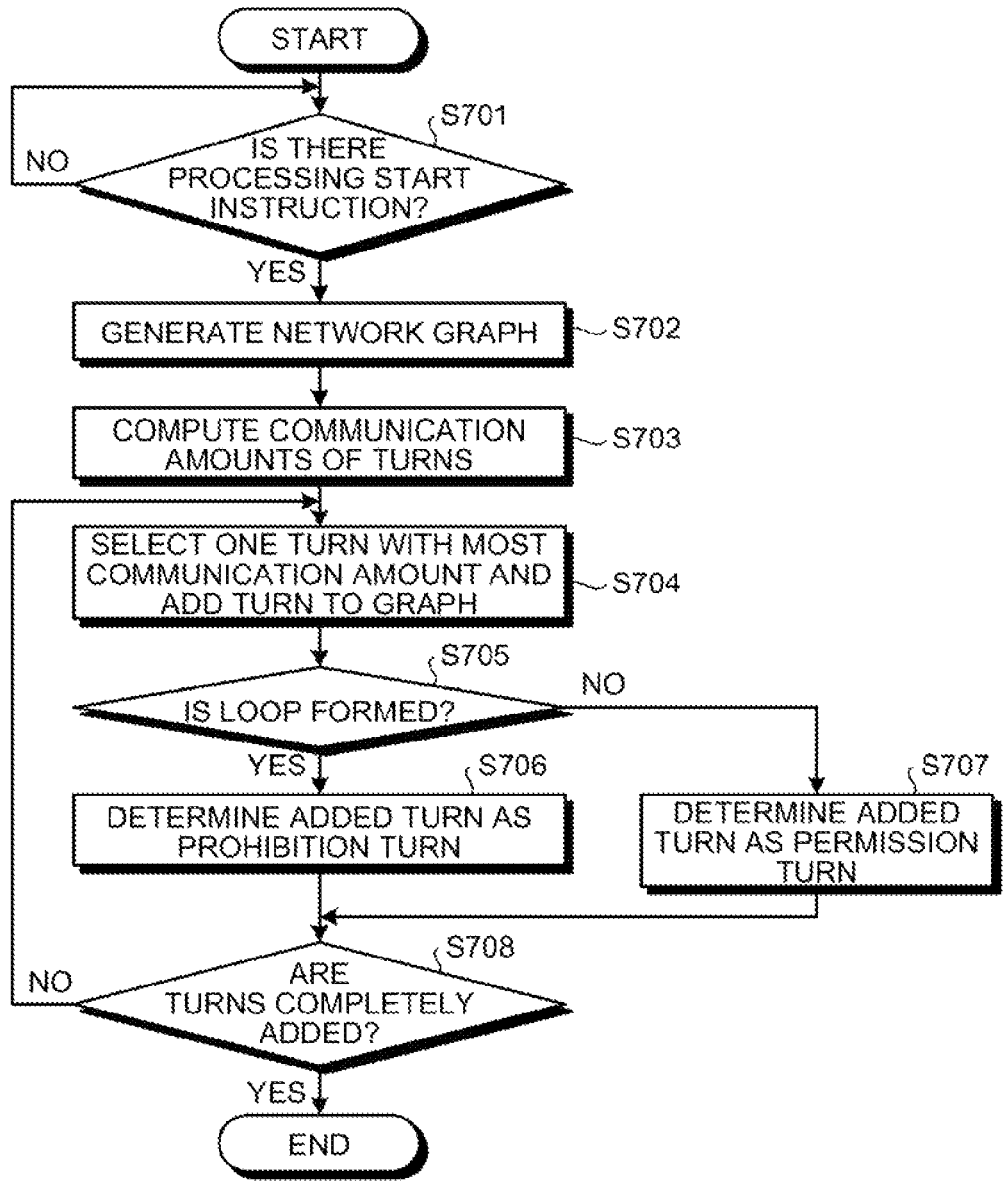
FIG. 37 is a flowchart illustrating a flow of a prohibition turn determination process according to the third embodiment.

Next, a processing flow of the prohibition turn determination apparatus according to the third embodiment will be described with reference to FIG. 37. FIG. 37 is a diagram illustrating a flow of the prohibition turn determination process according to the third embodiment. The processing of the prohibition turn determination apparatus according to the third embodiment is different from the processing of the prohibition turn determination apparatus according to the above-described second embodiment in step S703 and step S704 illustrated in FIG. 37.

That is, the computing unit 454 determines the initial path between communication pair so that the communication amounts of respective links connecting the switches to each other are distributed most efficiently on the network graph generated by the generation unit 451 and computes the communication amounts of respective turns formed along the initial path in step S703.

In step S704, the determination unit 452 selects one turn with the largest communication amount among the communication amounts of respective turns computed by the computing unit 454 and adds the turn to the network graph. The processes of step S705 to step S708 are the same as the processes executed by the prohibition turn determination apparatus of the above-described second embodiment, that is, step S604 to step S607 illustrated in FIG. 32.

Effects of Third Embodiment

As described above, the prohibition turn determination apparatus 400 according to the third embodiment determines the prohibition turns by sequentially selecting the turns from the turn with the larger communication amount and adding the prohibition turns to the network graph. Thus, according to the third embodiment, the turn with the larger communication amount is determined as the permission turn and the turn with the smaller communication amount is determined as the prohibition turn. As a consequence, it is possible to obtain the routing in which the communication amounts of respective links are efficiently distributed.

[d] Fourth Embodiment

According to the above-described third embodiment, it is determined whether the communication path is recomputed whenever the prohibition turn is determined. When the communication path is recomputed, the prohibition turn may be determined in the recomputed communication path.

Configuration of Prohibition Turn Determination Apparatus (Fourth Embodiment)

Figure 38:
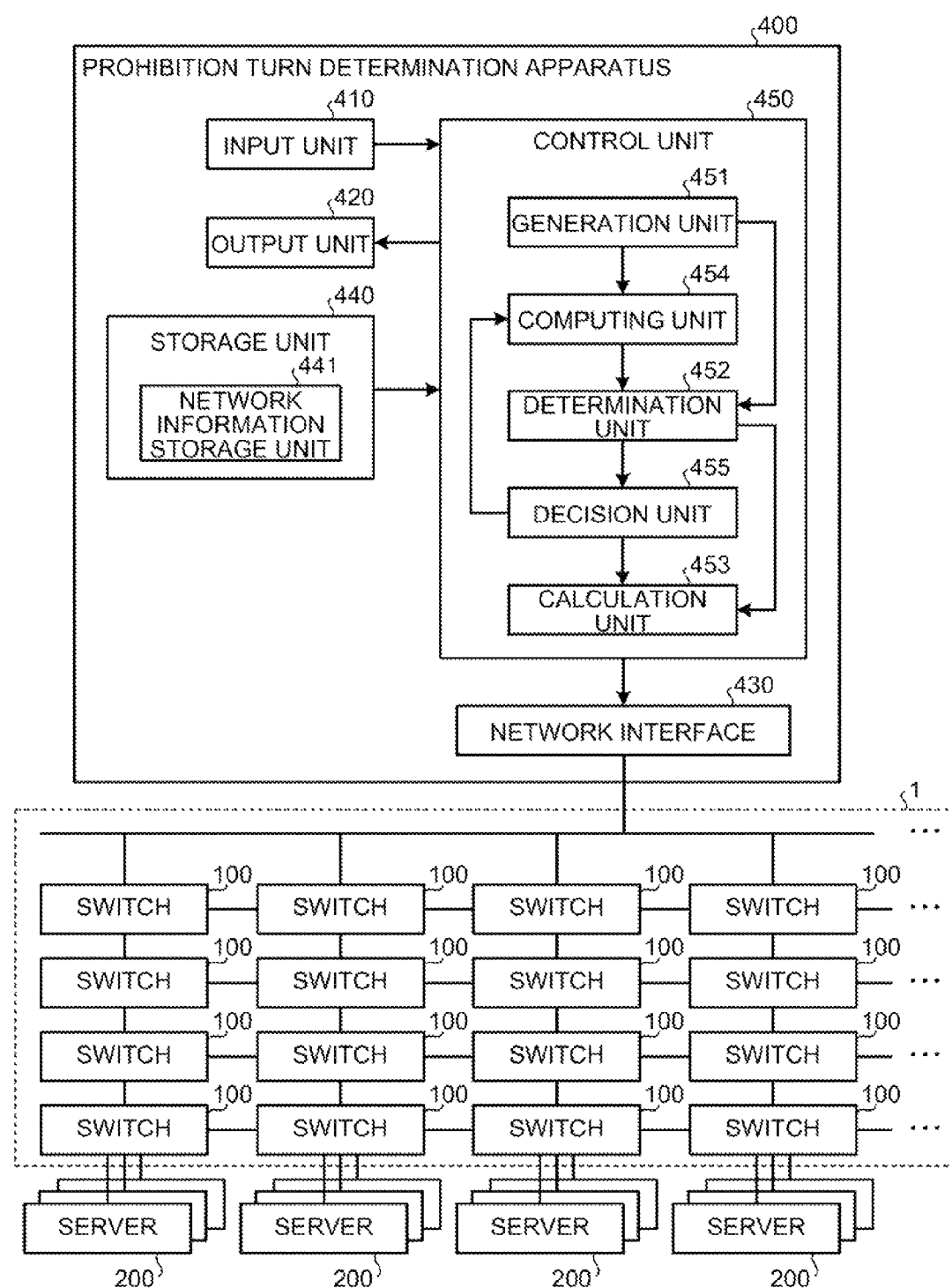
FIG. 38 is a block diagram illustrating the functional configuration of a prohibition turn determination apparatus according to a fourth embodiment.

FIG. 38 is a block diagram illustrating the functional configuration of a prohibition turn determination apparatus according to a fourth embodiment. As illustrated in FIG. 38, a prohibition turn determination apparatus 400 is different from that of the third embodiment in that a decision unit 455 is further provided.

That is, the decision unit 455 decides whether each communication path is recomputed when the determination unit 452 determines the prohibition turn. The conditions in which the decision unit 455 determines whether the communication path is recomputed, for example, conditions (1) to (4) below are set in advance:

(1) the recomputation is typically executed;

(2) the recomputation is not typically executed;

(3) the recomputation is executed whenever n prohibition turns are determined; and (4) the recomputation is executed when a cumulative communication amount of prohibition turns exceeds a threshold value.

The decision unit 455 refers to the conditions set in advance when the determination unit 452 determines the prohibition turns. Then, the decision unit 455 determines the recomputation of the communication path when the conditions set in advance are satisfied. When determining the recomputation of the communication path, the decision unit 455 recomputes the communication path to avoid the prohibition turn and determines whether the turn which is not yet determined to be prohibited or permitted is included in the recomputed communication path. When the turn which is not yet determined is included as the determination result, the decision unit 455 instructs the computing unit 454 to recompute the communication amounts of respective turns in the recomputed communication path. On the other hand, when the turn which is not yet determined is not included, all of the turns are permitted in the communication path and thus the decision unit 455 determines, as the prohibition turns, all of the turns which are not included in the recomputed communication path and are not yet determined. Then, the process ends.

Processing of Prohibition Turn Determination Apparatus (Fourth Embodiment)

Figure 39:
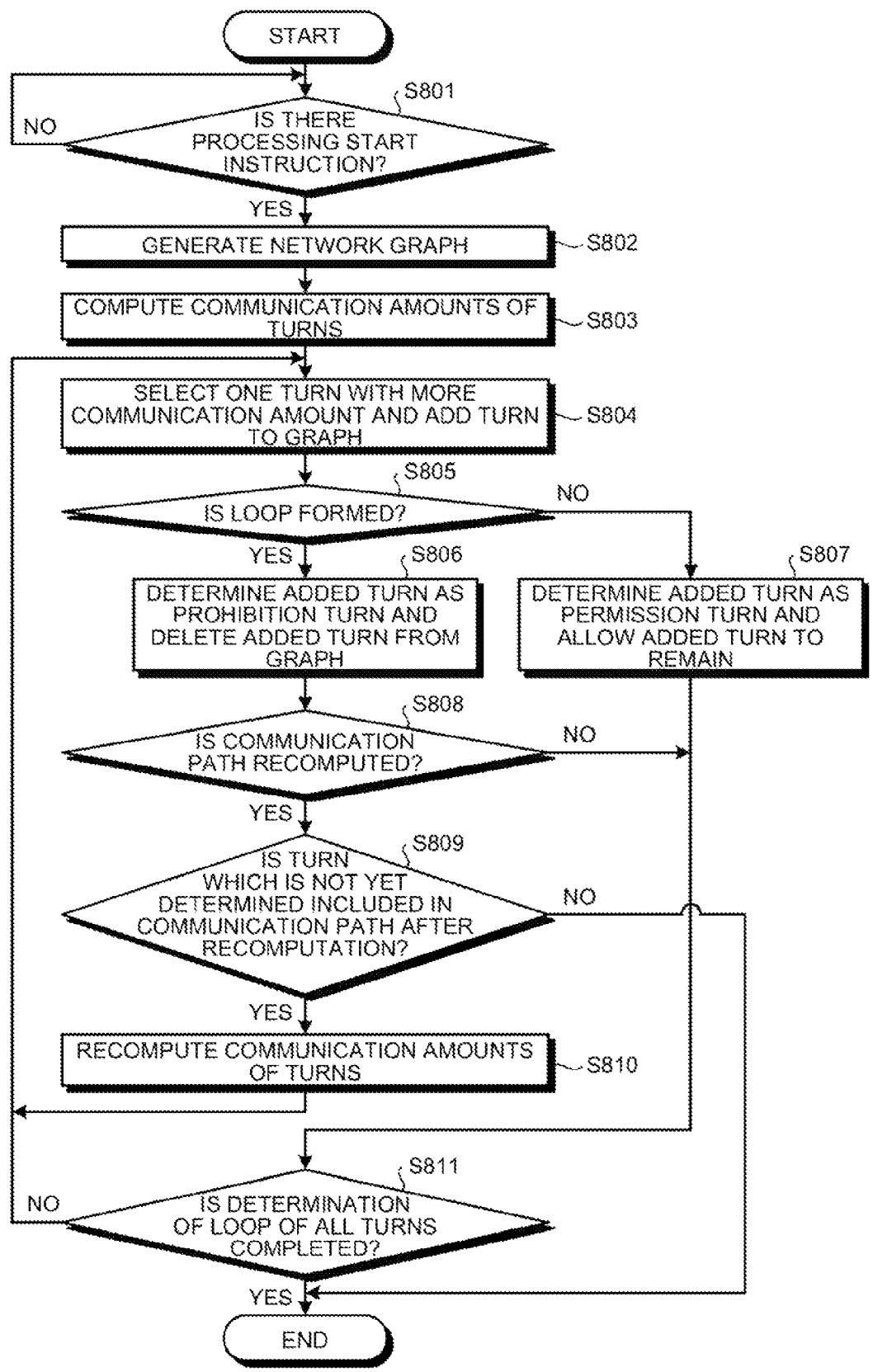
FIG. 39 is a flowchart illustrating a flow of a prohibition turn determination process according to the fourth embodiment.

Next, the processing flow of the prohibition turn determination apparatus according to the fourth embodiment will be described with reference to FIG. 39. FIG. 39 is a diagram illustrating the flow of the prohibition turn determination process according to the fourth embodiment. The processing of the prohibition turn determination apparatus according to the fourth embodiment is different from the processing of the prohibition turn determination apparatus according to the above-described second embodiment in step S808 to step S810 illustrated in FIG. 39.

That is, in step S808, the decision unit 455 determines whether the communication path is recomputed according to a predetermined condition, when the prohibition turn is determined in step S806. When the communication path is recomputed as the determination result (Yes in step S808), the decision unit 455 determines whether a turn which is not yet determined to be prohibited or permitted is included in the recomputed communication path in step S809. When the turn which is not yet determined is included as the determination result (Yes in step S809), the decision unit 455 instructs the computing unit 454 to recompute the communication amounts of respective turns. In step S810, the computing unit 454 recomputes the communication amounts of respective turns in consideration of the prohibition turns. On the other hand, when the turn which is not yet determined is not included (No in step S809), the decision unit 455 determines, as the prohibition turns, all of the turns which are not included in the recomputed communication path and are not yet determined.

Here, the description returns to the process of step S808. When it is determined that the communication path is not recomputed as the determination result (No in step S808), the process proceeds to step S811 and the decision unit 455 executes the same process as the process executed by the prohibition turn determination apparatus according to the above-described third embodiment. That is, as in step S708 illustrated in FIG. 37, it is determined whether the turns are completely added, that is, a turn which can be added to the network remains.

Effects of Fourth Embodiment

As described above, the prohibition turn determination apparatus 400 according to the fourth embodiment determines whether the communication amounts of respective turns are recomputed whenever the prohibition turn is determined. When the communication amounts of respective turns are recomputed, the prohibition turn is determined using the communication amounts of respective recomputed turns. Thus, according to the fourth embodiment, the communications of respective links can be distributed efficiently and a more suitable routing can be obtained.

[e] Fifth Embodiment

Hereinafter, a prohibition turn determination program and a prohibition turn determination apparatus disclosed in the specification will be described according to another embodiment.

(1) Configuration of Apparatus

For example, the prohibition turn determination apparatus 300 described above with reference to FIG. 1 and the prohibition turn determination apparatus 400 described above with reference to FIGS. 27, 36, and 38 are conceptual apparatuses and it is not necessary to physically configure the apparatuses as in illustrated. For example, the determination unit 353 and the calculation unit 354 of the prohibition turn determination apparatus 300 illustrated in FIG. 1 may be incorporated with each other functionally or physically. For example, the determination unit 452 and the calculation unit 453 of the prohibition turn determination apparatus 400 illustrated in FIG. 27 may be incorporated with each other functionally or physically. Thus, a part or the whole of the prohibition turn determination apparatus 300 or the prohibition turn determination apparatus 400 may be distributed or integrated functionally or physically with an arbitrary unit according to the various kinds of loads or use situations.

(2) Prohibition Turn Determination Program

The various processes executed by the prohibition turn determination apparatuses described in the above-described embodiments may be realized by executing a prepared program on, for example, an electronic apparatus such as a personal computer or a server.

Figure 40:
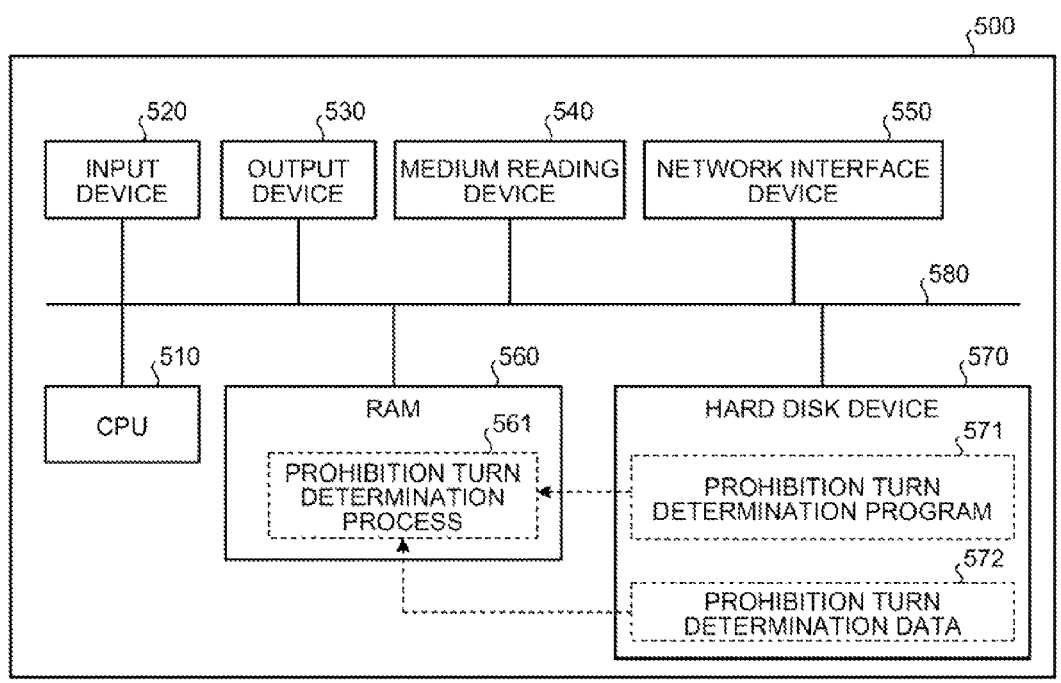
FIG. 40 is a diagram illustrating an example of a computer executing a prohibition turn determination program.
Figure 41:
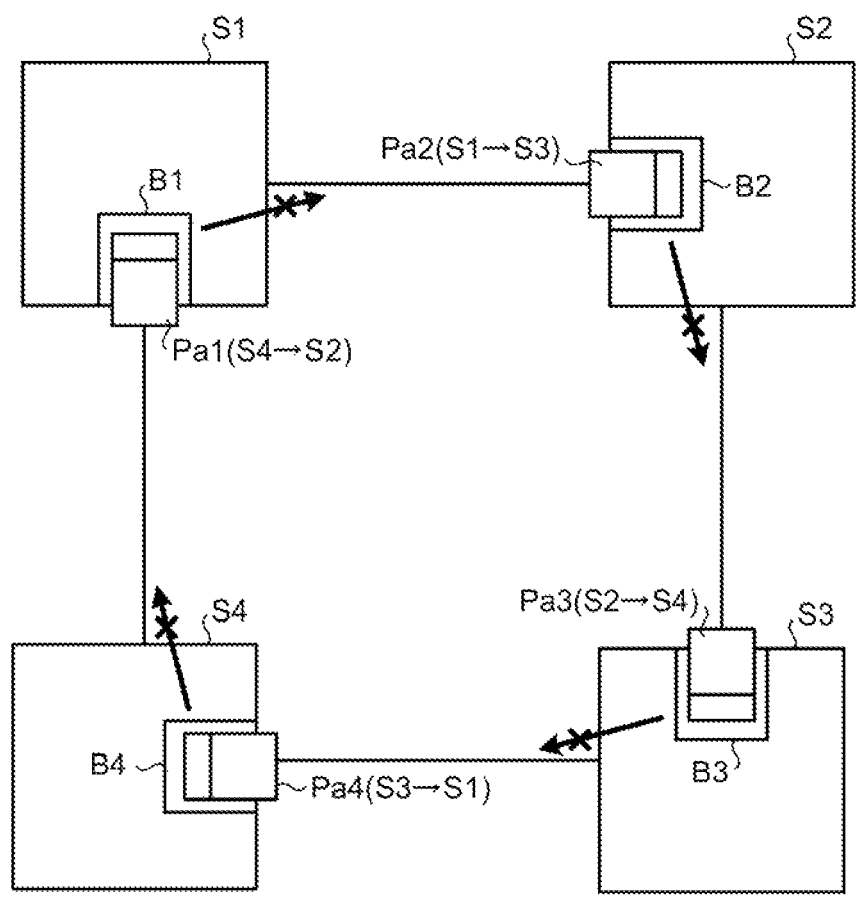
FIG. 41 is a diagram illustrating a mechanism of deadlock occurrence.
Figure 42:
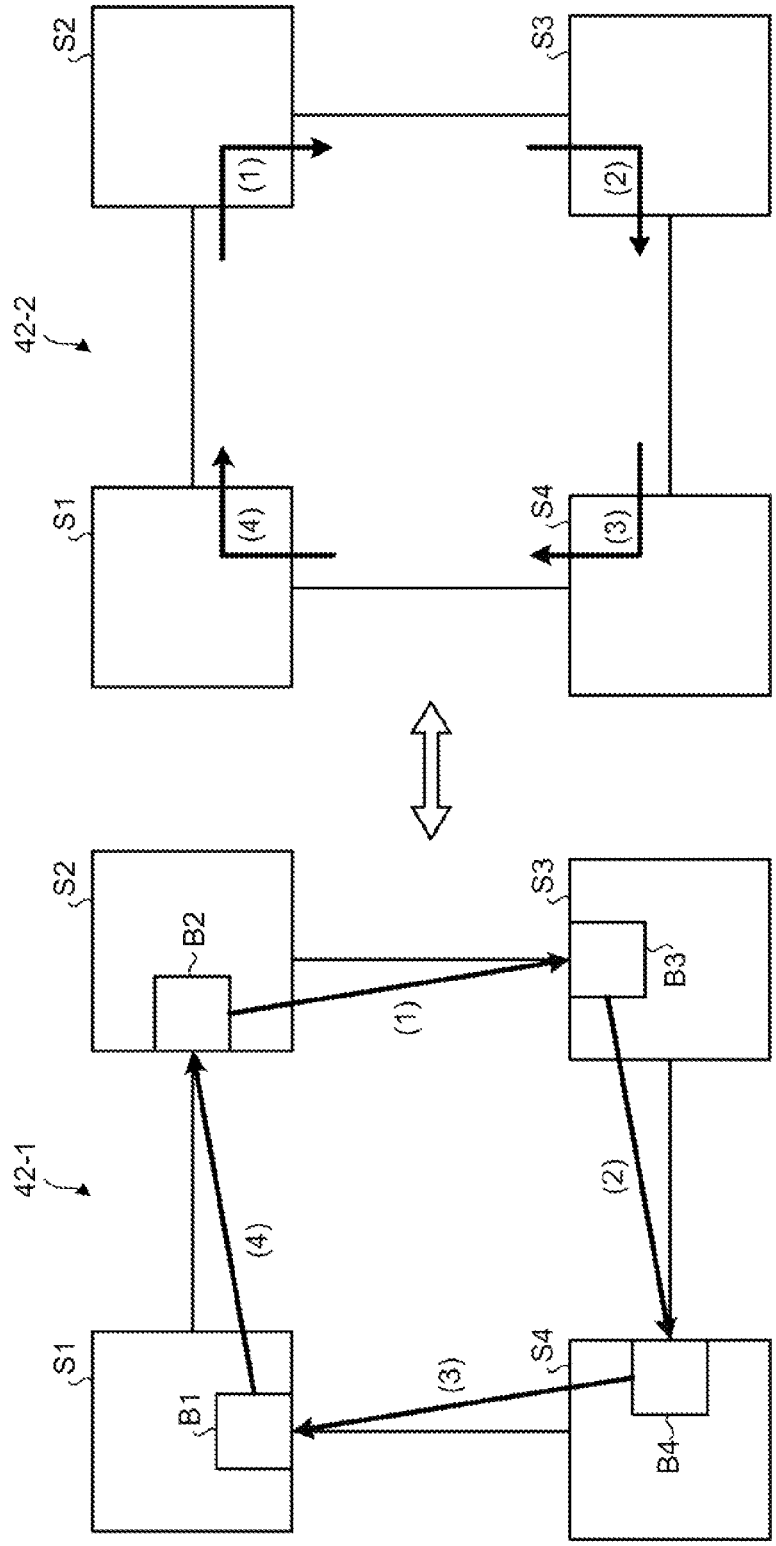
FIG. 42 is a diagram illustrating a correspondence relationship between buffer dependency circulation and a turn loop.
Figure 43:
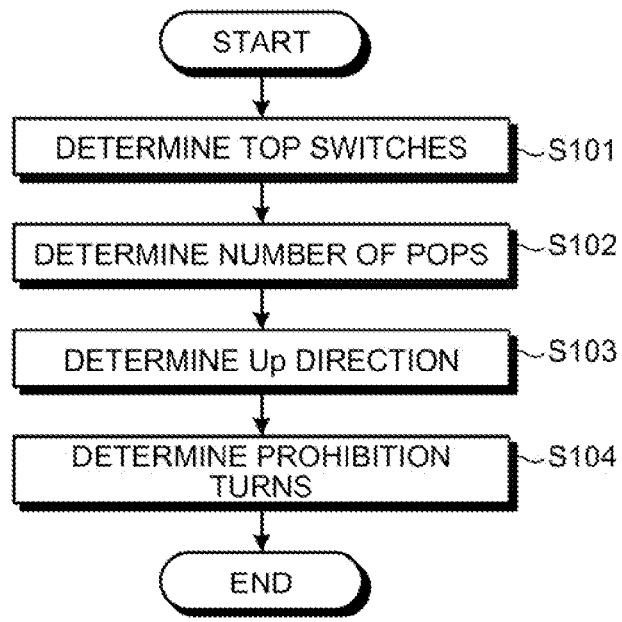
FIG. 43 is a flowchart illustrating a determination flow of a prohibition turn according to the Up/down method.
Figure 44:
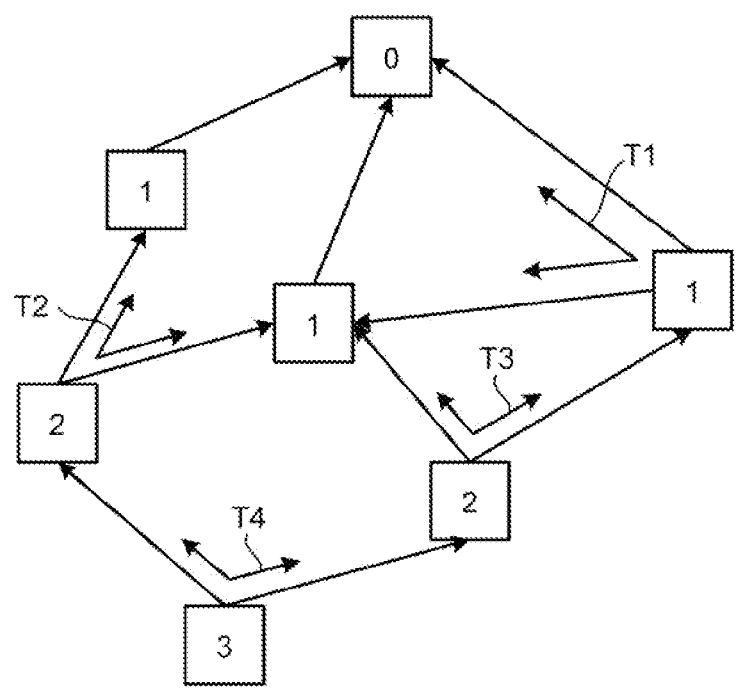
FIG. 44 is a diagram illustrating a prohibition turn determination process according to the Up/down method.
Figure 45:
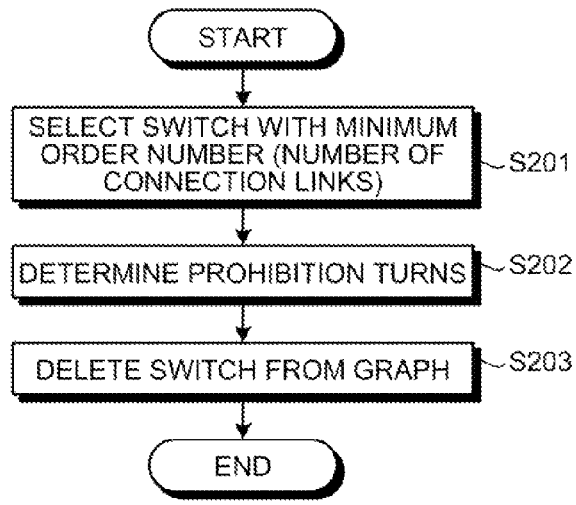
FIG. 45 is a flowchart illustrating a determination flow of a prohibition turn according to the TP method.
Figure 46:
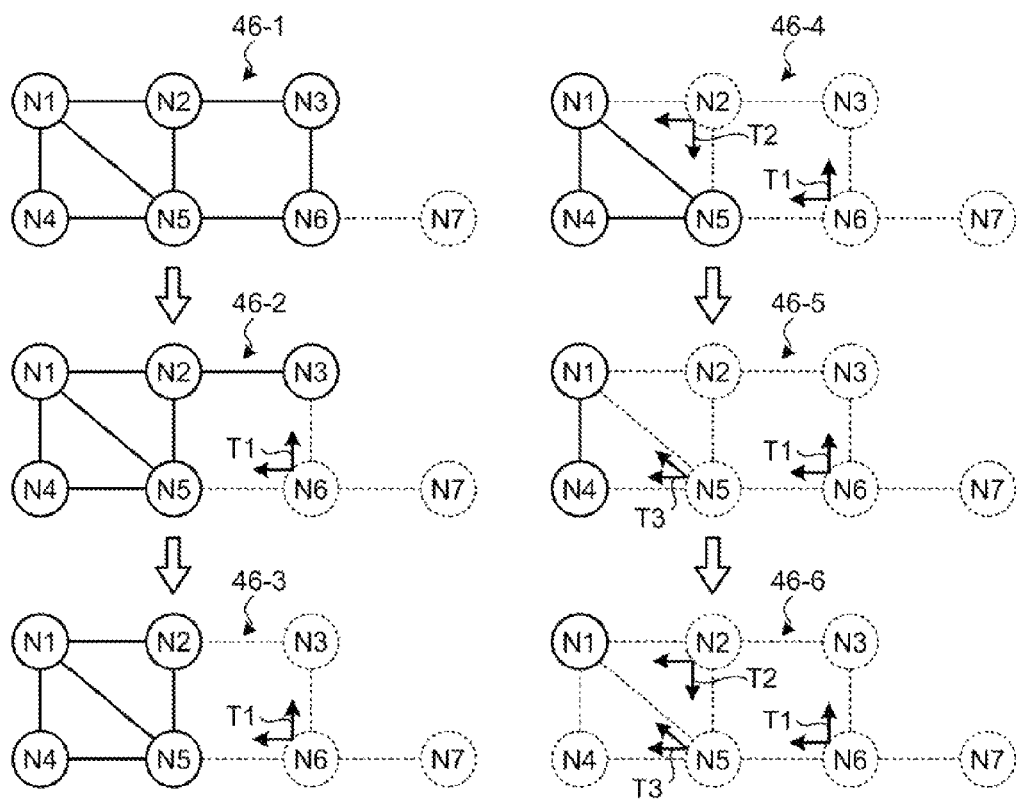
FIG. 46 is a diagram illustrating a prohibition turn determination process according to the TP method.
Figure 47:
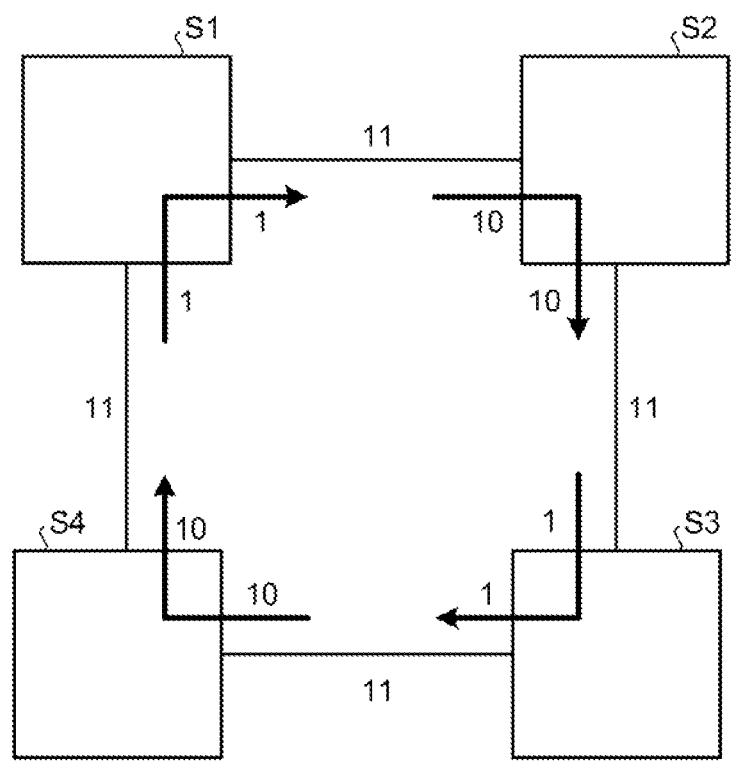
FIG. 47 is a diagram illustrating an example of the communication amounts of respective links forming a network.
Figure 48:
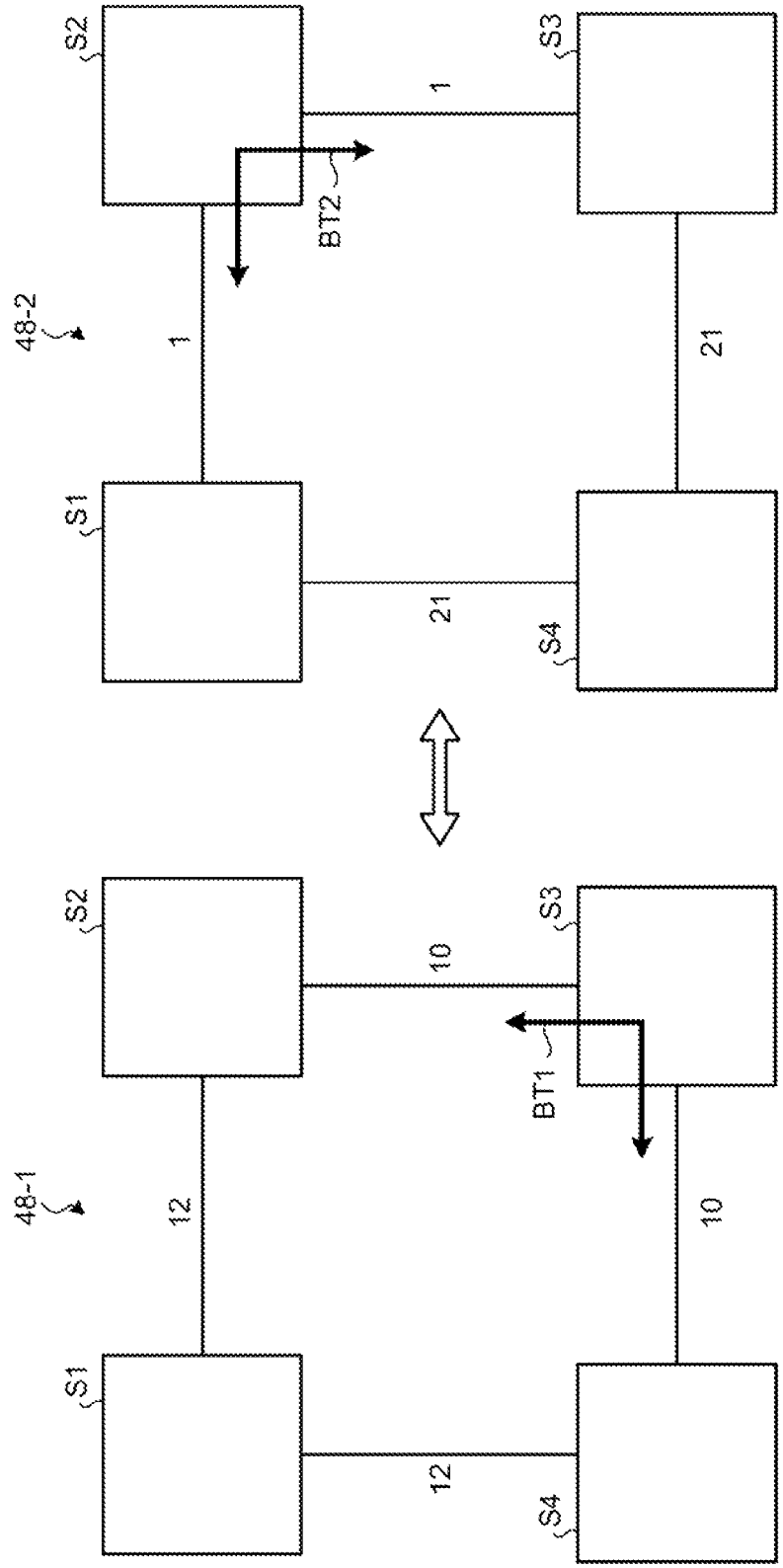
FIG. 48 is a diagram illustrating comparison between the communication amounts of respective links according to a difference between the prohibition turns.
Figure 49:
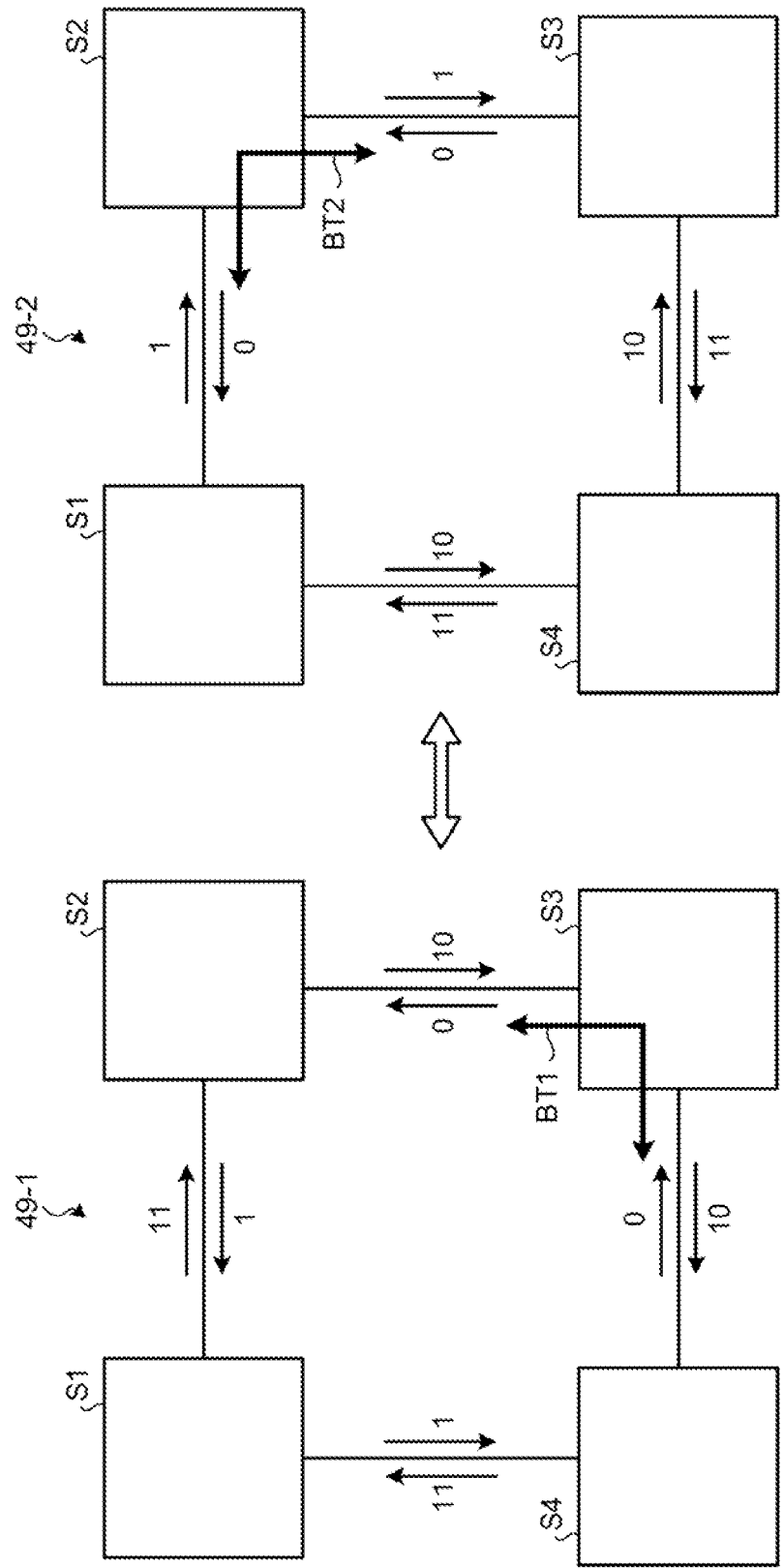
FIG. 49 is a diagram illustrating the details of the communication amounts of respective links after a routing is executed to avoid a prohibition turn.

Hereinafter, referring to FIG. 40, an example of a computer will be described which executes a prohibition turn determination program realizing the same functions as those of the processes executed by the prohibition turn determination apparatus described in the above-described embodiments. FIG. 40 is a diagram illustrating an example of the computer executing the prohibition turn determination program.

As illustrated in FIG. 40, a computer 500 realizing the various processes executed by the prohibition turn determination apparatus includes a central processing unit (CPU) 510 executing various kinds of arithmetic processing. As illustrated in FIG. 40, for example, the computer 500 includes an input device 520 receiving inputs of various kinds of data from a user and an output device 530 outputting various kinds of data.

The input device 520 corresponds to, for example, a keyboard or a mouse. The output device 530 corresponds to, for example, a monitor or a display. When the input device 520 includes a mouse, the function of a pointing device can be realized in cooperation with the monitor of the output device 530. Moreover, when the input device 520 includes another input device such as a touch panel, the function of a pointing device can be realized as in the mouse.

As illustrated in FIG. 40, the computer 500 further includes a medium reading device 540 reading a program or the like from a storage medium and a network interface device 550 transmitting and receiving data to and from another computer via a network. As illustrated in FIG. 40, the computer 500 further includes a random access memory (RAM) 560 temporarily storing various kinds of information and a hard disk device 570. In addition, the devices 510 to 570 are connected to a bus 580.

The computer 500 may include an electronic circuit such as a micro processing unit (MPU) or an integrated circuit such as an application specific integrated circuit (ASIC) or a field programmable gate array (FPGA) instead of the CPU 510. Moreover, the computer 500 may include a semiconductor memory device such as flash memory instead of the RAM 560.

The hard disk device 570 stores a prohibition turn determination program 571 having the same function as the function of the prohibition turn determination apparatus described in the above-described embodiments and prohibition turn determination data 572. Moreover, the prohibition turn determination program 571 may be appropriately distributed and may be stored in a storage unit of another computer connected so as to communicate with the computer 500 via a network.

The CPU 510 reads the prohibition turn determination program 571 from the hard disk device 570 and develops the prohibition turn determination program 571 into the RAM 560, so that the prohibition turn determination program 571 functions as a prohibition turn determination process 561, as illustrated in FIG. 40. The prohibition turn determination process 561 develops various kinds of data such as the prohibition turn determination data 572 read from the hard disk device 570 into an allocation region of the RAM 560 to execute the various processes based on the various kinds of developed data.

For example, the prohibition turn determination process 561 corresponds to the process executed by the control unit 350 of the prohibition turn determination apparatus 300 illustrated in FIG. 1 and the above-described processes illustrated in FIGS. 22 to 24. Moreover, for example, the prohibition turn determination process 561 corresponds to the process executed by the control unit 450 of the prohibition turn determination apparatus 400 illustrated in FIG. 27 and the above-described process illustrated in FIG. 32. Moreover, for example, the prohibition turn determination process 561 corresponds to the process executed by the control unit 450 of the prohibition turn determination apparatus 400 illustrated in FIG. 36 and the above-described process illustrated in FIG. 37. Moreover, for example, the prohibition turn determination process 561 corresponds to the process executed by the control unit 450 of the prohibition turn determination apparatus 400 illustrated in FIG. 38 and the above-described process illustrated in FIG. 39.

The prohibition turn determination program 571 may not be necessarily stored initially in the hard disk device 570. For example, each program is stored in a "portable physical medium" such as a flexible disk (FD), a CD-ROM, a DVD disk, a magneto-optical disk, or an IC card from which the program can be read by the computer 500. Moreover, the computer 500 may read each program from the medium and execute the program.

Each program is stored in an apparatus such as "another computer (or server)" which can communicate with the computer 500 via a public circuit, the Internet, a LAN, a WAN, or the like. Then, the computer 500 may read each program from the apparatus and execute the program.

In the above-described embodiments, the case has hitherto been determined in which the prohibition turn determination apparatus connectable to the network 1 from the outside determines the prohibition turns so that the communication amounts of respective links connecting the switches 100 to each other which are connected to each other in the network 1 are distributed. However, the invention is not limited thereto. For example, the prohibition turn determination program may be stored in one of the switches 100 connected to each other in the network 1 so that the switch 100 functions as the prohibition turn determination apparatus.

According to the embodiments of the invention, it is possible to obtain a routing in which the communication amounts of respective links connecting switches to each other in a network are efficiently distributed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a prohibition turn determination program causing a computer to execute a process, the process comprising:

calculating communication amounts of respective turns, each turn being defined as a combination of an input port and a counter output port of the input port installed in each switch along a communication path between communication apparatuses executing communication via a network including a loop structure having the plurality of switches, based on a communication amount between the communication apparatuses, the communication amount being a sum value of an amount of information sent by one communication device in a group defined as a transmission source to all communication devices in a group defined as a reception destination and an amount of information sent back from all the communication devices in the group defined as the reception destination to the communication device in the group defined as the transmission source, the calculating further calculates sum values of communication amounts of respective tentative prohibition turns;

determining the tentative prohibition turn when each of the plurality of switches is used as a top switch by an Up/down method; and calculating a sum value of communication amounts of the tentative prohibition turn for each top switch, and determining the tentative prohibition turn determined corresponding to the top switch and whose sum value of the communication amounts is smallest among all the tentative prohibition turns as a prohibition turn which is not used to transmit a packet.

2. A computer-readable, non-transitory medium storing a prohibition turn determination program causing a computer to execute a process, the process comprising:

calculating communication amounts of respective turns, each turn being defined as a combination of an input port and a counter output port of the input port installed in each switch along a communication path between communication apparatuses executing communication via a network including a loop structure having the plurality of switches, based on a communication amount between the communication apparatuses, the communication amount being a sum value of an amount of information sent by one communication device in a group defined as a transmission source to all communication devices in a group defined as a reception destination and an amount of information sent back from all the communication devices in the group defined as the reception destination to the communication device in the group defined as the transmission source, the calculating further calculates sum values of the communication amounts of turns formed via the switches for the respective switches by a TP (Turn Prohibition) method; and sequentially selecting the switches with the smallest sum value and determining a turn on the selected switches as a prohibition turn which is not used to transmit a packet.

3. A computer-readable, non-transitory medium storing a prohibition turn determination program causing a computer to execute a process, the process comprising:

generating a network graph which is a model of a network including a loop structure having a plurality of switches and links connecting the switches to each other;

setting a communication path between communication apparatuses executing communication via the network on the network graph;

sequentially adding turns, which are each defined as a combination of an input port and a counter output port of the input port installed in the switch on the communication path, one by one;

calculating respective communication amounts of turns based on a communication amount between the communication apparatuses executing the communication via the network, the communication amount being a sum value of an amount of information sent by one communication apparatus in a group defined as a transmission source to all communication apparatuses in a group defined as a reception destination and an amount of information sent back from all the communication apparatuses in the group defined as the reception destination to the communication apparatus in the group defined as the transmission source;

sequentially adding the turns from the turn with the larger communication amount among the communication amounts of respective turns calculated at the calculating and determining the added turn as a prohibition turn, which is not used to transmit a packet, when a loop is formed by the added turn, and determining whether the communication path is reset excluding the prohibition turn according to a predetermined condition, when the prohibition turn is determined, wherein the calculating includes resetting the communication path excluding the prohibition turn and recalculating the communication amounts of turns, when determining that the communication path is reset.

4. A prohibition turn determination apparatus comprising:

a calculation unit configured to calculate communication amounts of respective turns, each turn being defined as a combination of an input port and a counter output port of the input port installed in each switch along a communication path between communication apparatuses executing communication via a network including a loop structure having the plurality of switches, based on a communication amount between the communication apparatuses, the communication amount being a sum value of an amount of information sent by one communication device in a group defined as a transmission source to all communication devices in a group defined as a reception destination and an amount of information sent back from all the communication devices in the group defined as the reception destination to the communication device in the group defined as the transmission source, the calculating unit further configured to calculate sum values of communication amounts of respective tentative prohibition turns;

a determination unit configured to determine the tentative prohibition turns when each of the plurality of switches is used as a top switch by an Up/down method, to calculate a sum value of communication amounts of the tentative prohibition turn for each top switch, and to determine the tentative prohibition turn determined corresponding to the top switch and whose sum value of the communication amounts is smallest among all the tentative prohibition turns as a prohibition turn which is not used to transmit a packet.

5. A prohibition turn determination apparatus comprising:

a determination unit configured to generate a network graph which is a model of a network including a loop structure having a plurality of switches and links connecting the switches to each other, to set a communication path between communication apparatuses executing communication via the network on the network graph, to sequentially add turns, which are each defined as a combination of an input port and a counter output port of the input port installed in the switch on the communication path, one by one, to calculate respective communication amounts of turns based on a communication amount between the communication apparatuses executing the communication via the network, the communication amount being a sum value of an amount of information sent by one communication apparatus in a group defined as a transmission source to all communication apparatuses in a group defined as a reception destination and an amount of information sent back from all the communication apparatuses in the group defined as the reception destination to the communication apparatus in the group defined as the transmission source;

to sequentially add the turns from the turn with the larger communication amount among the calculated communication amounts of respective turns and to determine the added turn as a prohibition turn, which is not used to transmit a packet, when a loop is formed by the added turn, and to determine whether the communication path is reset excluding the prohibition turn according to a predetermined condition, when the prohibition turn is determined, wherein the determination unit further configured to reset the communication path excluding the prohibition turn and to recalculate the communication amounts of turns, when determining that the communication path is reset.

6. A prohibition turn determination method comprising:

calculating communication amounts of respective turns, each turn being defined as a combination of an input port and a counter output port of the input port installed in each switch along a communication path between communication apparatuses executing communication via a network including a loop structure having the plurality of switches, based on a communication amount between the communication apparatuses, the communication amount being a sum value of an amount of information sent by one communication device in a group defined as a transmission source to all communication devices in a group defined as a reception destination and an amount of information sent back from all the communication devices in the group defined as the reception destination to the communication device in the group defined as the transmission source, the calculating further calculates sum values of communication amounts of respective tentative prohibition turns;

determining the tentative prohibition turn when each of the plurality of switches is used as a top switch by an Up/down method; and calculating a sum value of communication amounts of the tentative prohibition turn for each top switch, and determining the tentative prohibition turn determined corresponding to the top switch and whose sum value of the communication amounts is smallest among all the tentative prohibition turns as a prohibition turn which is not used to transmit a packet.

7. A prohibition turn determination method comprising:

generating a network graph which is a model of a network including a loop structure having a plurality of switches and links connecting the switches to each other;

setting a communication path between communication apparatuses executing communication via the network on the network graph;

sequentially adding turns, which are each defined as a combination of an input port and a counter output port of the input port installed in the switch on the communication path, one by one;

calculating respective communication amounts of turns based on a communication amount between the communication apparatuses executing the communication via the network, the communication amount being a sum value of an amount of information sent by one communication apparatus in a group defined as a transmission source to all communication apparatuses in a group defined as a reception destination and an amount of information sent back from all the communication apparatuses in the group defined as the reception destination to the communication apparatus in the group defined as the transmission source;

sequentially adding the turns from the turn with the larger communication amount among the communication amounts of respective turns calculated at the calculating and determining the added turn as a prohibition turn, which is not used to transmit a packet, when a loop is formed by the added turn, and determining whether the communication path is reset excluding the prohibition turn according to a predetermined condition, when the prohibition turn is determined, wherein the calculating includes resetting the communication path excluding the prohibition turn and recalculating the communication amounts of turns, when determining that the communication path is reset.

8. A prohibition turn determination apparatus comprising:

a calculation unit configured to calculate communication amounts of respective turns, each turn being defined as a combination of an input port and a counter output port of the input port installed in each switch along a communication path between communication apparatuses executing communication via a network including a loop structure having the plurality of switches, based on a communication amount between the communication apparatuses, the communication amount being a sum value of an amount of information sent by one communication device in a group defined as a transmission source to all communication devices in a group defined as a reception destination and an amount of information sent back from all the communication devices in the group defined as the reception destination to the communication device in the group defined as the transmission source, the calculating unit further configured to calculate sum values of the communication amounts of turns formed via the switches for the respective switches by a TP (Turn Prohibition) method; and a determination unit configured to sequentially select the switches with the smallest sum value and to determine a turn on the selected switches as a prohibition turn which is not used to transmit a packet.

9. A prohibition turn determination method comprising:

calculating communication amounts of respective turns, each turn being defined as a combination of an input port and a counter output port of the input port installed in each switch along a communication path between communication apparatuses executing communication via a network including a loop structure having the plurality of switches, based on a communication amount between the communication apparatuses, the communication amount being a sum value of an amount of information sent by one communication device in a group defined as a transmission source to all communication devices in a group defined as a reception destination and an amount of information sent back from all the communication devices in the group defined as the reception destination to the communication device in the group defined as the transmission source, the calculating further calculates sum values of the communication amounts of turns formed via the switches for the respective switches by a TP (Turn Prohibition) method; and sequentially selecting the switches with the smallest sum value and determining a turn on the selected switches as a prohibition turn which is not used to transmit a packet.

\* \* \* \* \*